US012674954B2

(12) United States Patent
Park

(10) Patent No.: US 12,674,954 B2
(45) Date of Patent: Jul. 7, 2026

(54) LENS DRIVING DEVICE, CAMERA MODULE, AND OPTICAL INSTRUMENT

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 649 days.

(21) Appl. No.: 17/924,051

(22) PCT Filed: Apr. 19, 2021

(86) PCT No.: PCT/KR2021/004897

§ 371 (c)(1),
(2) Date: Nov. 8, 2022

(87) PCT Pub. No.: WO2021/230514

PCT Pub. Date: Nov. 18, 2021

(65) Prior Publication Data

US 2023/0176320 A1 Jun. 8, 2023

(30) Foreign Application Priority Data

May 13, 2020 (KR) ........................ 10-2020-0057257
Jun. 15, 2020 (KR) ........................ 10-2020-0072389

(51) Int. Cl.
| | |
|---|---|
| *G02B 7/08* | (2021.01) |
| *G02B 7/09* | (2021.01) |
| *G03B 13/16* | (2021.01) |
| *H02K 41/035* | (2006.01) |
| *H04N 23/54* | (2023.01) |

(Continued)

(52) U.S. Cl.
CPC ................. *G02B 7/08* (2013.01); *G02B 7/09* (2013.01); *G03B 13/16* (2013.01); *H02K 41/0354* (2013.01); *H04N 23/54* (2023.01); *H04N 23/57* (2023.01); *H04N 23/687* (2023.01)

(58) Field of Classification Search
None
See application file for complete search history.

(56) References Cited

U.S. PATENT DOCUMENTS

| | | |
|---|---|---|
| 10,302,961 B2 | 5/2019 | Miller et al. |
| 2013/0050828 A1 | 2/2013 | Sato et al. |
| 2018/0113322 A1 | 4/2018 | Sugawara et al. |

(Continued)

FOREIGN PATENT DOCUMENTS

| | | |
|---|---|---|
| CN | 107360355 A | 11/2017 |
| EP | 3 608 715 A1 | 2/2020 |

(Continued)

*Primary Examiner* — Dung T Nguyen
(74) *Attorney, Agent, or Firm* — Birch, Stewart, Kolasch & Birch, LLP

(57) ABSTRACT

The present embodiment relates to a lens driving device comprising: a fixing member; a housing; a bobbin; an elastic member; and a support member, wherein the support member includes a wire and a member disposed around the wire, and on the basis of an optical axis direction, the member has a length greater than ½ of the length of the bobbin, and the wire protrudes from one end of the member and is coupled to the elastic member, and protrudes from the other end of the member and is coupled to the fixing member.

20 Claims, 43 Drawing Sheets

(51) Int. Cl.
*H04N 23/57* (2023.01)
*H04N 23/68* (2023.01)

(56) References Cited

U.S. PATENT DOCUMENTS

| | | |
|---|---|---|
| 2019/0011664 A1 | 1/2019 | Osaka et al. |
| 2019/0101771 A1* | 4/2019 | Takimoto ............... G03B 13/36 |
| 2020/0355934 A1 | 11/2020 | Park et al. |

FOREIGN PATENT DOCUMENTS

| | | | |
|---|---|---|---|
| JP | 2016-180879 A | | 10/2016 |
| JP | 2017-21365 A | | 1/2017 |
| KR | 10-2013-0020414 A | | 2/2013 |
| KR | 10-2014-0084971 A | | 7/2014 |
| KR | 10-2016-0049181 A | | 5/2016 |
| KR | 10-2016-0054636 A | | 5/2016 |
| KR | 10-2016-0057725 A | | 5/2016 |
| KR | 20160057725 A | * | 5/2016 |
| KR | 10-2017-0135151 A | | 12/2017 |
| KR | 10-2020-0033452 A | | 3/2020 |

* cited by examiner (a)        (b)        (c)

(d)        (e)        (f)

(a)                    (b)

(a)    (b)

(a)

UP POSTURE (0 Degree)

(b)

SIDE POSTURE (90 Degree)

(c)

UP POSTURE (0 Degree)

(a)

SIDE POSTURE (90 Degree)

(b)

DOWN POSTURE (180 Degree)

(c)

LENS DRIVING DEVICE, CAMERA MODULE, AND OPTICAL INSTRUMENT

CROSS REFERENCE TO RELATED APPLICATIONS

This application is the National Phase of PCT International Application No. PCT/KR2021/004897, filed on Apr. 19, 2021, which claims priority under 35 U.S.C. § 119 (a) to Patent Application No. 10-2020-0057257, filed in the Republic of Korea on May 13, 2020, and Patent Application No. 10-2020-0072389, filed in the Republic of Korea on Jun. 15, 2020, all of which are hereby expressly incorporated by reference into the present application.

TECHNICAL FIELD

The present embodiment relates to a lens driving device, a camera module, and an optical instrument.

BACKGROUND ART

As the spread of various portable terminals is widely generalized and wireless Internet services are commercialized, the demands of consumers related to portable terminals are also diversifying, so that various types of additional devices are being installed in the portable terminals.

Among them, there is a camera module for photographing a subject as a photograph or a moving picture. Meanwhile, optical image stabilization (OIS) function for correcting a user's hand tremble during photographing is applied to a recent camera module. In addition, the size of the image sensor and the aperture of the lens are increasing as the function of the portable terminal is strengthened and the number of pixels is increased.

However, as the diameter of the lens increases, when vibration and shock are generated in the camera module, the stress applied to the support member supporting OIS driving increases causing deformation and disconnection of the support member, and accordingly, there is a problem in that the OIS cannot be driven and an oscillation defect occurs.

In addition, when the sensing magnet and the sensor are disposed on the bobbin and the housing, there is a problem in that an error equal to as much as the posture difference deflection of the housing is detected together in the distance between the lens and the image sensor.

DETAILED DESCRIPTION OF THE INVENTION

Technical Subject

A first embodiment of the present invention is to provide a lens driving device comprising a structure that minimizes stress applied to a support member supporting OIS driving.

A second embodiment of the present invention is to provide a lens driving device comprising a structure in which the distance between the lens and the image sensor is calculated regardless of the posture difference deflection of the housing.

Furthermore, it is intended to provide a lens driving device capable of increasing the accuracy of auto focus (AF) feedback by amplifying a detection value for AF feedback.

Technical Solution

A lens driving device according to a first embodiment of the present invention comprises: a fixing member; a housing being disposed on the fixing member; a bobbin being disposed inside the housing; an elastic member connecting the bobbin and the housing; and a support member being disposed between the elastic member and the fixing member, wherein the support member comprises a wire and a member being disposed around the wire, wherein the support member has a length greater than ½ of the length of the bobbin with respect to the optical axis direction, and wherein the wire may be protruded from one end of the member to be coupled to the elastic member, and may be protruded from the other end of the member to be coupled to the fixing member.

A lens driving device according to a first embodiment of the present invention comprises: a fixing member; a housing being disposed on the fixing member; a bobbin being disposed inside the housing; an elastic member connecting the bobbin and the housing; and a support member being disposed between the elastic member and the fixing member, wherein the support member comprises a wire and a member comprising a columnar shape disposed around the wire, wherein the wire is protruded from one end of the member to be coupled to the elastic member, and is protruded from the other end of the member to be coupled to the fixing member.

The elastic member may comprise an upper elastic member and a lower elastic member being disposed below the upper elastic member, wherein the length of the member may be greater than or equal to a distance between the upper elastic member and the lower elastic member.

The member may comprise a body part and a concave part.

The columnar shape may be a columnar shape of a circle or a polygon.

A lens driving device according to a first embodiment of the present invention comprises a housing; a bobbin being disposed inside the housing; an elastic member connecting the bobbin and the housing; and a support member being coupled to the elastic member and supporting the housing, wherein the support member may comprise a wire and a member surrounding 50% or more of the wire.

The member may comprise a body part and a concave part having a diameter smaller than that of the body part in a region adjacent to the elastic member.

It comprises a base being spaced apart from the housing, wherein the elastic member comprises an upper elastic member and a lower elastic member, wherein the concave part comprises a first concave part adjacent to the upper elastic member and a second concave part adjacent to the lower elastic member, and wherein the second concave part may be disposed between a virtual extension surface being extended from an upper surface of the lower elastic member and a lower surface of the substrate.

The first concave part may be located within 4.8% of the total length of the body part from the end of the body part.

A part of the wire of the support member may be protruded from an end of the body part.

The wire of the support member may be protruded from the end of the body part within 3% of the total length of the support member.

The substrate comprises a first substrate and a second substrate disposed on the first substrate, one end of the body part is disposed at the same height as the upper elastic member, and the other end of the body part may be disposed inside the hole of the first substrate.

The member may have a length within 50% to 99% of the wire.

The body part may comprise a fixing part and an extension part.

The concave part may be positioned between the fixing part and the extension part.

The fixing part comprises a first fixing part and a second fixing part, and the first concave part is located between the first fixing part and the extension part, and the second concave part may be positioned between the second fixing part and the extension part.

The length of the concave part may be 3% to 40% of the length of the member.

The member may be formed of a material different from that of the wire.

The lens driving device may comprise: a first substrate being disposed in the base; a first coil being disposed in the bobbin; a magnet being disposed in the housing and facing the first coil; and a second coil being opposite to the magnet.

A lens driving device according to a first embodiment of the present invention comprises: a housing; a bobbin being disposed inside the housing; a base being spaced apart from the housing; a first coil being disposed in the bobbin; a magnet being disposed in the housing and facing the first coil; a first substrate being disposed in the base and comprising a second coil being opposite to the magnet; a first elastic member connecting the bobbin and the housing; and a support member connecting the first elastic member and the first substrate, wherein the support member may comprise a wire and a buffer part formed of a material different from the wire and surrounding at least a portion of the wire.

The wire may be formed of a conductive material, and the buffer part may be formed of a non-conductive material.

The wire may be formed of a metal, and the buffer part may be formed of an elastomer.

The buffer part comprises a first fixing part being connected to the first elastic member, a second fixing part being connected to the first substrate, an extension part being disposed between the first fixing part and the second fixing part, and a first deformable part connecting the first fixing part and the extension part, wherein a diameter of the first deformable part in a direction perpendicular to an optical axis may be smaller than a diameter of the first fixing part in a direction perpendicular to the optical axis.

The buffer part comprises a second deformable part connecting the second fixing part and the extension part, and the diameter of the second deformable part in a direction perpendicular to the optical axis may be smaller than the diameter of the second fixing part in a direction perpendicular to the optical axis.

The diameter of the first fixing part, the diameter of the second fixing part, and the diameter of the extension part in a direction perpendicular to the optical axis are equal to each other, and the diameter of the first deformable part may be the same as the diameter of the second deformable part.

The first elastic member comprises: an inner side portion being coupled to the bobbin; an outer side portion being coupled to the housing; a connection part connecting the inner side portion and the outer side portion; and an extension part being extended from the outer side portion and coupled to the support member, wherein the extension part of the first elastic member comprises a hole, wherein the first fixing part of the support member is disposed in the hole of the extension part, and wherein the diameter of the hole of the extension part in a direction perpendicular to the optical axis may be the same as the diameter of the first fixing part of the support member.

The first substrate comprises a hole, wherein the second fixing part of the support member is disposed in the hole of the first substrate, wherein the diameter of the hole in the first substrate in a direction perpendicular to the optical axis may be the same as the diameter of the second fixing part of the support member.

The diameter of the first deformable part may be 20% to 80% of the diameter of the first fixing part.

The buffer part may comprise a groove being formed by being recessed in an outer circumferential surface of the buffer part, wherein the groove of the buffer part may be spaced apart from an upper end and a lower end of the buffer part.

The groove of the buffer part comprises: a first groove adjacent to the upper end of the buffer part; and a second groove adjacent to the lower end of the buffer part, wherein the length of each of the first groove and the second groove of the buffer part in an optical axis direction may be 3% to 40% of the length of the buffer part in an optical axis direction.

The length of the second groove of the buffer part in the optical axis direction may be longer than the length of the first groove in the optical axis direction.

The buffer part may have a circular cross-section in a direction perpendicular to the optical axis.

The wire may comprise a first portion being protruded from the upper end of the buffer part, and a second portion being protruded from a lower end of the buffer part.

The first portion of the wire is coupled to the upper surface of the first elastic member by a conductive member, and the second portion of the wire may be coupled to a lower surface of the first substrate by a conductive member.

The wire of the support member may comprise a plurality of wires, and the plurality of wires may be disposed inside the buffer part in a twisted form.

The buffer part comprises a plurality of grooves being formed by being recessed in an outer circumferential surface of the buffer part, wherein the plurality of grooves of the buffer part comprise three grooves being spaced apart in an optical axis direction, and wherein at least one of the three grooves may comprise any one or more of a curved surface having a curvature and an inclined surface being inclined to the outer circumferential surface of the buffer part.

The lens driving device comprises: a second substrate being disposed in the housing; a driver IC being disposed in the second substrate; and a second elastic member connecting the bobbin and the housing and being disposed below the first elastic member, wherein the driver IC is electrically connected to the first substrate through the wire of the support member, and wherein the first coil may be electrically connected to the driver IC through the second elastic member.

The camera module according to the first embodiment of the present invention may comprise: a printed circuit substrate; an image sensor being disposed in the printed circuit substrate; a lens driving device being disposed on the printed circuit substrate; and a lens being coupled to the bobbin of the lens driving device.

An optical instrument according to a first embodiment of the present invention may comprise: a main body; a camera module being disposed in the main body; and a display being disposed in the main body and outputting an image being photographed by the camera module.

A lens driving device according to a second embodiment of the present invention comprises: a housing; a bobbin being disposed inside the housing; a base being spaced apart from the housing; a first coil being disposed in the bobbin; a first magnet being disposed in the housing and facing the first coil; a substrate being disposed in the base and comprising a second coil facing the first magnet; a second magnet and a third magnet disposed in the bobbin; and a first sensor and a second sensor being disposed in the substrate, wherein the second magnet is disposed at an opposite side of the third magnet about an optical axis, wherein the first sensor detects the second magnet and the second sensor detects the third magnet, and wherein the first sensor and the second sensor may be connected in series.

Any one of the two output terminals of the first sensor and any one of the two output terminals of the second sensor may be connected to each other.

Each of the first sensor and the second sensor may comprise a tunnel magnetoresistance (TMR) sensor.

One of the first sensor and the second sensor may comprise a TMR sensor and the other may comprise a Hall sensor.

Each of the first sensor and the second sensor may comprise a Hall sensor.

Each of the second magnet and the third magnet may have a columnar shape having a circular lower surface.

The first sensor may be overlapped with the second magnet in the optical axis direction, and the second sensor may be overlapped with the third magnet in the optical axis direction.

The base comprises: a first groove being recessed from an upper surface of the base and being formed in a shape corresponding to the first sensor; and a second groove being recessed from the upper surface of the base and being formed in a shape corresponding to the second sensor, wherein the first sensor is disposed in the first groove of the base, and the second sensor may be disposed in the second groove of the base.

And it comprises a third sensor and a fourth sensor being disposed on the substrate, wherein the first magnet comprises a first driving magnet being disposed so that a first axis perpendicular to the optical axis passes through, a second driving magnet being disposed so that the optical axis and a second axis perpendicular to the first axis pass through, and wherein the third sensor detects the first driving magnet and the fourth sensor may detect the second driving magnet.

The third sensor is disposed in a first corner region of the upper surface of the base, the fourth sensor is disposed in a second corner region of the upper surface of the base, and any one of the first sensor and the second sensor may be disposed between a first corner region of the upper surface of the base and the second corner region.

Each of the third sensor and the fourth sensor may comprise a Hall sensor.

Each of the first sensor and the second sensor detects movement of the bobbin in the optical axis direction, the third sensor detects a movement of the housing in the second axis direction, and the fourth sensor may detect a movement of the housing in the first axis direction.

The first coil is disposed on the outer circumferential surface of the bobbin; the bobbin comprises a rib being protruded from the outer circumferential surface of the bobbin and being disposed below the first coil, a hole penetrating through the rib in the optical axis direction; each of the second magnet and the third magnet is disposed in the hole of the bobbin; and at least a portion of each of the second magnet and the third magnet is disposed at farther outer side than the first coil in a direction perpendicular to the optical axis; and the hole of the bobbin may be opened toward outside.

The housing comprises a plurality of side portions and a plurality of corner portions between the plurality of side portions, wherein the first magnet is disposed in the plurality of corner portions of the housing, and wherein the second magnet and the third magnet may be disposed at positions corresponding to the plurality of side portions of the housing.

The lens driving device comprises: a first elastic member connecting the bobbin and the housing; a second elastic member connecting the bobbin and the housing and being disposed below the first elastic member; and a wire connecting the first elastic member and the substrate, wherein the first elastic member is divided into two, wherein the first coil is electrically connected to the substrate through the wire and the first elastic member, and wherein the second elastic member may be integrally formed.

The substrate comprises: a hole being formed in the substrate; a first terminal being formed around the hole on a lower surface of the substrate; a second terminal being formed in an outer edge of the lower surface of the substrate, wherein the first terminal of the substrate is connected through the wire and the conducting member, and the second terminal of the substrate may be connected to the second coil through a conducting member.

The lens driving device comprises a buffer member surrounding the wire from the first elastic member to the substrate, wherein the buffer member may be formed of a material different from that of the wire.

The first sensor and the second sensor may be disposed between the substrate and the base.

A camera module according to a second embodiment of the present invention may comprise: a printed circuit substrate; an image sensor being disposed in the printed circuit substrate; the lens driving device being disposed in the printed circuit substrate; and a lens being coupled to the bobbin of the lens driving device.

An optical instrument according to a second embodiment of the present invention may comprise: a main body; a camera module disposed in the main body; and a display being disposed in the main body and outputting an image photographed by the camera module.

A lens driving device according to a second embodiment of the present invention comprises: a housing; a bobbin being disposed inside the housing; a base being spaced apart from the housing; a first coil being disposed in the bobbin; a first magnet being disposed in the housing and facing the first coil; a substrate being disposed in the base and comprising a second coil facing the first magnet; a second magnet and a third magnet being disposed in the bobbin; and a sensor being disposed between the substrate and the base, wherein the second magnet is disposed at an opposite side of the third magnet about an optical axis, wherein the sensor detects the second magnet, and wherein the sensor may comprise a TMR sensor.

A lens driving device according to a second embodiment of the present invention comprises: a housing; a bobbin being disposed inside the housing; a base being spaced apart from the housing; a first coil being disposed in the bobbin; a first magnet being disposed in the housing and facing the first coil; a substrate being disposed in the base and comprising a second coil facing the first magnet; a second magnet and a third magnet being disposed in the bobbin; and a sensor being disposed in the substrate, wherein the sensor comprises a first sensor and a second sensor for detecting the first magnet, a third sensor for detecting the second magnet, and a fourth sensor for detecting the third magnet, wherein the first sensor and the second sensor are disposed in a region adjacent to a corner of the substrate, and wherein the third sensor or the fourth sensor may be disposed between the first sensor and the second sensor.

Advantageous Effects

Through the first embodiment of the present invention, deformation and disconnection of the support member supporting OIS driving can be prevented.

Through the second embodiment of the present invention, it is possible to provide an autofocus function with improved accuracy by performing accurate AF feedback regardless of the posture difference deflection of the housing.

Furthermore, more detailed AF feedback or more accurate AF feedback can be provided according to the amplification of the detection value for AF feedback.

BRIEF DESCRIPTION OF DRAWINGS

FIG. 16a (b) to (f) are cross-sectional views of a support member of a lens driving device according to a modified embodiment.

BEST MODE

Figure 1:
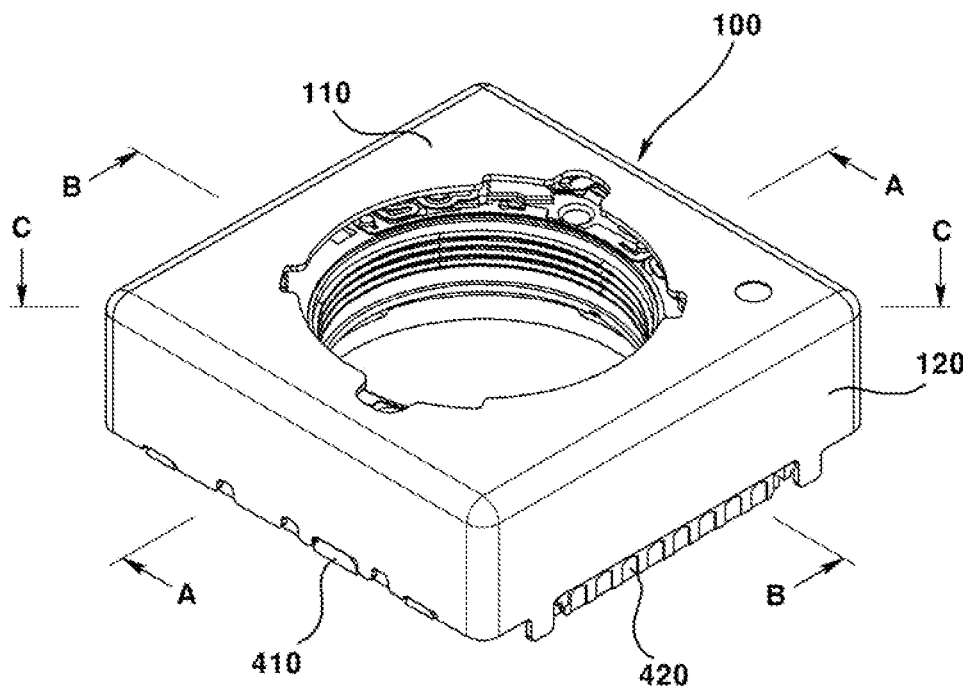
FIG. 1 is a perspective view of a lens driving device according to a first embodiment of the present invention.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

An 'optical axis direction' used hereinafter is defined as an optical axis direction of a lens and/or an image sensor being coupled to a lens driving device.

The 'vertical direction' used hereinafter may be a direction parallel to the optical axis direction. The vertical direction may correspond to the 'z-axis direction'. The 'horizontal direction' used hereinafter may be a direction perpendicular to the vertical direction. That is, the horizontal direction may be a direction perpendicular to the optical axis. Accordingly, the horizontal direction may comprise an 'x-axis direction' and a 'y-axis direction'.

The 'auto focus (AF) function' used hereinafter is defined as a function to automatically focus on a subject by adjusting the distance from the image sensor by moving the lens in an optical axis direction according to the distance of the subject so that the image sensor can obtain a clear image of the subject. In addition, 'closed-loop auto focus (CLAF) control' is defined as real time feedback control of the lens position by sensing the distance between the image sensor and the lens to enhance focus adjustment accuracy.

The 'optical image stabilization (OIS) function' used hereinafter is defined as the function of moving or tilting the lens in a direction perpendicular to the optical axis to cancel the vibration (movement) generated in the image sensor by external force.

Hereinafter, a configuration of a lens driving device according to a first embodiment of the present invention will be described with reference to the drawings.

Figure 2:
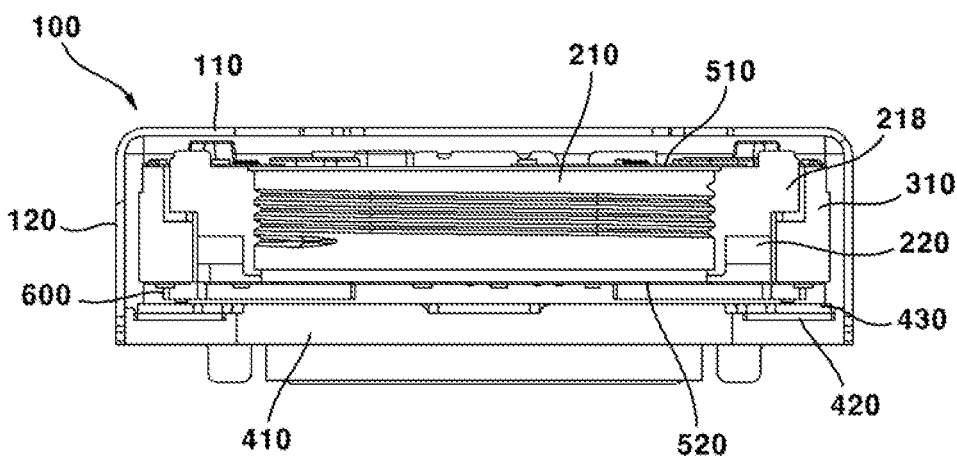
FIG. 2 is a cross-sectional view taken along line A-A of FIG. 1.
Figure 3:
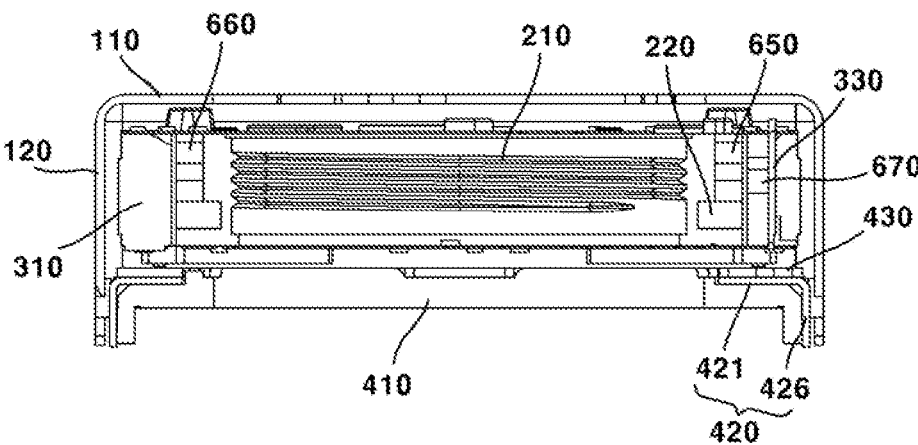
FIG. 3 is a cross-sectional view taken along line B-B of FIG. 1.
Figure 4:
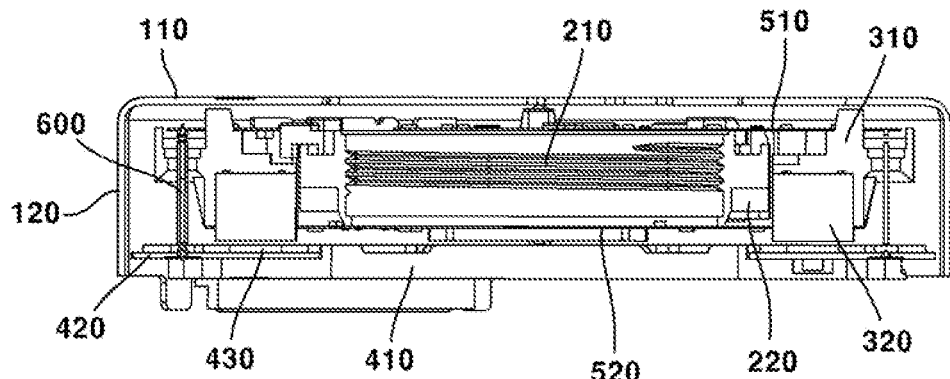
FIG. 4 is a cross-sectional view taken along line C-C of FIG. 1.
Figure 5:
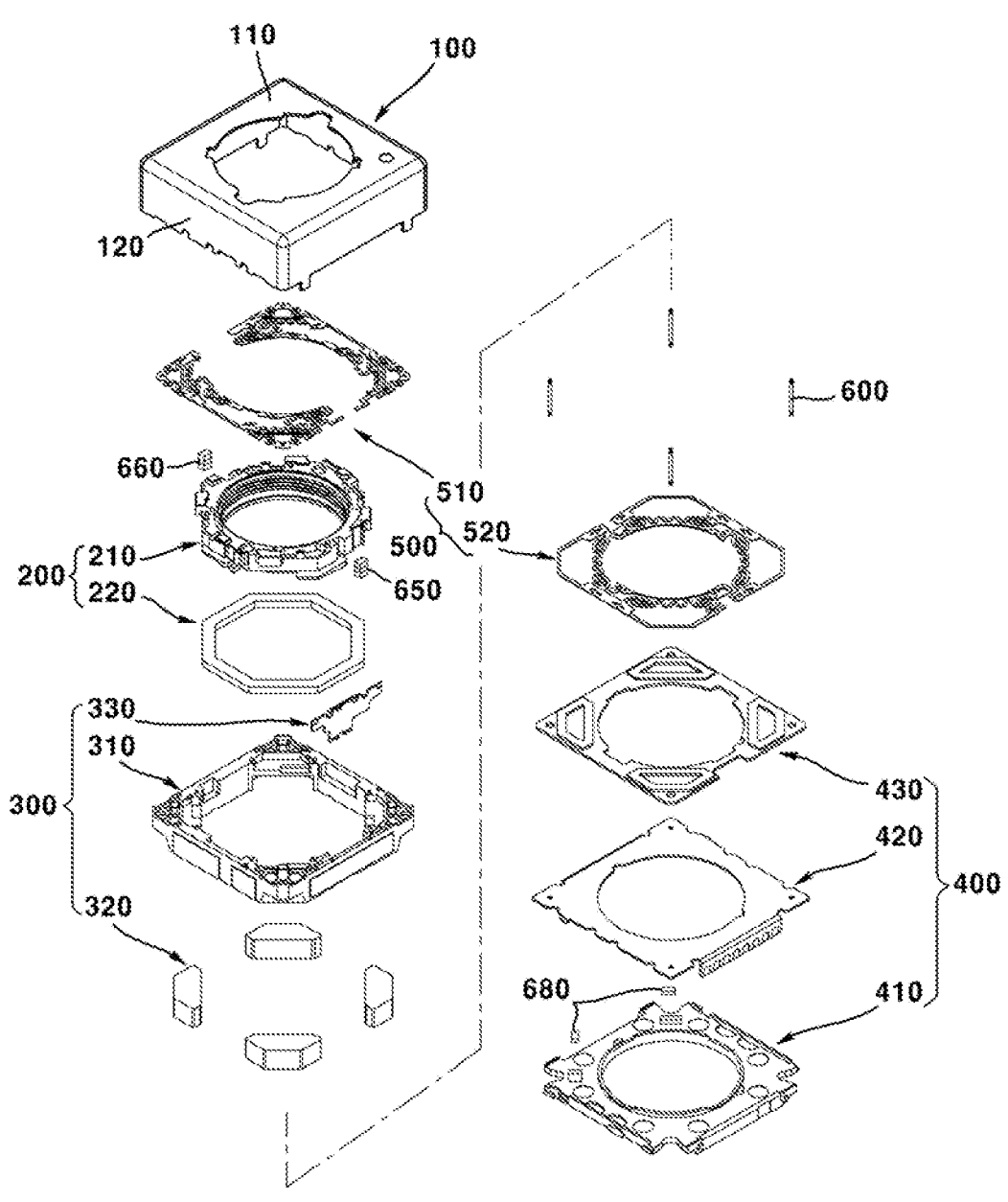
FIG. 5 is an exploded perspective view of a lens driving device according to a first embodiment of the present invention.
Figure 6:
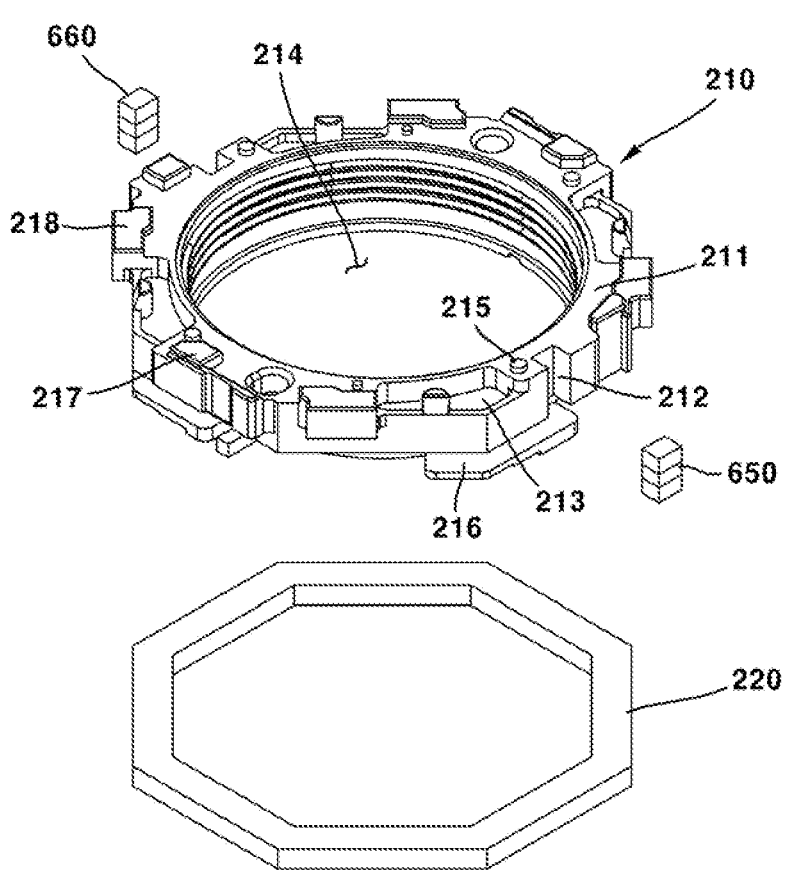
FIG. 6 is an exploded perspective view of a first actuator and related configuration of a lens driving device according to a first embodiment of the present invention.
Figure 7:
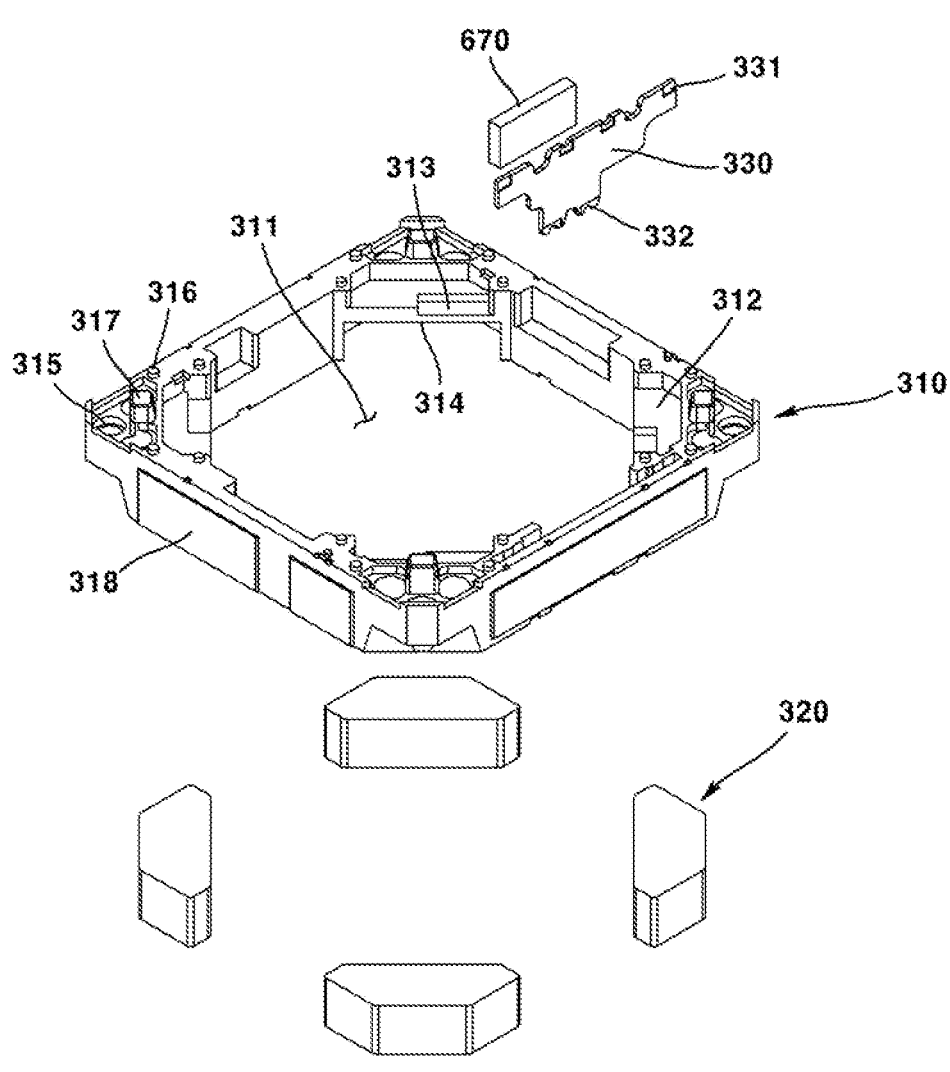
FIG. 7 is an exploded perspective view of a second mover and related configuration of a lens driving device according to a first embodiment of the present invention.
Figure 8:
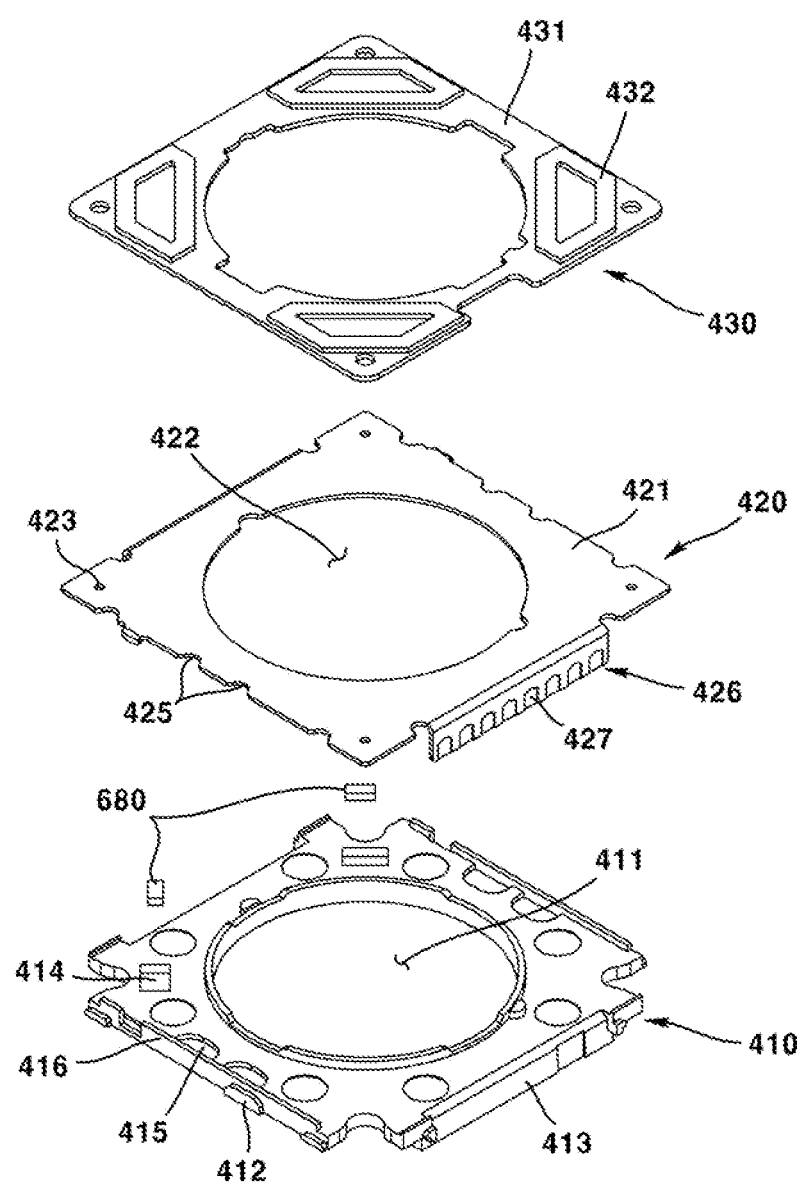
FIG. 8 is an exploded perspective view of a stator of a lens driving device according to a first embodiment of the present invention.
Figure 9:
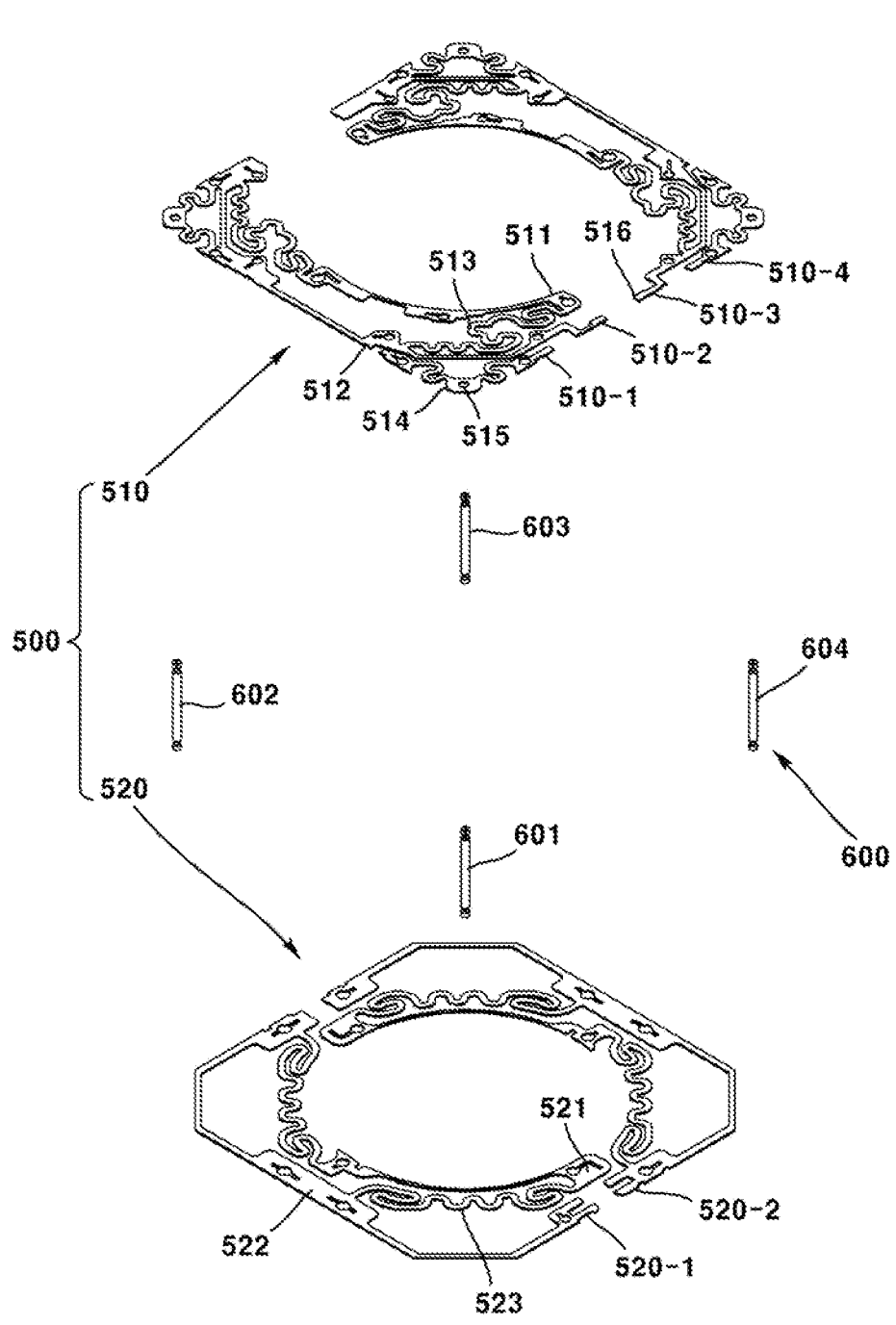
FIG. 9 is an exploded perspective view of an elastic member and a support member of a lens driving device according to a first embodiment of the present invention.
Figure 10:
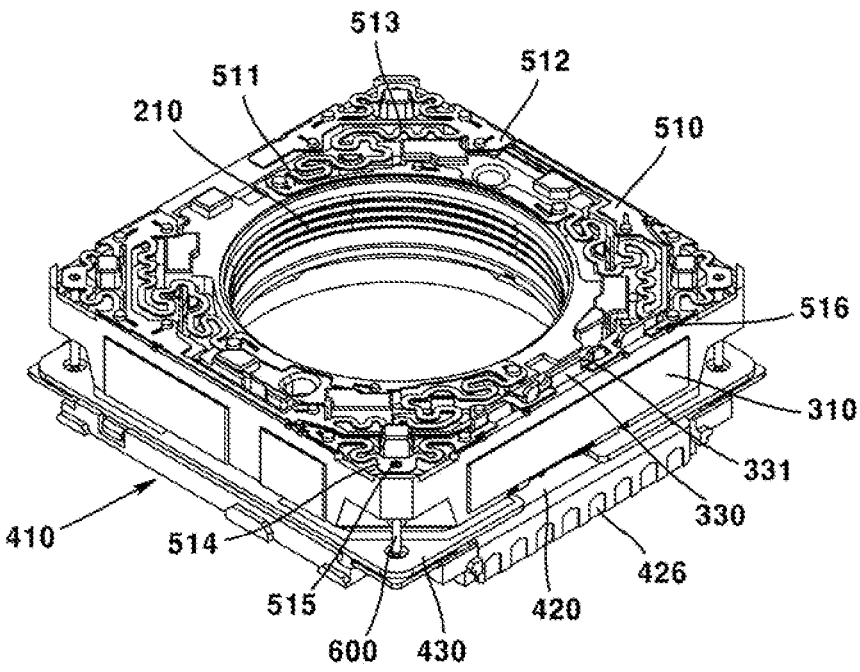
FIG. 10 is a perspective view of a state in which the cover member is removed in FIG. 1.
Figure 11A:
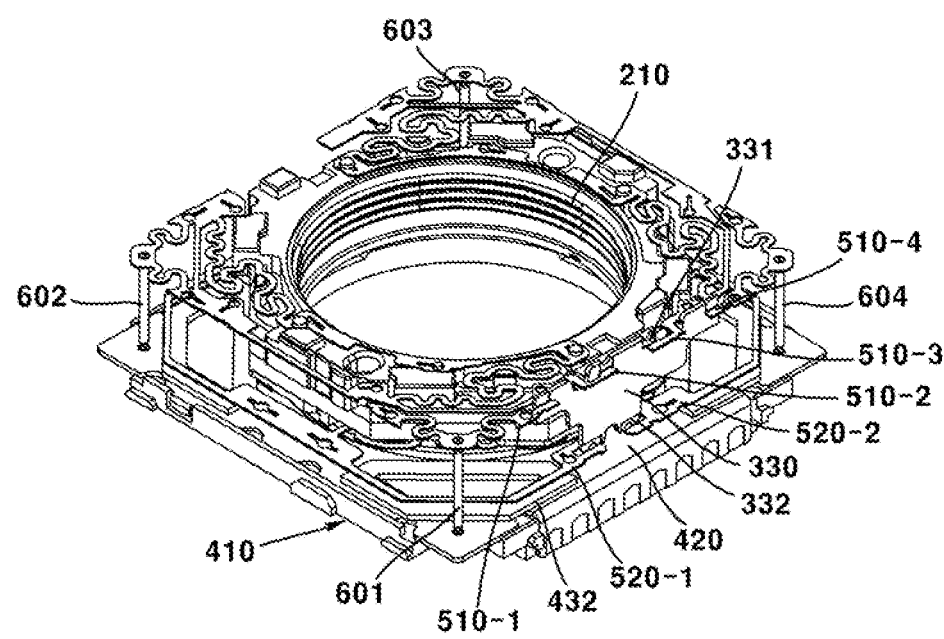
FIG. 11a is a perspective view of a state in which some configurations are omitted from FIG. 10.
Figure 11B:
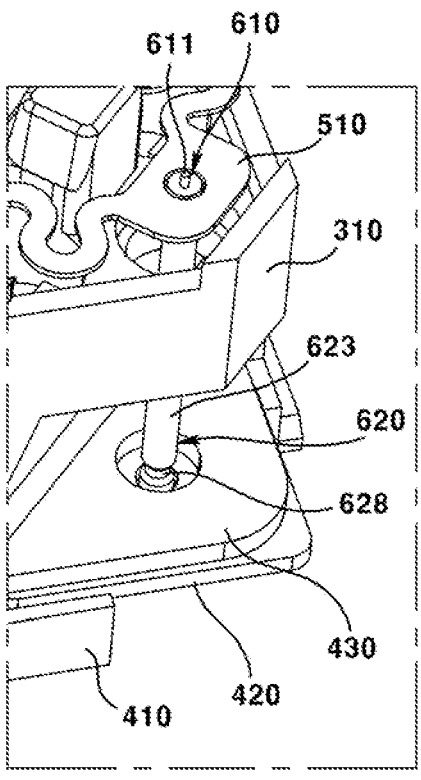
FIGS. 11b to 11d are diagrams for explaining a shape and a coupling structure of a support member of a lens driving device according to a first embodiment of the present invention.
Figure 11C:
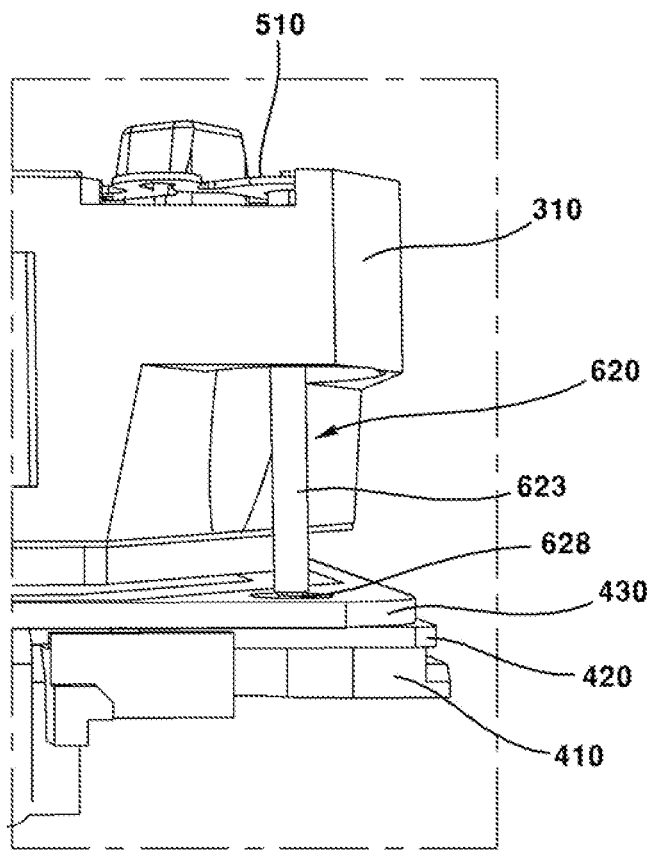
Figure 11D:
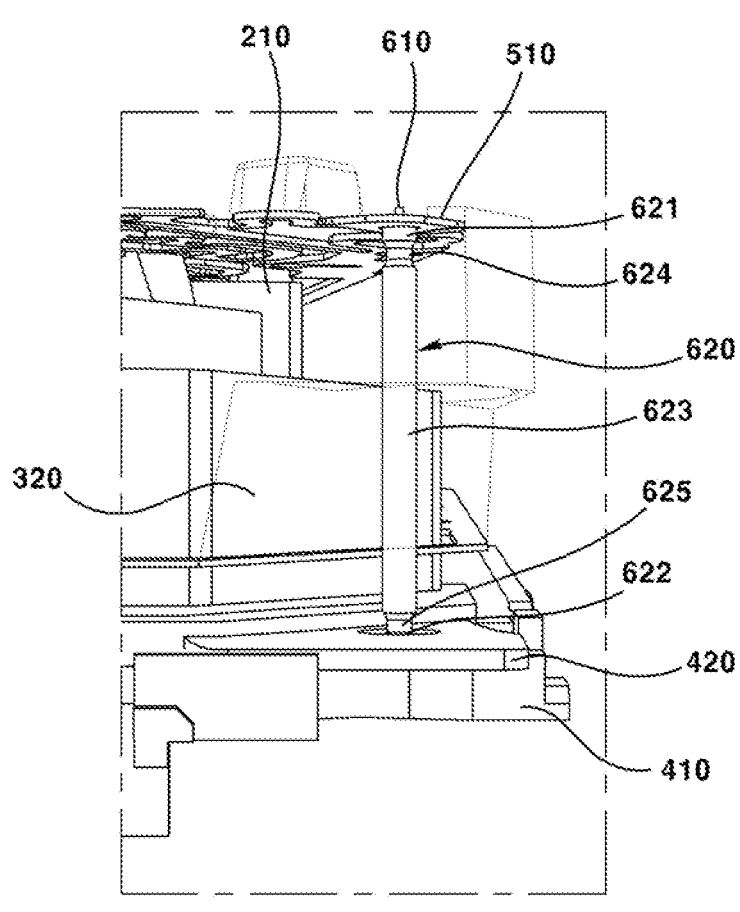
Figure 12:
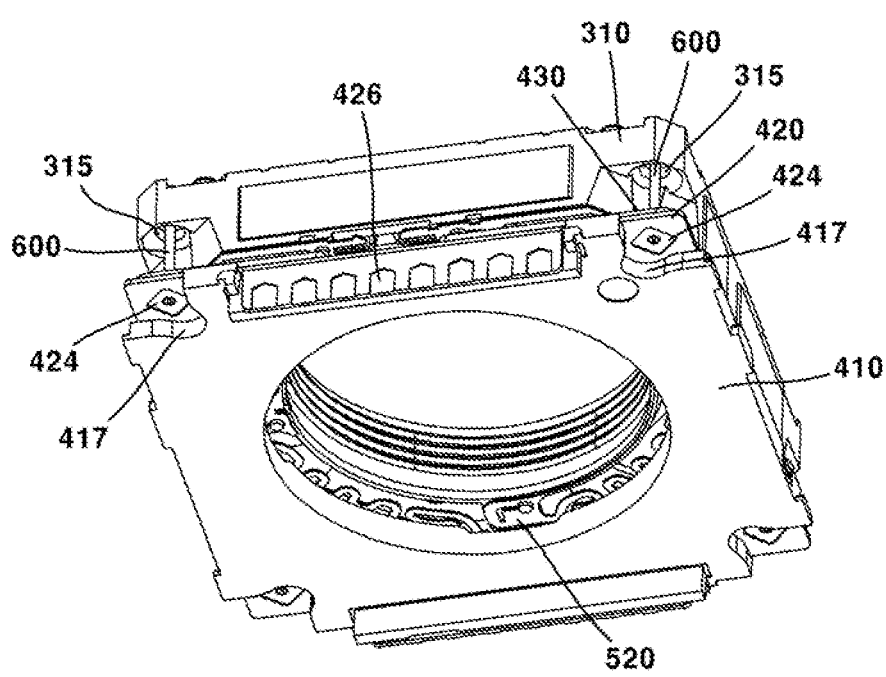
FIG. 12 is a bottom perspective view of a part of a lens driving device of a first embodiment of the present invention.
Figure 13A:
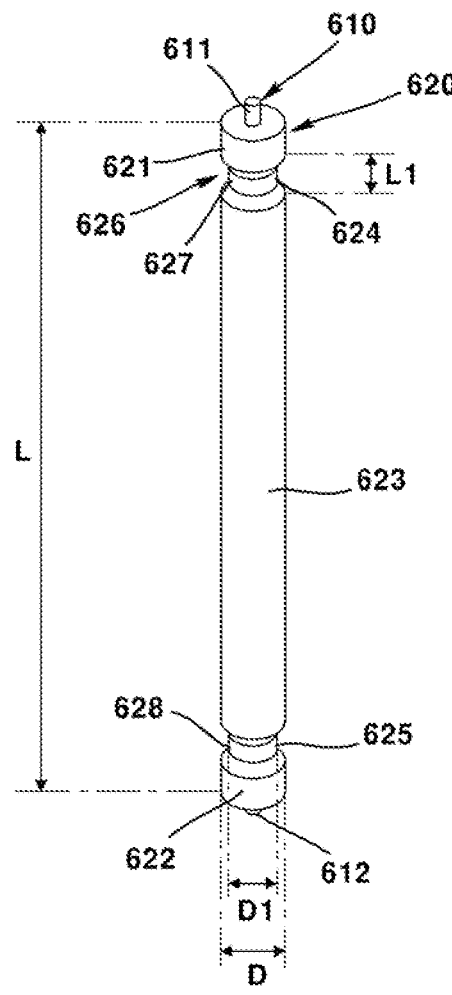
FIG. 13a is a perspective view of a support member of a lens driving device according to a first embodiment of the present invention.
Figure 13B:
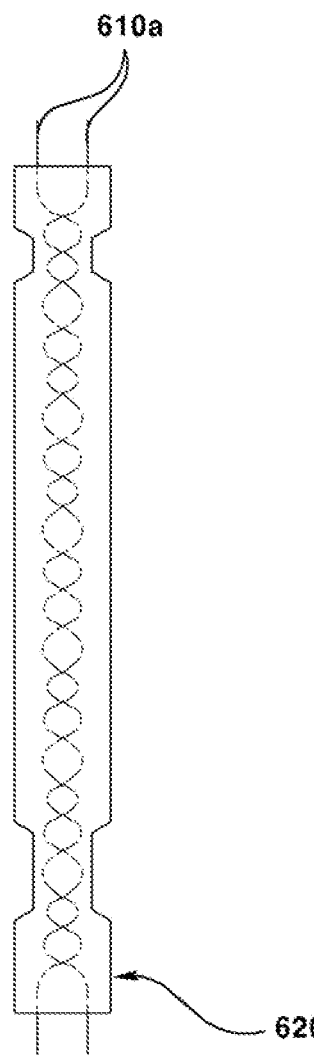
FIG. 13b is a view of a support member of a lens driving device according to a modified embodiment.
Figure 14:
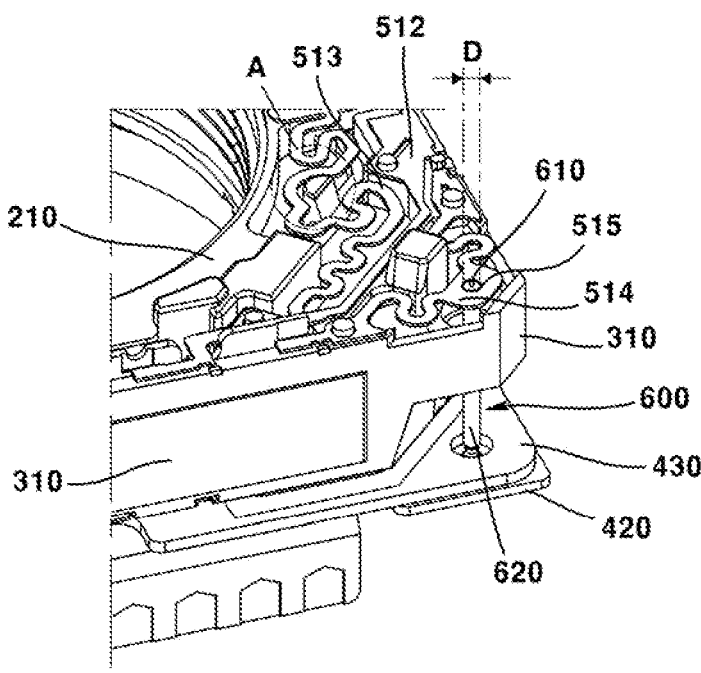
FIG. 14 is an enlarged perspective view of a part of a lens driving device according to a first embodiment of the present invention.
Figure 15:
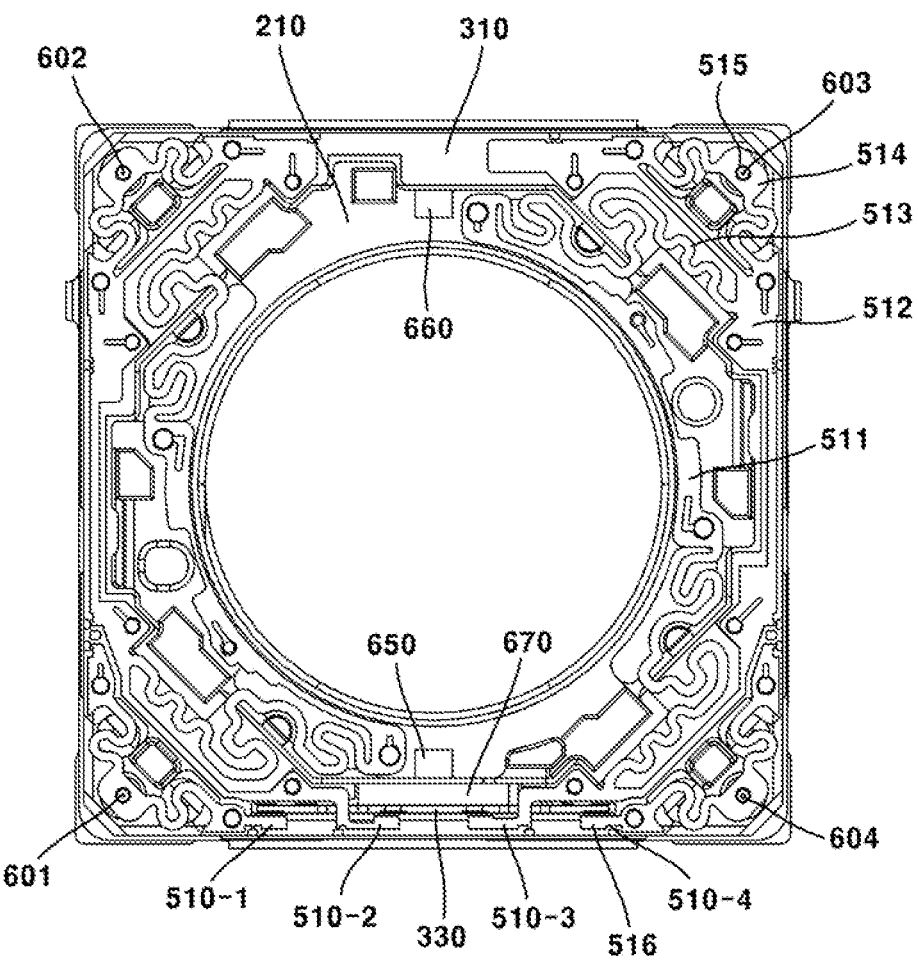
FIG. 15 is a plan view of a part of a lens driving device of a first embodiment of the present invention.

FIG. 1 is a perspective view of a lens driving device according to a first embodiment of the present invention; FIG. 2 is a cross-sectional view taken along line A-A of FIG. 1; FIG. 3 is a cross-sectional view taken along line B-B of FIG. 1; FIG. 4 is a cross-sectional view taken along line C-C of FIG. 1; FIG. 5 is an exploded perspective view of a lens driving device according to a first embodiment of the present invention; FIG. 6 is an exploded perspective view of a first actuator and related configuration of a lens driving device according to a first embodiment of the present invention; FIG. 7 is an exploded perspective view of a second mover and related configuration of a lens driving device according to a first embodiment of the present invention; FIG. 8 is an exploded perspective view of a stator of a lens driving device according to a first embodiment of the present invention; FIG. 9 is an exploded perspective view of an elastic member and a support member of a lens driving device according to a first embodiment of the present invention; FIG. 10 is a perspective view of a state in which the cover member is removed in FIG. 1; FIG. 11*a* is a perspective view of a state in which some configurations are omitted from FIG. 10; FIGS. 11*b* to 11*d* are diagrams for explaining a shape and a coupling structure of a support member of a lens driving device according to a first embodiment of the present invention; FIG. 12 is a bottom perspective view of a part of a lens driving device of a first embodiment of the present invention; FIG. 13*a* is a perspective view of a support member of a lens driving device according to a first embodiment of the present invention; FIG. 13*b* is a view of a support member of a lens driving device according to a modified embodiment; FIG. 14 is an enlarged perspective view of a part of a lens driving device according to a first embodiment of the present invention; and FIG. 15 is a plan view of a part of a lens driving device of a first embodiment of the present invention.

The lens driving device 10 may be a voice coil motor (VCM). The lens driving device 10 may be a lens driving motor. The lens driving device 10 may be a lens driving actuator. The lens driving device 10 may comprise an AF module. The lens driving device 10 may comprise an OIS module.

The lens driving device 10 may comprise a cover member 100. The cover member 100 may comprise a 'cover can'. The cover member 100 may be disposed at an outer side of the housing 310. The cover member 100 may be coupled to the base 410. The cover member 100 may accommodate the housing 310 therein. The cover member 100 may form the outer appearance of the lens driving device. The cover member 100 may have a hexahedral shape with an open lower surface. The cover member 100 may be a non-magnetic material. The cover member 100 may be formed of a metal material. The cover member 100 may be formed of a metal plate. The cover member 100 may be connected to a ground part of the printed circuit substrate 50. Through this, the cover member 100 may be grounded. The cover member 100 may block electromagnetic interference (EMI). At this time, the cover member 100 may be referred to as an 'EMI shield can'.

The cover member 100 may comprise an upper plate 110 and a side plate 120. The cover member 100 may comprise an upper plate 110 comprising a hole and a side plate 120 being extended downward from an outer circumference or edge of the upper plate 110. The lower end of the side plate 120 of the cover member 100 may be disposed in the step portion 412 of the base 410. The inner surface of the side plate 120 of the cover member 100 may be fixed to the base 410 by an adhesive.

The upper plate 110 of the cover member 100 may comprise a hole. A hole may comprise an 'opening'. The hole may be formed in the upper plate 110 of the cover member 100. When viewed from above, the lens can be seen through the hole. The hole may be formed in a size and shape corresponding to the lens. The size of the hole may be larger than the diameter of the lens module 20 so that the lens module 20 can be inserted through the hole and assembled. The light introduced through the hole may pass through the lens. At this time, the light passing through the lens may be converted into an electrical signal by the image sensor 60 and acquired as an image.

The lens driving device 10 may comprise a first mover 200. The first mover 200 may be coupled to a lens. The first mover 200 may be connected to the second mover 300 through an upper elastic member 510 and/or a second elastic member 520. The first mover 200 may move through interaction with the second mover 300. At this time, the first mover 200 may move integrally with the lens. Meanwhile, the first mover 200 may move during AF driving. At this time, the first mover 200 may be referred to as an 'AF mover'. However, the first mover 200 may move together with the second mover 300 even during OIS driving.

The first mover 200 may comprise a bobbin 210. The bobbin 210 may be disposed inside the housing 310. The bobbin 210 may be disposed in the hole 311 of the housing 310. The bobbin 210 may be movably coupled to the housing 310. The bobbin 210 may move in an optical axis direction against the housing 310. A lens may be coupled to the bobbin 210. The bobbin 210 and the lens may be coupled by screw-coupling and/or adhesive. A first coil 220 may be coupled to the bobbin 210. A first elastic member 510 may be coupled to an upper portion or upper surface of the bobbin 210. A second elastic member 520 may be coupled to a lower portion or lower surface of the bobbin 210. The bobbin 210 may be coupled to the first elastic member 510 and/or the second elastic member 520 by heat fusion and/or an adhesive. The adhesive coupling the bobbin 210 and the lens, and the bobbin 210 and the elastic member 500 may be an epoxy cured by at least one among ultraviolet rays (UV), heat, and a laser.

In the present embodiment, the bobbin 210 may not be disposed between the second magnet 650 and the first sensor 670. That is, in the present embodiment, the distance between the second magnet 650 and the first sensor 670 may be minimized. By minimizing the distance between the second magnet 650 and the first sensor 670, the strength of the magnetic force of the second magnet 650 detected by the first sensor 670 may be increased.

The bobbin 210 may comprise an upper surface 211. An inner side portion 511 of the first elastic member 510 may be disposed on the upper surface 211 of the bobbin 210. The upper surface 211 of the bobbin 210 may be disposed at a higher position than the upper surface of the second magnet 650. The upper surface 211 of the bobbin 210 may be spaced apart from the upper surface of the second magnet 650. Or, the upper surface 211 of the bobbin 210 may be disposed at the same height as the upper surface of the second magnet 650.

The bobbin 210 may comprise a groove 212. The groove 212 may be a recess. A second magnet 650 may be disposed in the groove 212. The groove 212 of the bobbin 210 may be formed in the upper surface 211 of the bobbin 210. The groove 212 of the bobbin 210 may be formed in an outer circumferential surface of the bobbin 210. At least a portion of the groove 212 of the bobbin 210 may be formed to correspond to the shape and size of the second magnet 650.

The bobbin 210 may comprise a recessed portion 213. The recessed portion 213 may be formed in a portion corresponding to the connection part 513 of the first elastic member 510. The recessed portion 213 may be formed by being recessed from the upper surface 211 of the bobbin 210. Through this, when the bobbin 210 moves upward from the initial state, interference between the connection part 513 of the first elastic member 510 and the bobbin 210 may be prevented. The recessed portion 213 may be spaced apart from the groove 212 of the bobbin 210.

The bobbin 210 may comprise a hole 214. The hole 214 may penetrate the bobbin 210 in an optical axis direction. The lens module 20 may be accommodated in the hole 214. For example, a thread corresponding to a thread formed on an outer circumferential surface of the lens module 20 may be disposed on an inner circumferential surface of the hole 214 of the bobbin 210.

The bobbin 210 may comprise a protruded portion 215. The protruded portion 215 may comprise a protrusion. The protruded portion 215 may be formed on the upper surface 211 of the bobbin 210. The protruded portion 215 may be protruded from the upper surface 211 of the bobbin 210. The protruded portion 215 may be coupled to the inner side portion 511 of the first elastic member 510. The protruded portion 215 may be inserted into the hole of the inner side portion 511 of the first elastic member 510. The protruded portion 215 may be coupled to a hole of the inner side portion 511.

The bobbin 210 may comprise a coil accommodating groove 216. The first coil 220 may be coupled to the coil accommodating groove 216. The coil accommodating groove 216 may be formed on an outer circumferential surface of the bobbin 210. The coil accommodating groove 216 may comprise a groove being formed as a portion of an outer side surface (outer lateral surface) of the bobbin 210 is recessed. The first coil 220 may be accommodated in the groove of the coil accommodating groove 216. The coil accommodating groove 216 may comprise a protrusion for supporting the lower surface of the first coil 220.

The bobbin 210 may comprise an upper stopper 217. The upper stopper 217 may be formed on the upper surface 211 of the bobbin 210. The upper stopper 217 may be formed to be protruded from the upper surface 211 of the bobbin 210. The upper stopper 217 may be overlapped with the upper plate 110 of the cover member 100 in an optical axis direction. The upper stopper 217 may form an uppermost end of the bobbin 210. Through this, when the bobbin 210 moves upward, the upper stopper 217 may be in contact with the upper plate 110 of the cover member 100. That is, the upper stopper 217 may physically limit the upper stroke of the bobbin 210.

The bobbin 210 may comprise a side stopper 218. The side stopper 218 may be formed on the side surface of the bobbin 210. The side stopper 218 may be formed to be protruded from the side surface of the bobbin 210. At least a portion of the side stopper 218 may be disposed in the second groove 313 of the housing 310. When the bobbin 210 rotates through this structure, the side stopper 218 of the bobbin 210 may be in contact with the housing 310. That is, the side stopper 218 of the bobbin 210 may limit the rotation of the bobbin 210.

The bobbin 210 may comprise a zig groove. The zig groove may be formed on the upper surface of the bobbin 210. A jig for preventing rotation of the bobbin 210 in the process of screw-coupling the lens module 20 to the bobbin 210 may be coupled to the zig groove.

The first mover 200 may comprise a first coil 220. The first coil 220 may be an 'AF driving coil' used for AF driving. The first coil 220 may be disposed in the bobbin 210. The first coil 220 may be disposed between the bobbin 210 and the housing 310. The first coil 220 may be disposed on an outer side surface or an outer circumferential surface of the bobbin 210. The first coil 220 may be directly wound in the bobbin 210. Or, the first coil 220 may be coupled to the bobbin 210 in a state of being directly wound. The first coil 220 may face the first magnet 320. The first coil 220 may be disposed to face the first magnet 320. The first coil 220 may electromagnetically interact with the first magnet 320. In this case, when a current is supplied to the first coil 220 and an electromagnetic field is formed around the first coil 220, the first coil 220 and the first magnet 320 can interact with each other by electromagnetic interaction. The coil 220 may move against the first magnet 320. The first coil 220 may be formed as a single coil. Or, the first coil 220 may comprise a plurality of coils being spaced apart from one another.

The first coil 220 may comprise a pair of lead wires for supplying power. At this time, one end portion (lead wire) of the first coil 220 is coupled to the first lower elastic unit 520-1, and the other end portion (lead wire) of the first coil 220 may be coupled to the second lower elastic unit 520-2. That is, the first coil 220 may be electrically connected to the second elastic member 520. In more detail, the first coil 220 may be supplied with power sequentially through a printed circuit substrate 50, a first substrate 420, a wire 610, a first elastic member 510, a second substrate 640, and a second elastic member 520. As a modified embodiment, the first coil 220 may be electrically connected to the first elastic member 510.

The lens driving device 10 may comprise a second mover 300. The second mover 300 may be movably coupled to the stator 400 through the support member 600. The second mover 300 may support the first mover 200 through the upper and second elastic members 510 and 520. The second mover 300 may move the first mover 200 or may move together with the first mover 200. The second mover 300 may move through interaction with the stator 400. The second mover 300 may move during OIS driving. At this time, the second mover 300 may be referred to as an 'OIS mover'. The second mover 300 may move integrally with the first mover 200 during OIS driving.

The second mover 300 may comprise a housing 310. The housing 310 may be spaced apart from the base 410. The housing 310 may be disposed at an outer side of the bobbin 210. The housing 310 may accommodate at least a portion of the bobbin 210. The housing 310 may be disposed inside the cover member 100. The housing 310 may be disposed between the cover member 100 and the bobbin 210. The housing 310 may be formed of a material different from that of the cover member 100. The housing 310 may be formed of an insulating material. The housing 310 may be formed of an injection-molded material. The outer side surface of the housing 310 may be spaced apart from the inner surface of the side plate of the cover member 100. Through the space between the housing 310 and the cover member 100, the housing 310 may move for OIS driving. A first magnet 320 may be disposed in the housing 310. The housing 310 and the first magnet 320 may be coupled by an adhesive. A first elastic member 510 may be coupled to an upper portion or upper surface of the housing 310. A second elastic member 520 may be coupled to a lower portion or lower surface of the housing 310. The housing 310 may be coupled to the first and second elastic members 510 and 520 by heat fusion and/or an adhesive. The adhesive coupling the housing 310 and the first magnet 320, and the housing 310 and the elastic member 500 may be an epoxy cured by at least one among ultraviolet rays (UV), heat, and a laser.

The housing 310 may comprise four side portions and four corner portions being disposed between the four side portions. The side portion of the housing 310 may comprise a first side portion, a second side portion being disposed at an opposite side of the first side portion, and a third side portion and a fourth side portion being disposed at an opposite side thereof between the first side portion and the second side portion. The corner portion of the housing 310 may comprise: a first corner portion being disposed between the first side portion and the third side portion; a second corner portion being disposed between the first side portion and the fourth side portion; a third corner portion being disposed between the second side portion and the third side portion; and a fourth corner portion being disposed between the second side portion and the fourth side portion. The side portion of the housing 310 may comprise a 'sidewall'.

The housing 310 may comprise a hole 311. The hole 311 may be formed in the housing 310. The hole 311 may be formed to penetrate through the housing 310 in an optical axis direction. A bobbin 210 may be disposed in the hole 311. The hole 311 may be formed in a shape corresponding to the bobbin 210 at least in part. An inner circumferential surface or an inner side surface of the housing 310 forming the hole 311 may be spaced apart from the outer circumferential surface of the bobbin 210. However, the housing 310 and the bobbin 210 may be overlapped with at least partially in an optical axis direction to limit the movement stroke distance of the bobbin 210 in an optical axis direction.

The housing 310 may comprise a first groove 312. The first groove 312 may be formed by being recessed in an upper surface of the housing 310. The first groove 312 may be formed at a position corresponding to the connection part 513 of the first elastic member 510. The first groove 312 may prevent interference between the first elastic member 510 and the housing 310 when the connection part 513 of the first elastic member 510 moves downward from the initial position.

The housing 310 may comprise a second groove 313. The second groove 313 may accommodate at least a portion of the side stopper 218 of the bobbin 210. The second groove 313 may be formed to have a predetermined gap between it and the side stopper 218.

The housing 310 may comprise a magnetic accommodating groove 314. A first magnet 320 may be coupled to the magnet accommodating groove 314. The magnet accommodating groove 314 may comprise a groove being formed as a portion of an inner circumferential surface and/or a lower surface of the housing 310 is recessed. A magnet accommodating groove 314 may be formed in each of the four corner portions of the housing 310. In a modified embodiment, a magnet accommodating groove 314 may be formed in each of the four side portions of the housing 310.

The housing 310 may comprise a hole 315. The hole 315 may be formed in a corner portion of the housing 310. The hole 315 may be formed to penetrate through the housing 310 in an optical axis direction. A support member 600 may be disposed in the hole 315 of the housing 310. The support member 600 may pass through the hole 315 of the housing 310.

The housing 310 may comprise a protrusion 316. The protrusion 316 may be formed on an upper surface of the housing 310. The protrusion 316 may be protruded from an upper surface of the housing 310. The protrusion 316 may be coupled to the outer side portion 512 of the upper elastic member 510. The protrusion 316 may be inserted into the hole of the outer side portion 512 of the upper elastic member 510.

The housing 310 may comprise an upper stopper 317. The upper stopper 317 may be protruded from an upper surface of the housing 310. The upper stopper 317 may be formed on an upper surface of the housing 310. The upper stopper 317 may be overlapped with an upper plate 110 of the cover member 100 in an optical axis direction. The upper stopper 317 may form an uppermost end of the housing 310. Through this, when the housing 310 moves upward, the upper stopper 317 may be in contact with the upper plate 110 of the cover member 100. That is, the upper stopper 317 may limit the upward movement of the housing 310.

The housing 310 may comprise a side stopper 318. The side stopper 318 may be protruded from an outer side surface of the housing 310. The side stopper 318 may face the inner surface of the side plate 120 of the cover member 100. The side stopper 318 may be in contact with the side plate 120 of the cover member 100 when the housing 310 moves in a lateral direction. That is, the side stopper 318 may physically limit the stroke of the housing 310 in a lateral direction.

The second mover 300 may comprise a first magnet 320. The first magnet 320 may be disposed in the housing 310. The first magnet 320 may be fixed to the housing 310 by an adhesive. The first magnet 320 may be disposed between the bobbin 310 and the housing 310. The first magnet 330 may face the first coil 220. The first magnet 320 may electromagnetically interact with the first coil 220. The first magnet 320 may face the second coil 430. The first magnet 320 may electromagnetically interact with the second coil 430. The first magnet 320 may be commonly used for AF driving and OIS driving. The first magnet 320 may be disposed in a corner portion of the housing 310. At this time, the first magnet 320 may be a corner magnet having an inner side surface having a larger hexahedral shape than an outer side surface. As a modified embodiment, the first magnet 320 may be disposed in a side portion of the housing 310. At this time, the first magnet 320 may be a flat magnet having a flat plate shape.

The first magnet 320 may comprise a plurality of magnets. The first magnet 320 may comprise four magnets, and the first magnet 320 may comprise a plurality of magnets. The first magnet 320 may comprise four magnets. The first magnet 320 may comprise first to fourth driving magnets being disposed at first to fourth corners.

The lens driving device 10 may comprise a second substrate 330. The second substrate 330 may be disposed in the housing 310. The second substrate 330 may be disposed on one sidewall of the housing 310. The second substrate 330 may be coupled to the first sensor 670. The second substrate 330 may be electrically connected to the first sensor 670. The second substrate 330 may be coupled to the first elastic member 510. The second substrate 330 may not be overlapped with an imaginary line connecting the first corner portion of the housing 310 and an optical axis.

The second substrate 330 may comprise terminals. The second substrate 330 may comprise a plurality of terminals. The second substrate 330 may comprise an upper terminal 331. The second substrate 330 may comprise four terminals being disposed at an upper portion of the second substrate 330. That is, the upper terminal 331 may comprise four terminals. Four terminals of the second substrate 330 may be electrically connected to the first substrate 420 through four upper elastic units and four wires 610. The terminal of the second substrate 330 may comprise a first terminal, a second terminal, and a third terminal and a fourth terminal being disposed between the first terminal and the second terminal. At this time, the housing 310 may comprise a first corner portion and a second corner portion adjacent to the first corner portion, and the first terminal may be adjacent to the first corner portion, and the second terminal may be adjacent to the second corner portion. The first terminal may be connected to the first wire through the first upper elastic unit 510-1. The second terminal may be connected to the fourth wire through the fourth upper elastic unit 510-4. The first terminal and the second terminal of the second substrate 330 may be terminals for providing a power signal to the first sensor 670.

The third terminal may be connected to the second wire through the second upper elastic unit 510-2. The fourth terminal may be connected to the third wire through the third upper elastic unit 510-3. At this time, the second wire may be disposed on the third corner portion of the housing 310 and the third wire may be disposed on the fourth corner portion of the housing 310. The third terminal may be a terminal for providing a clock signal to the first sensor 670. The fourth terminal may be a terminal for providing a data signal to the first sensor 670.

The second substrate 330 may comprise a lower terminal 332. The second substrate 330 may comprise two terminals being disposed below the second substrate 330. That is, the lower terminal 332 may comprise two terminals. The two terminals of the second substrate 330 may be electrically connected to the first coil 220 through the two lower elastic units.

The lens driving device 10 may comprise a stator 400. The stator 400 may be disposed below the first and second movers 200 and 300. The stator 400 may movably support the second mover 300. The stator 400 may move the second mover 300. At this time, the first mover 200 may also move together with the second mover 300.

The stator 400 may comprise a base 410. The base 410 may be disposed below the housing 310. The base 410 may be disposed below the first substrate 420. A first substrate 420 may be disposed on the upper surface of the base 410.

The base 410 may be coupled to the cover member 100. The base 410 may be disposed above the printed circuit substrate 50.

The base 410 may comprise a hole 411. The hole 411 may be a hollow hole formed in the base 410. The hole 411 may penetrate the base 410 in an optical axis direction. Light passing through the lens module 20 through the hole 411 may be incident on the image sensor 60.

The base 410 may comprise a step portion 412. The step portion 412 may be formed on a side surface of the base 410. The step portion 412 may be formed around the outer circumferential surface of the base 410. The step portion 412 may be formed when a portion of the side surface of the base 410 is protruded or recessed. The lower end of the side plate 120 of the cover member 100 may be disposed in the step portion 412.

The base 410 may comprise a groove 413. A terminal unit 426 of the first substrate 420 may be disposed in the groove 413. The groove 413 may be formed by recessing a portion of the side surface of the base 410. The width of the groove 413 may be formed to correspond to the width of the terminal unit 426 of the first substrate 420. The length of the groove 413 may be formed to correspond to the length of the terminal unit 426 of the first substrate 420. Or, since the length of the terminal unit 426 of the first substrate 420 is longer than the length of the groove 413, a part of the terminal unit 426 may be protruded below the base 410.

The base 410 may comprise a sensor accommodating groove 414. The OIS sensor 650 may be disposed in the sensor accommodating groove 414. The sensor accommodating groove 414 may accommodate at least a portion of the OIS sensor 650. The sensor accommodating groove 414 may comprise a groove being formed as an upper surface of the base 410 is recessed. The sensor accommodating groove 414 may comprise two grooves. At this time, the OIS sensor 650 is disposed in each of the two grooves to detect the movement in the X-axis direction and the movement in the Y-axis direction of the first magnet 320.

The base 410 may comprise a groove 415. The groove 415 may be formed on an upper surface of the base 410. An adhesive may be disposed in the groove 415. The adhesive disposed in the groove 415 may fix the first substrate 420 to the base 410. A conductive adhesive member may be disposed in the groove 415. The first substrate 420 and the second coil 430 may be electrically connected to each other by a conductive adhesive member disposed in the groove 415.

The base 410 may comprise a protruded portion 416. The protruded portion 416 may be formed on an upper surface of the base 410. The protruded portion 416 may be formed on an outer circumferential surface of the base 410. The protruded portion 416 may be formed on an outer side of the first substrate 420. The protruded portion 416 may be formed on both sides of the first substrate 420 to guide the position of the first substrate 420.

The stator 400 may comprise a first substrate 420. The first substrate 420 may be disposed between the base 410 and the housing 310. The first substrate 420 may be disposed on an upper surface of the base 410. The first substrate 420 may comprise a first magnet 320 being opposite to a second coil 430. The first substrate 420 may supply power to the second coil 430. A support member 600 may be coupled to the first substrate 420. The first substrate 420 may be coupled to the printed circuit substrate 50 being disposed below the base 410 by solder. The first substrate 420 may comprise a flexible printed circuit substrate (FPCB, flexible printed circuit substrate). The first substrate 420 may be partially bent.

The first substrate 420 may comprise a body part 421. A hole 422 may be formed in the body part 421. The hole 422 may be hollow penetrating through the first substrate 420 in an optical axis direction. The first substrate 420 may comprise a hole 423. A support member 600 may be disposed in the hole 423 of the first substrate 420. The support member 600 may be disposed to pass through the hole 423 of the first substrate 420.

The first substrate 420 may comprise a first terminal 424. The first terminal 424 may be disposed on a lower surface of the first substrate 420. The first terminal 424 may be disposed around the hole 423. The first terminal 424 may be connected to the wire 610 by a conductive member. The first substrate 420 may comprise a second terminal 425. The second terminal 425 may be disposed on a lower surface of the first substrate 420. The second terminal 425 may be disposed on an edge of the first substrate 420. The second terminal 425 may be connected to the second coil 430 by a conductive member.

The first substrate 420 may comprise a terminal unit 426. The terminal unit 426 may be extended downward from the body part 421 of the first substrate 420. The terminal unit 426 may be formed as a portion of the first substrate 420 is bent. At least a portion of the terminal unit 426 may be exposed to the outside. The terminal unit 426 may be coupled to the printed circuit substrate 50 being disposed below the base 410 by soldering. The terminal unit 426 may be disposed in the groove 413 of the base 410. The terminal unit 426 may comprise a plurality of terminals 427.

The stator 400 may comprise a second coil 430. The second coil 430 may be a configuration of the first substrate 420, but may be a separate configuration from the first substrate 420. The second coil 430 may electromagnetically interact with the first magnet 320. In this case, when a current is supplied to the second coil 430 to form a magnetic field around the second coil 430, first magnet 320 may move against the second coil 430 by electromagnetic interaction between the second coil 430 and the first magnet 320. The second coil 430 may move the housing 310 and the bobbin 210 in a direction perpendicular to the optical axis against the base 410 through electromagnetic interaction with the first magnet 320. The second coil 430 may be a fine pattern coil (FP coil) being integrally formed in the substrate part 431. The second coil 430 may comprise a substrate part 431 and a coil unit 432 formed in the substrate part 431. In a modified embodiment, the second coil 430 may be provided with only the coil unit 432 omitting the substrate part 431. The second coil 430 may comprise a substrate. At this time, the substrate may be referred to as a second substrate to distinguish it from the first substrate 420.

The lens driving device 10 may comprise an elastic member 500. The elastic member 500 may have elasticity at least in part. The elastic member 500 may be formed of metal. The elastic member 500 may be formed of a conductive material. The elastic member 500 may be coupled to the bobbin 210 and the housing 310. The elastic member 500 may elastically support the bobbin 210. The elastic member 500 may movably support the bobbin 210. The elastic member 500 may support the movement of the bobbin 210 during AF driving. That is, the elastic member 500 may comprise an 'AF support member'. The elastic member 500 may movably support the housing 310. That is, the elastic member 500 may comprise an 'OIS support member'.

The elastic member 500 may comprise a first elastic member 510. The first elastic member 510 may be an 'upper elastic member'. The first elastic member 510 may connect the housing 310 and the bobbin 210. The first elastic member 510 may be coupled to an upper portion of the bobbin 210 and an upper portion of the housing 310. The first elastic member 510 may be coupled to an upper surface of the bobbin 210. The first elastic member 510 may be coupled to an upper surface of the housing 310. The first elastic member 510 may be coupled to the support member 600. The first elastic member 510 may be formed of a leaf spring. A portion of the first elastic member 510 may be separated and used as an electrical signal, communication, or power line.

The first elastic member 510 may comprise a plurality of upper elastic units. The first elastic member 510 may comprise four upper elastic units. The first elastic member 510 may comprise first to fourth upper elastic units 510-1, 510-2, 510-3, and 510-4. The first to fourth upper elastic units 510-1, 510-2, 510-3, and 510-4 may connect four upper terminals 331 of the second substrate 330 and four wires. Each of the four upper elastic units 510-1, 510-2, 510-3, and 510-4 may comprise a body part being coupled to the housing 310 and a connection terminal being connected to the terminal of the second substrate 330.

The first elastic member 510 may comprise an inner side portion 511. The inner side portion 511 may be coupled to the bobbin 210. The inner side portion 511 may be coupled to an upper surface of the bobbin 210. The inner side portion 511 may comprise a hole or groove being coupled to the protruded portion 215 of the bobbin 210. The inner side portion 511 may be fixed to the bobbin 210 by an adhesive.

The first elastic member 510 may comprise an outer side portion 512. The outer side portion 512 may be coupled to the housing 310. The outer side portion 512 may be coupled to an upper surface of the housing 310. The outer side portion 512 may comprise a hole or groove being coupled to the protrusion 316 of the housing 310. The outer side portion 512 may be fixed to the housing 310 by an adhesive.

The first elastic member 510 may comprise a connection part 513. The connection part 513 may connect the inner side portion 511 and the outer side portion 512. The connection part 513 may have elasticity. At this time, the connection part 513 may be referred to as an 'elastic part'. The connection part 513 may be formed by bending twice or more. The connection part 513 may not be overlapped with the second magnet 650 in an optical axis direction.

The first elastic member 510 may comprise an extension part 514. The extension part 514 may be extended from the outer side portion 512. The extension part 514 may be coupled to the support member 600. The extension part 514 may comprise a hole 515. The extension part 514 may comprise a hole 515 through which the wire 610 of the support member 600 passes. The extension part 514 and the wire 610 may be coupled by solder.

The first elastic member 510 may comprise a terminal unit 516. The terminal unit 516 may be extended from the outer side portion 512. The terminal unit 516 may be coupled to the second substrate 330 by solder. The first elastic member 510 may comprise four terminal units 516 corresponding to the first to fourth upper elastic units 510-1, 510-2, 510-3, and 510-4.

The elastic member 500 may comprise a second elastic member 520. The second elastic member 520 may be a 'lower elastic member'. The second elastic member 520 may be disposed below the first elastic member 510. The second elastic member 520 may connect the bobbin 210 and the housing 310. The second elastic member 520 may be disposed below the bobbin 210. The second elastic member 520 may be coupled to the bobbin 210 and the housing 310. The second elastic member 520 may be coupled to a lower surface of the bobbin 210. The second elastic member 520 may be coupled to a lower surface of the housing 310. The second elastic member 520 may be formed of a leaf spring.

The second elastic member 520 may comprise a plurality of lower elastic units. The second elastic member 520 may comprise two lower elastic units. The second elastic member 520 may comprise first and second lower elastic units 520-1 and 520-2. The first and second lower elastic units 520-1 and 520-2 may connect the two lower terminals 332 of the second substrate 330 and the first coil 220 to each other.

The second elastic member 520 may comprise an inner side portion 521. The inner side portion 521 may be coupled to the bobbin 210. The inner side portion 521 may be coupled to a lower surface of the bobbin 210. The inner side portion 521 may comprise a hole or groove being coupled to the protrusion of the bobbin 210. The inner side portion 521 may be fixed to the bobbin 210 by an adhesive.

The second elastic member 520 may comprise an outer side portion 522. The outer side portion 522 may be coupled to the housing 310. The outer side portion 522 may be coupled to a lower surface of the housing 310. The outer side portion 522 may comprise a hole or groove being coupled to the protrusion of the housing 310. The outer side portion 522 may be fixed to the housing 310 by an adhesive.

The second elastic member 520 may comprise a connection part 523. The connection part 523 may connect the inner side portion 521 and the outer side portion 522. The connection part 523 may have elasticity. At this time, the connection part 523 may be referred to as an 'elastic part'. The connection part 523 may be formed by bending two or more times.

The lens driving device 10 may comprise a support member 600. The support member 600 may connect the substrate 420 and the first elastic member 510. The support member 600 may be coupled to each of the first elastic member 510 and the substrate 420 by soldering. The support member 600 may movably support the housing 310. The support member 600 may elastically support the housing 310. The support member 600 may have elasticity at least in part. The support member 600 may support the movement of the housing 310 and the bobbin 210 during OIS driving. The support member 600 may comprise an elastic member. The support member 600 may have elasticity.

The support member 600 may comprise a plurality of support members. The support member 600 may comprise four support members. The support member 600 may comprise first to fourth support members 601, 602, 603, and 604. The first support member 601 may be electrically connected to the first upper elastic unit 510-1. The second support member 602 may be electrically connected to the second upper elastic unit 510-2. The third support member 603 may be electrically connected to the third upper elastic unit 510-3. The fourth support member 604 may be electrically connected to the fourth upper elastic unit 510-4.

The support member 600 may comprise a wire 610. The wire 610 may comprise a wire spring. The wire 610 may have elasticity. The wire 610 may be an elastic member. The wire 610 may be formed of a conductive material. The wire 610 may be formed of metal. The wire 610 may electrically connect the first substrate 410 and the first elastic member 510. The wire 610 may connect the first substrate 410 and the first elastic member 510.

The outer circumferential surface of the wire 610 may be covered by the buffer part 620. At least a portion of the wire 610 may be protruded from the buffer part 620. An upper end portion and a lower end portion of the wire 610 may be protruded from the buffer part 620. The wire 610 may comprise a first portion 611 being protruded from the upper end of the buffer part 620 and a second portion 612 being protruded from the lower end of the buffer part 620. The first portion 611 of the wire 610 may be coupled to an upper surface of the first elastic member 510 by a conductive member. The second portion 612 of the wire 610 may be coupled to a lower surface of the substrate 420 by a conductive member.

In the present embodiment, the upper side portion of the wire 610 is connected to the first elastic member 510 which is a suspension spring portion, and the lower side portion may be connected to the stator 400 such as the base 410, the substrate 420, or the second coil 430. Stress is concentrated on the lower side portion of the wire 610 due to fall, impact, and vibration, and thereby deformation and disconnection may occur, but in the present embodiment, the wire 610 may be provided with a reinforcement structure made of an injection molding material. Through this, the accumulated fatigue caused by the injection molding can be eliminated. Also, the spring constant in an optical axis direction may increase. Furthermore, the spring strength may be increased to increase the resonant frequency, so that the frequency characteristic may be improved.

In a modified embodiment, the wire 610 of the support member 600 may comprise a plurality of wires. A plurality of wires may be disposed in the buffer part 620 in a twisted form as shown in FIG. 13b. That is, a plurality of wires may be disposed in one buffer part 620. In addition, a plurality of wires may be disposed on each of the four support members.

The support member 600 may comprise a buffer part 620. The buffer part 620 may be formed of a material different from that of the wire 610. The buffer part 620 may surround at least a portion of the wire 610. The buffer part 620 may surround the wire 610 from the first elastic member 510 to the substrate 420. The buffer part 620 may be formed of a non-conductive material. The buffer part 620 may be formed of an elastomer. The buffer part 620 may be formed of an injection molding material. The buffer part 620 may have a circular cross-section in a direction perpendicular to the optical axis. In a modified embodiment, the buffer part 620 may have a polygonal cross-section in a direction perpendicular to the optical axis.

In the present embodiment, a plastic injection molding product may surround the outside of the OIS wire 610. In the present embodiment, the material of the buffer part 620 may be formed of a general injection molding or a rubber material. A conductive wire 610 (comprising an elastic material) may be disposed at the center or outside of the buffer part 620. A soldering portion may be protruded from the upper and lower side portions of the support member 600. The soldering portion may be the first portion 611 and the second portion 612 of the wire 610. The upper side portion may be electrically connected to the first elastic member 510 and the lower side portion may be electrically connected to the first substrate 420 or the second coil 430. For the electrical connection, communication and power signals are connected through the wire 610 and this may again be connected to a driver IC or a Hall device through the first elastic member 510 and the second substrate 330.

In the present embodiment, a damper effect can be obtained due to the material of the injection molding. However, when an additional damper effect is required, a first space (refer to A of FIG. 14) for applying the additional damper is secured. The damper being disposed in the first space may connect the connection part 513 of the first elastic member 510 and the bobbin 210. A protrusion of the bobbin 210 may be disposed in the first space. Although the present embodiment has been described based on the fact that the conductive wire 610 is simply comprised in the injection-molded product, in another embodiment, the conductive wire 610 may be comprised outside the injection-molded product. In particular, in order to improve the strength of the wire, two or more wires 610 may be disposed in parallel or twisted inside the injection molding.

The buffer part 620 may comprise a first fixing part 621. The first fixing part 621 may be connected to the first elastic member 510. The first fixing part 621 of the support member 600 may be disposed in the hole 515 of the extension part 514. At this time, the diameter of the hole 515 of the extension part 514 in a direction perpendicular to the optical axis (refer to D of FIG. 14) is the diameter of the first fixing part 621 of the support member 600 (refer to D of FIG. 13) may be the same.

The buffer part 620 may comprise a second fixing part 622. The second fixing part 622 may be connected to the first substrate 420. The second fixing part 622 may be disposed in the hole 423 of the first substrate 420.

The buffer part 620 may comprise an extension part 623. The extension part 623 may be disposed between the first fixing part 621 and the second fixing part 622. The diameter of the first fixing part 621, the diameter of the second fixing part 622, and the diameter of the extension part 623 may be the same. At this time, the diameter may be a diameter in a direction perpendicular to the optical axis.

The buffer part 620 may comprise a deformable part. The deformable part has a smaller size than other parts of the buffer part 620, that is, an outer diameter, so that deformation can easily occur during OIS driving. A deformable part may comprise a plurality of deformable parts.

The buffer part 620 may comprise a first deformable part 624. The first deformable part 624 may connect the first fixing part 621 and the extension part 623 to each other. A diameter in a direction perpendicular to the optical axis of the first deformable part 624 (refer to D1 in FIG. 13) may be smaller than a diameter in a direction perpendicular to the optical axis of the first fixing part 621 (refer to D in FIG. 13). A diameter D1 in a direction perpendicular to the optical axis of the first deformable part 624 may be smaller than a diameter D in a direction perpendicular to the optical axis of the extension part 623. The diameter D1 of the first deformable part 624 may be 20% to 80% of the diameter D of the first fixing part 621.

The buffer part 620 may comprise a second deformable part 625. The second deformable part 625 may connect the second fixing part 622 and the extension part 623 to each other. The diameter D1 of the second deformable part 625 in a direction perpendicular to the optical axis may be smaller than the diameter D of the second fixing part 622 in a direction perpendicular to the optical axis. The diameter D1 of the first deformable part 624 and the diameter D1 of the second deformable part 625 may be the same. At this time, the diameter may be a diameter in a direction perpendicular to the optical axis. The diameter D1 of the second deformable part 625 may be 20% to 80% of the diameter D of the second fixing part 622.

The first deformable part 624 may be a first concave part. The second deformable part 625 may be a second concave part. The deformable part may comprise a first deformable part 624 and a second deformable part 625. A portion of the buffer part 620 excluding the deformable part may be a body part. The buffer part 620 may comprise a body part and a deformable part. The buffer part 620 may comprise a body part and a concave part.

In the present embodiment, the spring constant (K) of the first elastic member 510 can be made higher, so that the frequency characteristic is improved and the posture difference in the Z-axis direction (optical axis direction) is improved so that the changes in resolution for posture can be reduced and the feedback system can operate more stably due to the improvement in frequency characteristics.

The deformable part comprising the first deformable part 624 and the second deformable part 625 is based on a circular shape, but may have a different shape of curvature, and the number of deformable parts may be plural according to the characteristics of the product. When the deformable part is provided in multiple configurations, the deformable part may be added to the part with the greatest displacement when moved left and right to improve stress. The shape of the deformable part may take some form such as partial bending or clamping.

The buffer part 620 may comprise a groove 636. The groove 626 may be formed by being recessed in an outer circumferential surface of the buffer part 620. The groove 626 may be spaced apart from the upper end and the lower end of the buffer part 620. The first deformable part 624 and the second deformable part 625 of the buffer part 620 may be formed by the groove 626. The groove 626 of the buffer part 620 may comprise a plurality of grooves. The groove 626 may comprise two grooves. The groove 626 of the buffer part 620 may comprise a first groove 627 adjacent to the upper end of the buffer part 620 and a second groove 628 adjacent to the lower end of the buffer part 620. The first deformable part 624 may be formed by the first groove 627. The second deformable part 625 may be formed by the second grove 628.

The length of each of the first groove 627 and the second groove 628 of the buffer part 620 in an optical axis direction (refer to L1 and L2 in FIG. 13) may be 3% to 40% of the length of the buffer part 620 in an optical axis direction (refer to L of FIG. 13). That is, the length of the first deformable part 624 and the second deformable part 625 in an optical axis direction may be 3% to 40% of the length of the buffer part 620 in an optical axis direction. The length of the second groove 628 of the buffer part 620 in an optical axis direction (refer to L2 of FIG. 13) may be longer than the length of the first groove 627 in an optical axis direction (refer to L1 of FIG. 13).

The lens driving device 10 may comprise a second magnet 650. The second magnet 650 may be a 'sensing magnet'. The second magnet 650 may be disposed in the bobbin 210. The second magnet 650 may be disposed on an upper surface of the first coil 220. The second magnet 650 may be detected by the first sensor 670. The second magnet 650 may face the first sensor 670. The second magnet 650 may be disposed at a side portion of the bobbin 210. That is, the second magnet 650 may be disposed to face the side portion of the housing 310. The second magnet 650 is disposed in the groove 212 of the bobbin 210 so that an upper surface of the second magnet 650 faces the first elastic member 510.

The lens driving device 10 may comprise a third magnet 660. The third magnet 660 may be a 'compensation magnet' and/or a 'sensing magnet'. The third magnet 660 may be disposed in the bobbin 210. The third magnet 660 may be disposed to achieve magnetic force balance with the second magnet 650. The third magnet 660 may be symmetrical with the second magnet 650 about an optical axis. The third magnet 660 may be disposed at a position corresponding to the second magnet 650 about an optical axis. The third magnet 660 may have a size and/or a shape corresponding to that of the second magnet 650 about an optical axis. A second magnet 650 may be disposed at one side of the bobbin 210, and a third magnet 660 may be disposed at the other side of the bobbin 210. The third magnet 660 may be disposed at a side portion of the bobbin 210. That is, the third magnet 660 may be disposed to be opposite to the side portion of the housing 310.

The lens driving device 10 may comprise a first sensor 670. The first sensor 670 may be used for AF feedback driving. At this time, the first sensor 670 may be referred to as an 'AF feedback driving sensor'. The first sensor 670 may detect the second magnet 650. The first sensor 670 may be disposed in the second substrate 330. The first sensor 670 may be disposed in the housing 310. As a modified embodiment, the first sensor 670 may be disposed in the bobbin 210. The first sensor 670 may detect the movement of the first mover 200. The first sensor 670 may comprise a Hall sensor. At this time, the Hall sensor may detect the movement of the bobbin 210 and the lens by detecting the magnetic force of the second magnet 650. The detected value detected by the first sensor 670 may be used for AF feedback control.

The first sensor 670 may comprise a driver IC. In this case, the driver IC may be described as comprising a Hall element serving as the first sensor 670. The driver IC may control the power applied to the first coil 220. The driver IC may be electrically connected to the first substrate 420 through the wire 610 of the support member 600. The driver IC may be electrically connected to the first coil 220 through the second elastic member 520.

The lens driving device 10 may comprise an OIS sensor 680. The OIS sensor 680 may be used for OIS feedback control. At this time, the OIS sensor 680 may be referred to as a 'sensor for driving OIS feedback'. The OIS sensor 680 may be disposed between the base 410 and the first substrate 420. The OIS sensor 680 may detect the movement of the second mover 300. The OIS sensor 680 may comprise a Hall sensor. At this time, the Hall sensor may detect the magnetic force of the first magnet 320 to detect the movement of the housing 310 and the first magnet 320. The detected value detected by the OIS sensor 680 may be used for OIS feedback control.

The lens driving device 10 may comprise a damper. The damper may comprise a plurality of dampers. The first damper may connect the support member 600 and the housing 310. The second damper may connect the bobbin 210 and the first elastic member 510 and/or the first elastic member 510 and the housing 310. Through this, it is possible to lower the peak of the primary resonant frequency. In other words, it is possible to dampen the spring and the movable part, and the spring and the fixing part.

The lens driving device 10 according to a first embodiment of the present invention may comprise a first sensor 1670 and a second sensor 1675 of a second embodiment.

Hereinafter, a support member of a lens driving device according to a modified embodiment will be described with reference to the drawings.

Figure 16A:
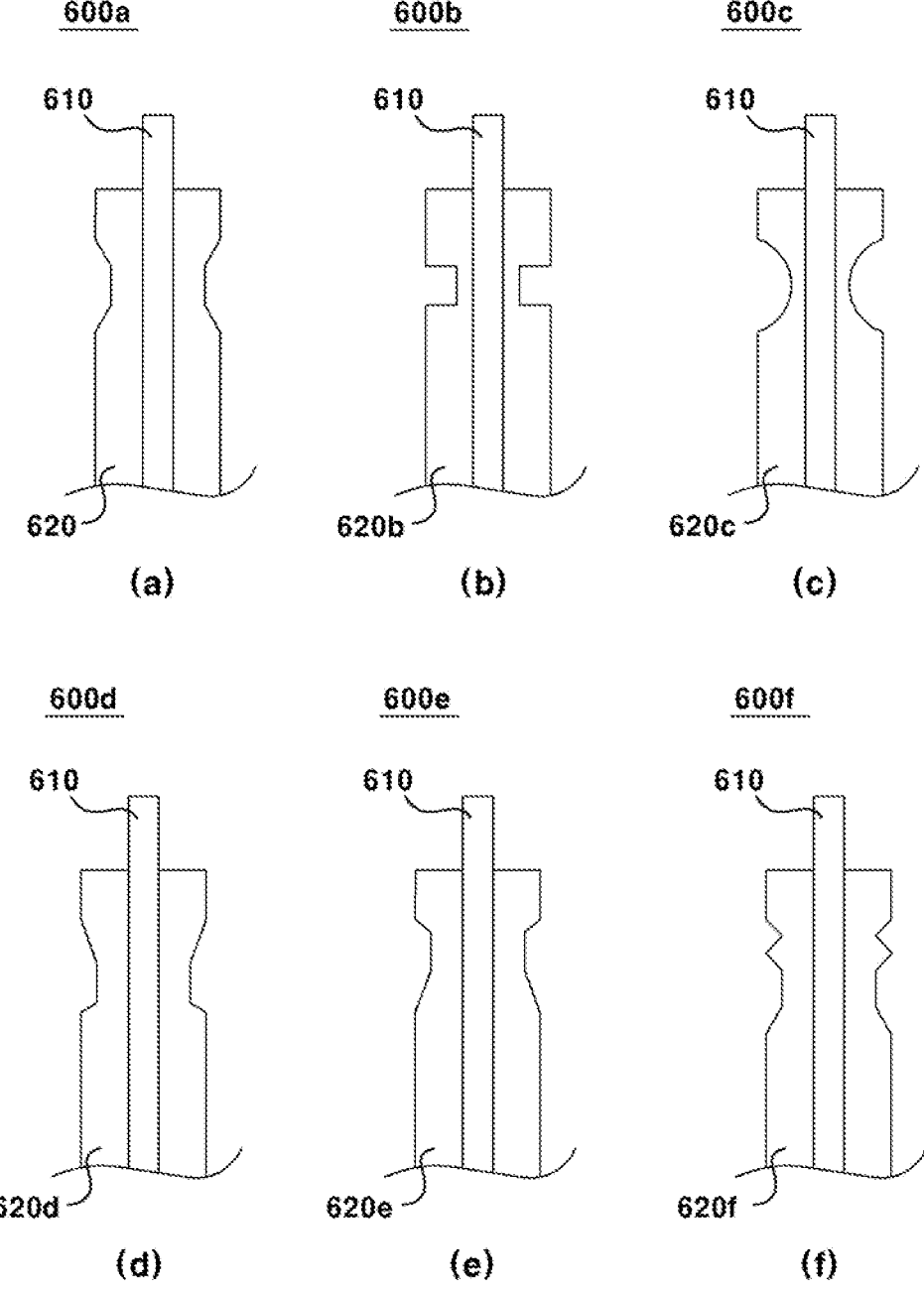
FIG. 16a (a) is a cross-sectional view of a support member of a lens driving device according to a first embodiment of the present invention.
Figure 16B:
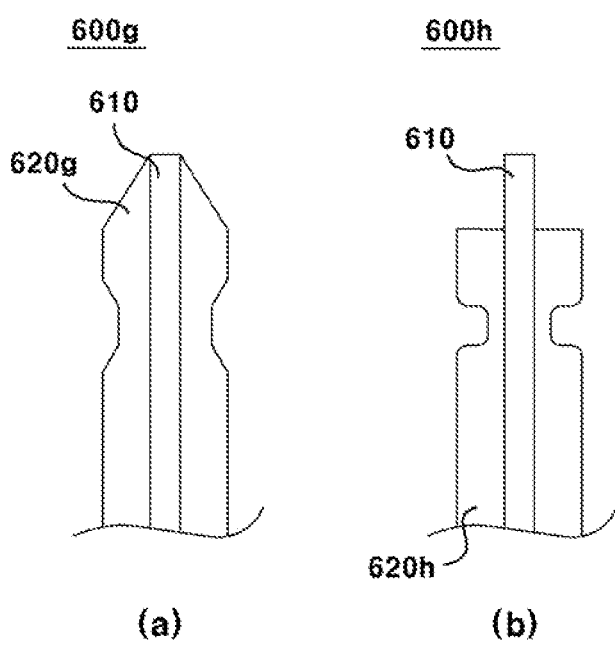
FIG. 16b (a) and (b) are cross-sectional views of a support member of a lens driving device according to a modified embodiment.
Figure 17:
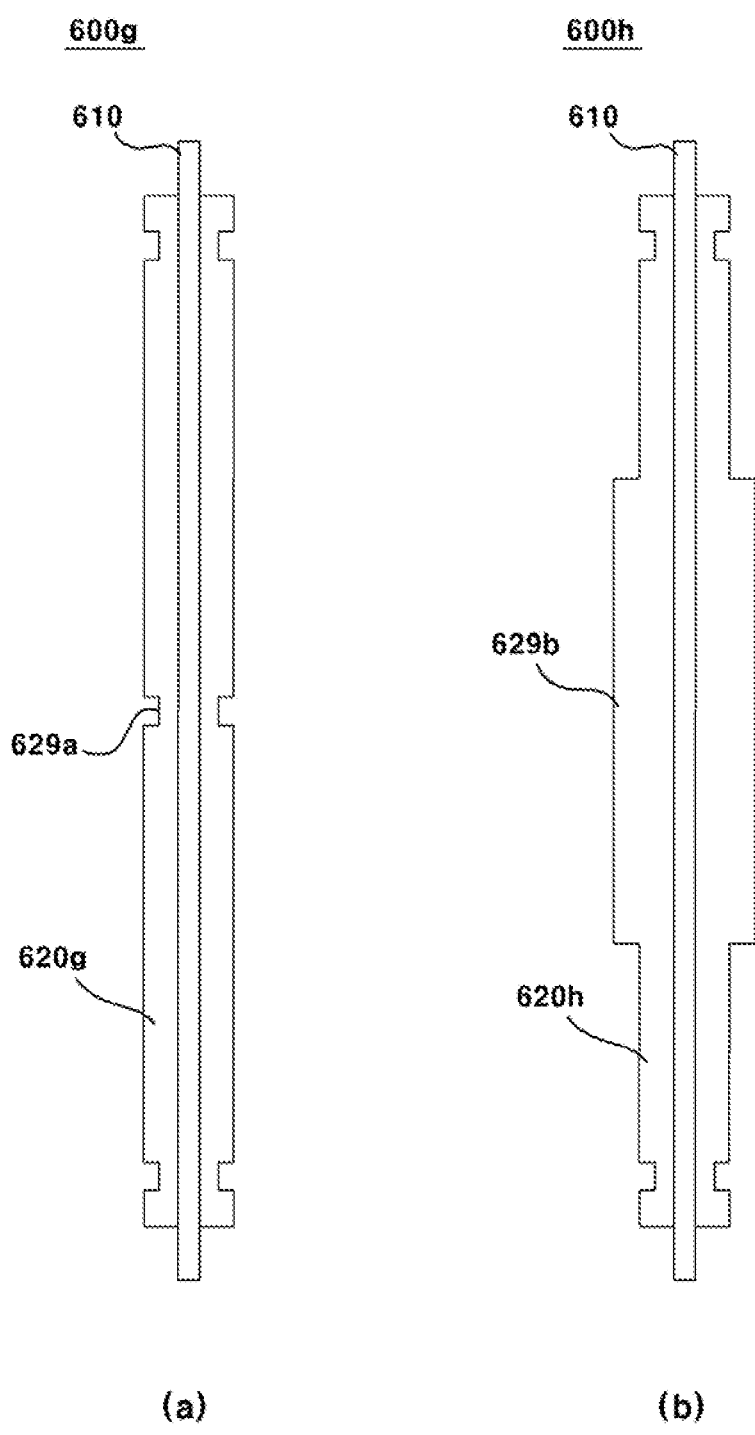
FIGS. 17 (a) and (b) are cross-sectional views of a support member of a lens driving device according to a modified embodiment.

FIG. 16a (a) is a cross-sectional view of a support member of a lens driving device according to a first embodiment of the present invention; and FIG. 16a (b) to (f) are cross-sectional views of a support member of a lens driving device according to a modified embodiment; FIG. 16b (a) and (b) are cross-sectional views of a support member of a lens driving device according to a modified embodiment;

FIGS. 17 (*a*) and (*b*) are cross-sectional views of a support member of a lens driving device according to a modified embodiment.

As illustrated in of FIG. 16*a* (a), the buffer part 620 may comprise a groove 626 being recessed from an outer circumferential surface of the buffer part 620. At this time, the groove 626 may comprise an inclined surface being inclinedly disposed with an outer circumferential surface.

As illustrated in of FIG. 16*a* (b), the buffer part 620*b* may comprise a groove 626 being recessed from an outer circumferential surface of the buffer part 620*b*. At this time, the groove 626 may comprise a plane orthogonal to an outer circumferential surface.

As illustrated in of FIG. 16*a* (c), the buffer part 620*c* may comprise a groove 626 being recessed from an outer circumferential surface of the buffer part 620*c*. At this time, the groove 626 may comprise a curved surface having a curvature.

As illustrated in of FIG. 16*a* (d), the buffer part 620*d* may comprise a groove 626 being recessed from an outer circumferential surface of the buffer part 620*d*. At this time, the groove 626 may comprise an inclined surface being inclinedly disposed with an outer circumferential surface. Furthermore, the inclined surface of the groove 626 may comprise a first inclined surface having a gentle inclination and a second inclined surface having a steep inclination. In the buffer part 620*d*, the first inclined surface may be disposed above the second inclined surface.

As illustrated in of FIG. 16*a* (e), the buffer part 620*e* may comprise a groove 626 being recessed from an outer circumferential surface of the buffer part 620*e*. At this time, the groove 626 may comprise an inclined surface being inclinedly disposed with an outer circumferential surface. Furthermore, the inclined surface of the groove 626 may comprise a first inclined surface having a gentle inclination and a second inclined surface having a steep inclination. In the buffer part 620*e*, the first inclined surface may be disposed below the second inclined surface.

As illustrated in of FIG. 16*a* (f), the buffer part 620*f* may comprise a groove 626 being recessed from an outer circumferential surface of the buffer part 620*f*. At this time, the groove 626 may comprise an inclined surface being inclinedly disposed with an outer circumferential surface. Furthermore, the groove 626 may comprise a plurality of grooves. That is, an additional groove may be provided.

As illustrated in FIG. 16*b* (a), the buffer part 620*g* may comprise a part being extended and gradually increasing in width from the upper end of the wire 610.

As illustrated in FIG. 16*a* (b), the buffer part 620*h* may comprise a groove. At this time, the edge of the groove may be formed to be rounded. That is, the groove may comprise a curved surface.

As illustrated in FIG. 17 (*a*), the buffer part 620 may comprise a plurality of grooves formed by being recessed in an outer circumferential surface of the buffer part 620. At this time, the plurality of grooves of the buffer part 620 may comprise three grooves spaced apart from each other in an optical axis direction. The three grooves may comprise a groove 629*a* being disposed in the central portion of the buffer part 620. The groove 629*a* may be formed of a plurality of grooves. At least one of the three grooves may comprise any one or more of a curved surface having a curvature and an inclined surface being inclined with an outer circumferential surface of the buffer part 620. The embodiment illustrated in FIGS. 16 (*a*) to (*f*) may be analogously applied to the embodiment illustrated in FIG. 17 (*a*).

As illustrated in FIG. 17 (*b*), the buffer part 620 may comprise a protrusion 629*b* being protruded from an outer circumferential surface of the buffer part 620. The protrusion 629*b* may be formed in the central portion of the buffer part 620. The protrusion 629*b* may comprise a plurality of protrusions spaced apart from each other.

The lens driving device 10 may comprise a fixing member. The fixing member may comprise a stator 400. The fixing member may comprise a base 410, a first substrate 420, and a second coil 430. The housing 310 may be disposed on the fixing member. The support member 600 may be disposed between the elastic member 500 and the fixing member. The support member 600 may comprise a wire 610 and a member being disposed around the wire 610. The member may comprise a buffer part 620. Based on the optical axis direction, the member may have a length greater than ½ of the length of the bobbin 210. The length of the bobbin 210 may be between the uppermost surface and the lowermost surface of the bobbin 210. Or, the length of the bobbin 210 may be between the uppermost end and the lowermost end of the bobbin 210. The wire 610 is protruded from one end of the member to be coupled to the elastic member 500, and may be protruded from the other end of the member to be coupled to the fixing member. One end of the wire 610 may be protruded from an upper surface of the member. The other end of the wire 610 may be protruded from the lower surface of the member.

The support member 600 may comprise a member having a columnar shape being disposed around the wire 610. The columnar shape can be a columnar shape of a circle or a polygon. The length of the member may be greater than or equal to the distance between the upper elastic member and the lower elastic member. The member may comprise a body part and a concave part. A concave part may contain a deformable part. The deformable part may be a part formed as a part of the body part is deformed. The length of the body part of the member may be greater than or equal to the distance between the upper elastic member and the lower elastic member.

The support member 600 may comprise a wire 610 and a member surrounding 50% or more of the wire 610. The member may comprise a covering portion. The member may comprise a cover portion. The member may comprise a body part and a concave part having a diameter smaller than that of the body part in a region adjacent to the elastic member 500. At this time, the body part may refer to all parts except the concave part. A concave part may be a deformable part. The concave part may comprise a first concave part adjacent to the upper elastic member and a second concave part adjacent to the lower elastic member. The second concave part may be disposed between the virtual extension surface being extended from an upper surface of the lower elastic member and a lower surface of the substrate.

The first concave part may be located within 5% of the total length of the body part from the end of the body part. The first concave part may be located within 4.8% of the total length of the body part from the end of the body part. The first concave part may be located within 0.12 mm from the end of the body part. A part of the wire 610 of the support member 600 may be protruded from the end of the body part. The wire 610 of the support member 600 may be protruded 0.08 mm from the end of the body part. The wire 610 of the support member 600 may be protruded within 4% of the total length of the support member 600 from the end of the body part. The wire 610 of the support member 600 may be protruded within 3% of the total length of the support member 600 from the end of the body part. At this time, the end of the body part can be the head or the fixing part. The length of the portion where the wire 610 of the support member 600 is protruded from the body part may be at least the thickness of the upper elastic member. The length of the part where the wire 610 of the support member 600 is protruded from the body part may be at least 0.04 mm.

In one embodiment, when the upper surface of the body part of the support member 600 is disposed at the same height as the upper surface of the upper elastic member, the length of the portion where the wire 610 of the support member 600 is protruded from the body part may be formed not to exceed 0.5 mm.

One end of the body part may be disposed at the same height as the upper elastic member. One end of the body part may be in contact with the upper elastic member. One end of the body part may be disposed below the upper elastic member. One end of the body part may be disposed inside the hole of the upper elastic member.

The other end of the body part may be disposed inside the hole of the first substrate 420. The other end of the body part may be in contact with the first substrate 420. The other end of the body part may be disposed above the first substrate 420. The other end of the body part may be disposed inside the hole of the substrate part 431 of the second coil 430.

The member of the support member 600 may have a length within 50 to 99% of the wire 600. The body part of the member may comprise fixing parts 621 and 622 and an extension part 623. The concave part may be positioned between the extension part 623 and the fixing parts 621 and 622. The fixing part may comprise a first fixing part 621 and a second fixing part 622. The first concave part may be positioned between the first fixing part 621 and the extension part 623. The second concave part may be positioned between the second fixing part 622 and the extension part 623. The length of the concave part may be 3-40% of the length of the member. The member may be formed of a material different from that of the wire 600. The member may be formed of a covering portion. The coating portion may be distinguished from a damper having viscosity. In a modified embodiment, the covering portion may be coupled to the housing 310.

Hereinafter, a camera module according to a first embodiment of the present invention will be described with reference to the drawings.

Figure 18:
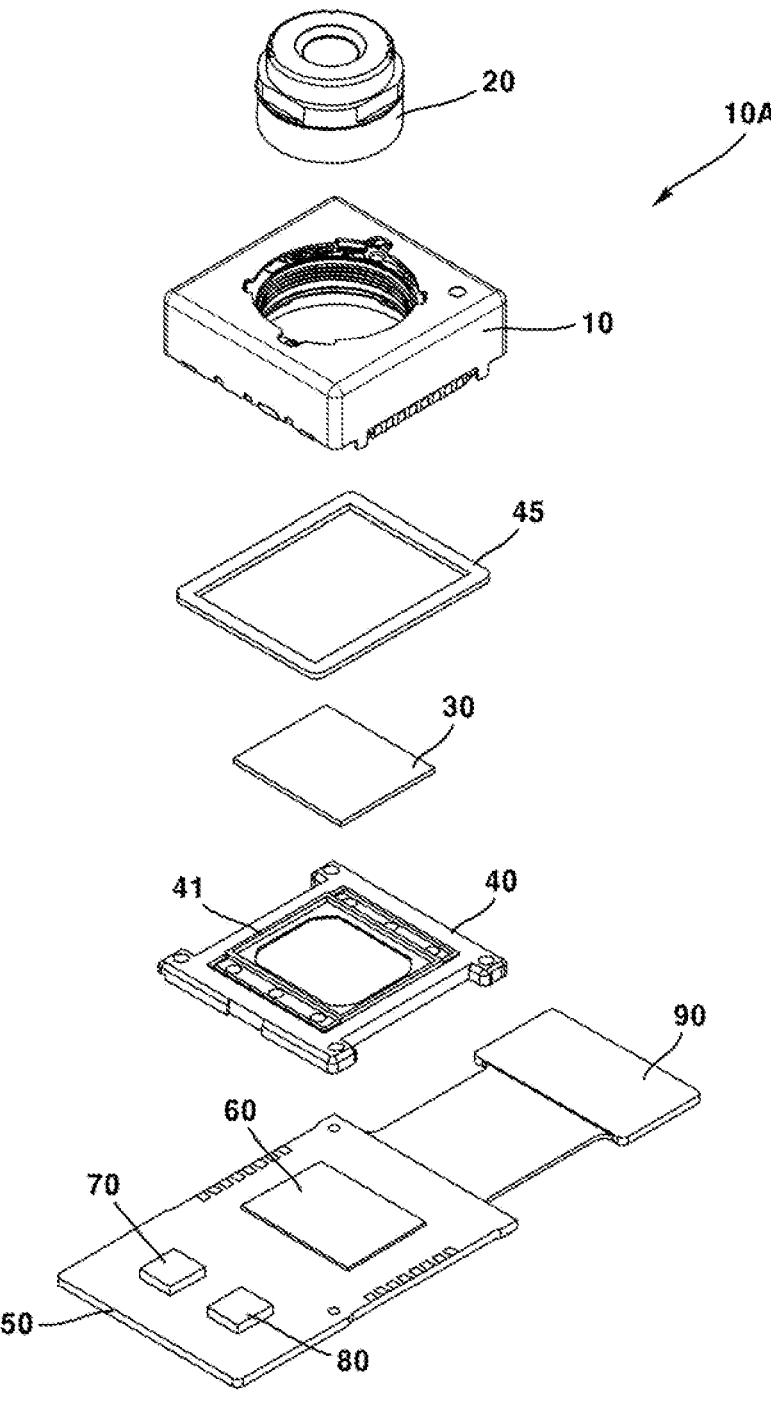
FIG. 18 is an exploded perspective view of a camera device according to the first embodiment of the present invention.

FIG. 18 is an exploded perspective view of a camera device according to the first embodiment of the present invention.

The camera module 10A may comprise a camera device.

The camera module 10A may comprise a lens module 20. The lens module 20 may comprise at least one lens. The lens may be disposed at a position corresponding to the image sensor 60. The lens module 20 may comprise a lens and a barrel. The lens module 20 may be coupled to the bobbin 210 of the lens driving device 10. The lens module 20 may be coupled to the bobbin 210 by screw-coupling and/or adhesive. The lens module 20 may move integrally with the bobbin 210.

The camera module 10A may comprise a filter 30. The filter 30 may serve to block light of a specific frequency band from being incident on the image sensor 60 in light passing through the lens module 20. The filter 30 may be disposed parallel to the x-y plane. The filter 30 may be disposed between the lens module 20 and the image sensor 60. The filter 30 may be disposed in the sensor base 40. In a modified embodiment, the filter 30 may be disposed in the base 410. The filter 30 may comprise an infrared filter. The infrared filter may block light of the infrared region from being incident on the image sensor 60.

The camera module 10A may comprise a sensor base 40. The sensor base 40 may be disposed between the lens driving device 10 and the printed circuit substrate 50. The sensor base 40 may comprise a protruded portion 41 in which the filter 30 is disposed. An opening may be formed in a portion of the sensor base 40 where the filter 30 is disposed so that light passing through the filter 30 may be incident on the image sensor 60. The adhesive member 45 may couple or attach the base 410 of the lens driving device 10 to the sensor base 40. The adhesive member 45 may additionally serve to prevent foreign substances from being introduced into the lens driving device 10. The adhesive member 45 may comprise any one or more among an epoxy, a thermosetting adhesive, and an ultraviolet curable adhesive.

The camera module 10A may comprise a printed circuit substrate (PCB) 50. The printed circuit substrate 50 may be a substrate or a circuit substrate. A lens driving device 10 may be disposed in the printed circuit substrate 50. A sensor base 40 may be disposed between the printed circuit substrate 50 and the lens driving device 10. The printed circuit substrate 50 may be electrically connected to the lens driving device 10. An image sensor 60 may be disposed in the printed circuit substrate 50. Various circuits, elements, control units, and the like may be provided in the printed circuit substrate 50 in order to convert an image formed on the image sensor 60 into an electrical signal and transmit it to an external device.

The camera module 10A may comprise an image sensor 60. The image sensor 60 may have a configuration in which light passing through a lens and a filter 30 is incident to form an image. The image sensor 60 may be mounted on a printed circuit substrate 50. The image sensor 60 may be electrically connected to the printed circuit substrate 50. For example, the image sensor 60 may be coupled to the printed circuit substrate 50 by a surface mounting technology (SMT). As another example, the image sensor 60 may be coupled to the printed circuit substrate 50 by a flip chip technology. The image sensor 60 may be disposed so that a lens and an optical axis coincide. That is, the optical axis of the image sensor 60 and the optical axis of the lens may be aligned. The image sensor 60 may convert light irradiated to the effective image region of the image sensor 60 into an electrical signal. The image sensor 60 may be any one among a charge coupled device (CCD), a metal oxide semi-conductor (MOS), a CPD, and a CID.

The camera module 10A may comprise a motion sensor 70. The motion sensor 70 may be mounted on the printed circuit substrate 50. The motion sensor 70 may be electrically connected to the control unit 80 through a circuit pattern provided on the printed circuit substrate 50. The motion sensor 70 may output rotational angular velocity information due to the movement of the camera module 10A. The motion sensor 70 may comprise a 2-axis or 3-axis gyro sensor, or an angular velocity sensor.

The camera module 10A may comprise a control unit 80. The control unit 80 may be disposed in the printed circuit substrate 50. The control unit 80 may be electrically connected to the first and second coils 1220 and 1430 of the lens driving device 10. The control unit 80 may individually control the direction, intensity, and amplitude of the current supplied to the first and second coils 220 and 430. The control unit 80 may control the lens driving device 10 to perform an autofocus function and/or an image stabilization function. Furthermore, the control unit 80 may perform auto focus feedback control and/or handshake correction feedback control for the lens driving device 10.

The camera module 10A may comprise a connector 90. The connector 90 may be electrically connected to the printed circuit substrate 50. The connector 90 may comprise a port for being electrically connected to an external device.

Hereinafter, an optical instrument according to a first embodiment of the present invention will be described with reference to the drawings.

Figure 19:
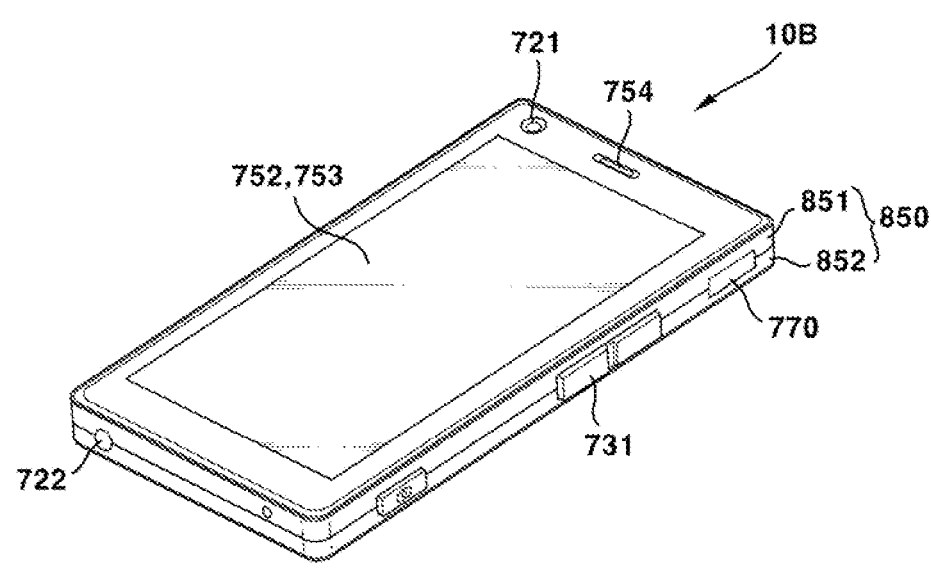
FIG. 19 is a perspective view illustrating an optical instrument according to a first embodiment of the present invention.
Figure 20:
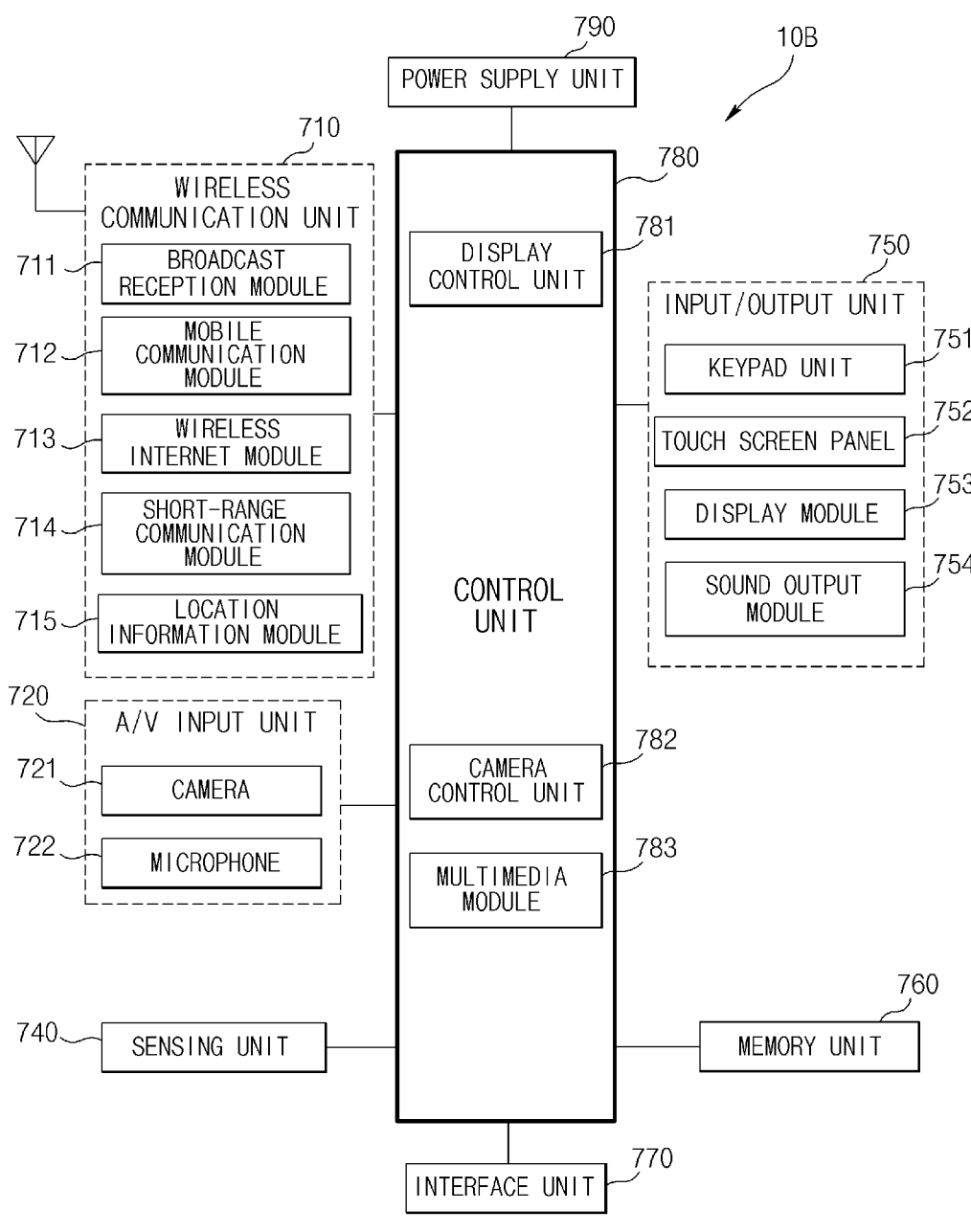
FIG. 20 is a block diagram of an optical instrument according to a first embodiment of the present invention.

FIG. 19 is a perspective view illustrating an optical instrument according to a first embodiment of the present invention; and FIG. 20 is a block diagram of an optical instrument according to a first embodiment of the present invention.

The optical instrument 10B may comprise a portable terminal. The optical instrument 10B may be any one among a hand phone, a portable phone, a smart phone, a portable smart device, a digital camera, a laptop computer, a digital broadcasting terminal, a personal digital assistant (PDA), a portable multimedia player (PMP), and navigation. However, the type of the optical instrument 10B is not limited thereto, and any device for photographing a video or a picture may be comprised in the optical instrument 10B.

The optical instrument 10B may comprise a main body 850. The main body 850 may have a bar shape. Or, the main body 850 may have various structures, such as a slide type, a folder type, a swing type, a swivel type, and the like in which two or more sub-bodies are coupled to be relatively movable. The main body 850 may comprise a case (casing, housing, and cover) forming an outer appearance. For example, the main body 850 may comprise a front case 851 and a rear case 852. Various electronic components of the optical instrument 10B may be embedded in a space formed between the front case 851 and the rear case 852. A display module 753 may be disposed on one surface of the main body 850. A camera 721 may be disposed on one or more surfaces of one surface and the other surface being disposed at an opposite side of the one surface of the main body 850.

The optical instrument 10B may comprise a wireless communication unit 710. The wireless communication unit 710 may comprise one or more modules enabling wireless communication between the optical instrument 10B and the wireless communication system, or between the optical instrument 10B and the network in which the optical instrument 10B is located. For example, the wireless communication unit 710 may comprise any one or more among a broadcast reception module 711, a mobile communication module 712, a wireless Internet module 713, a short-range communication module 714, and a location information module 715.

The optical instrument 10B may comprise an A/V input unit 720. The A/V input unit 720 is for inputting an audio signal or a video signal and may comprise any one or more of a camera 721 and a microphone 722. At this time, the camera 721 may comprise a camera module 10A according to the present embodiment.

The optical instrument 10B may comprise a sensing unit 740. The sensing unit 740 may generate a sensing signal for controlling the operation of the optical instrument 10B by detecting the current state of the optical instrument 10B such as the opening/closing state of the optical instrument 10B, the position of the optical instrument 10B, the presence or absence of user contact, the orientation of the optical instrument 10B, acceleration/deceleration of the optical instrument 10B, and the like. For example, when the optical instrument 10B is in the form of a slide phone, it is possible to sense whether the slide phone is opened or closed. In addition, it is responsible for sensing functions related to whether the power supply unit 790 is supplied with power, whether the interface unit 770 is coupled to an external device, and the like.

The optical instrument 10B may comprise an input/output unit 750. The input/output unit 750 may be configured to generate an input or output related to visual, auditory, or tactile sense. The input/output unit 750 may generate input data for controlling the operation of the optical instrument 10B, and may output information processed by the optical instrument 10B.

The input/output unit 750 may comprise any one or more among a keypad unit 751, a touch screen panel 752, a display module 753, and a sound output module 754. The keypad unit 751 may generate input data in response to a keypad input. The touch screen panel 752 may convert a change in capacitance generated due to a user's touch on a specific area of the touch screen into an electrical input signal. The display module 753 may output an image photographed by the camera 721. The display module 753 may comprise a plurality of pixels whose color changes according to an electrical signal. For example, the display module 753 may comprise at least one among a liquid crystal display, a thin film transistor liquid crystal display, an organic light emitting diode, a flexible display, and a 3D display. The sound output module 754 may output audio data received from the wireless communication unit 710 in a call signal reception, a call mode, a recording mode, a voice recognition mode, or a broadcast reception mode, or stored in the memory unit 760.

The optical instrument 10B may comprise a memory unit 760. A program for processing and controlling the control unit 780 may be stored in the memory unit 760. In addition, the memory unit 760 may store input/output data, for example, any one or more of a phone book, a message, an audio, a still image, a photo, and a moving picture. The memory unit 760 may store an image photographed by the camera 721, for example, a photo or a video.

The optical instrument 10B may comprise an interface unit 770. The interface unit 770 serves as a path for connecting to an external device being connected to the optical instrument 10B. The interface unit 770 may receive data from an external device, receive power and transmit it to each component inside the optical instrument 10B, or transmit data inside the optical instrument 10B to the external device. The interface unit 770 may comprise any one or more among a wired/wireless headset port, an external charger port, a wired/wireless data port, a memory card port, a port for connecting a device equipped with an identification module, and an audio I/O port, a video I/O port, and an earphone port.

The optical instrument 10B may comprise a control unit 780. The control unit 780 may control the overall operation of the optical instrument 10B. The control unit 780 may perform related control and processing for voice call, data communication, video call, and the like. The control unit 780 may comprise a display control unit 781 that controls a display module 753 that is a display of the optical instrument 10B. The control unit 780 may comprise a camera control unit 782 that controls the camera module. The control unit 780 may comprise a multimedia module 783 for playing multimedia. The multimedia module 783 may be provided inside the control unit 180 or may be provided separately from the control unit 780. The control unit 780 may perform a pattern recognition process capable of recognizing a handwriting input or a drawing input performed on the touch screen as characters and images, respectively.

The optical instrument 10B may comprise a power supply unit 790. The power supply unit 790 may receive external power or internal power by the control of the control unit 780 to supply power required for operation of each component.

Hereinafter, a configuration of a lens driving device according to a second embodiment of the present invention will be described with reference to the drawings.

Figure 21:
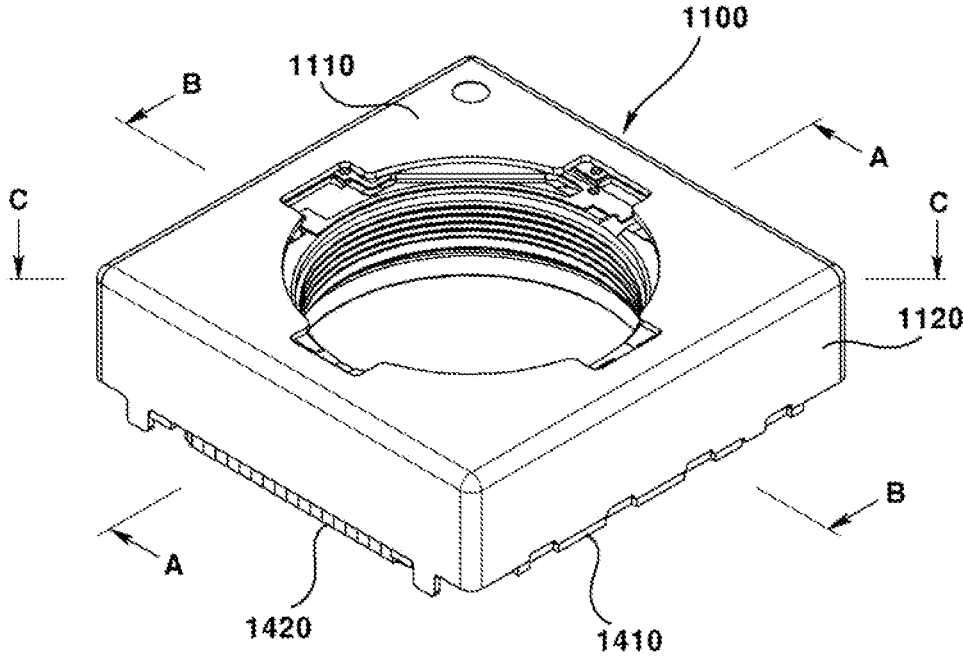
FIG. 21 is a perspective view of a lens driving device according to a second embodiment of the present invention.
Figure 22:
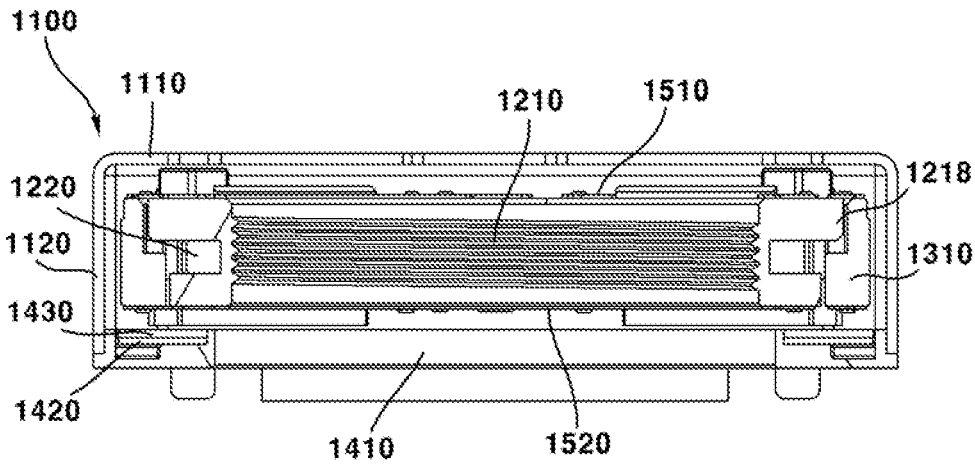
FIG. 22 is a cross-sectional view taken along line A-A of FIG. 21.
Figure 23:
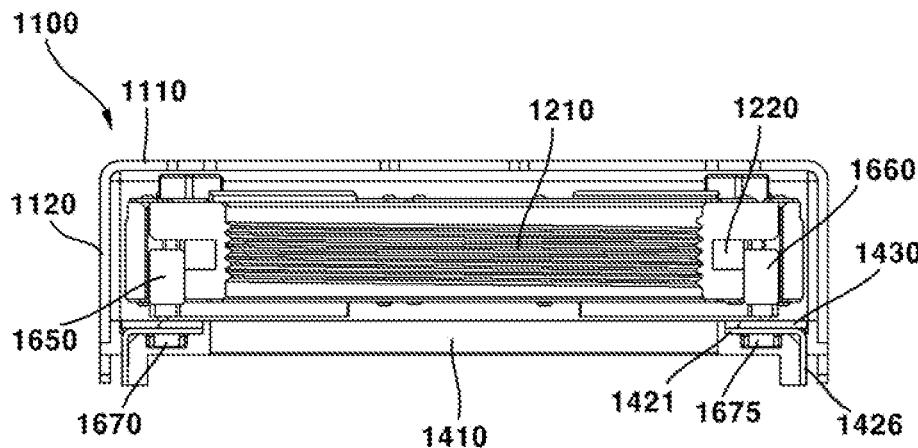
FIG. 23 is a cross-sectional view taken along line B-B of FIG. 21.
Figure 24:
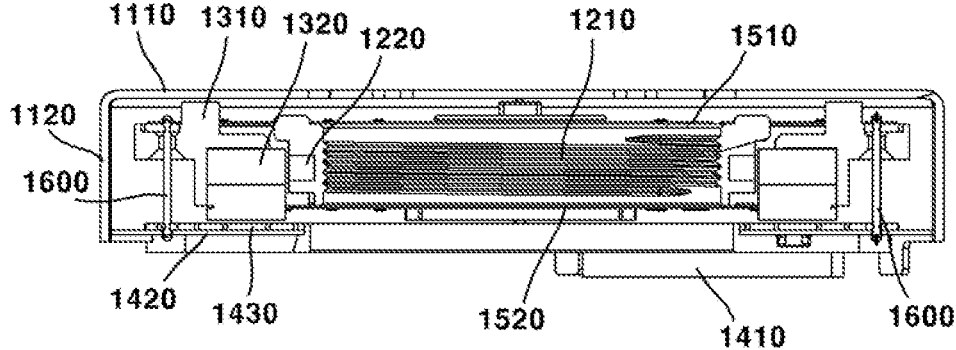
FIG. 24 is a cross-sectional view taken along line C-C of FIG. 21.
Figure 25:
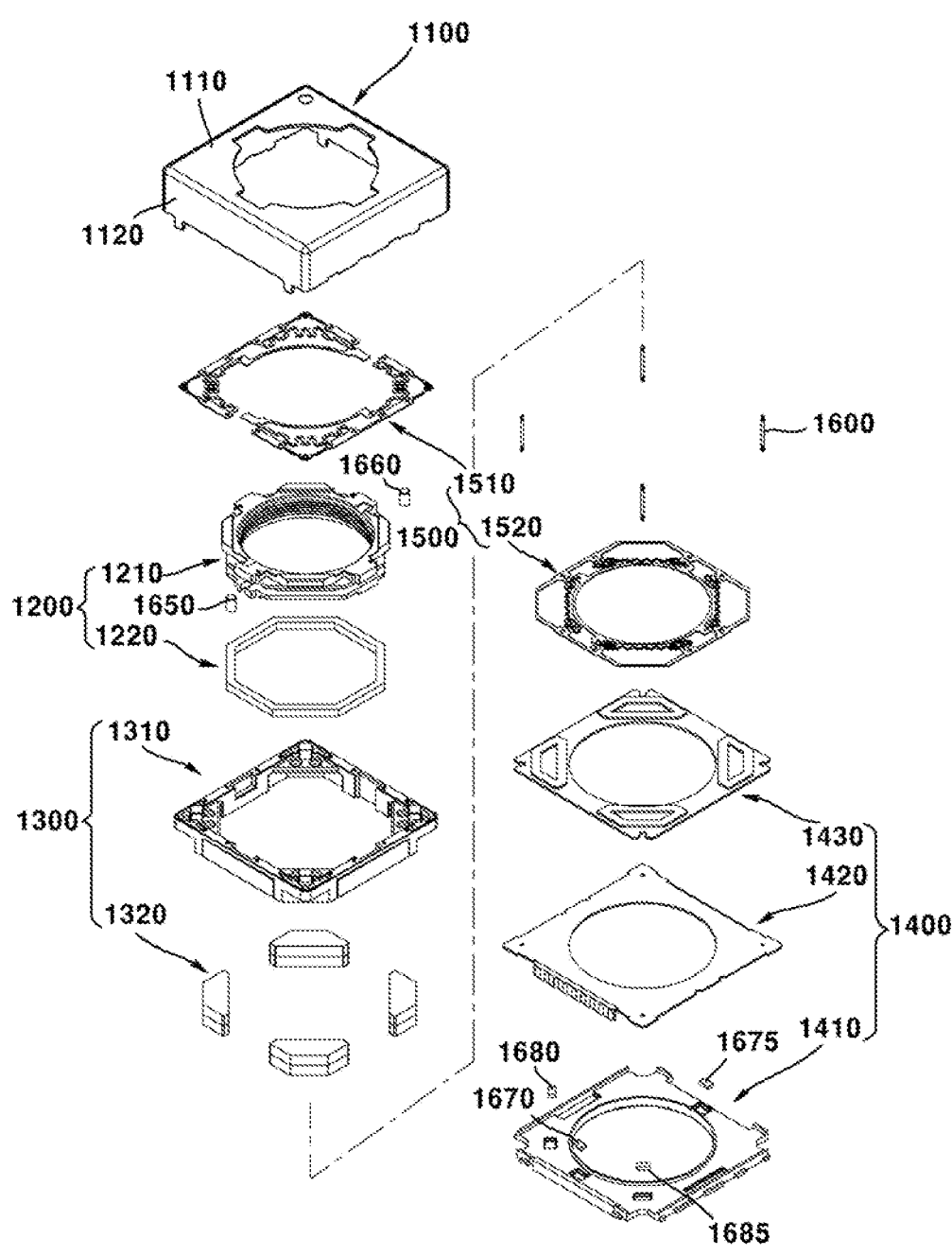
FIG. 25 is an exploded perspective view of a lens driving device according to a second embodiment of the present invention.
Figure 26:
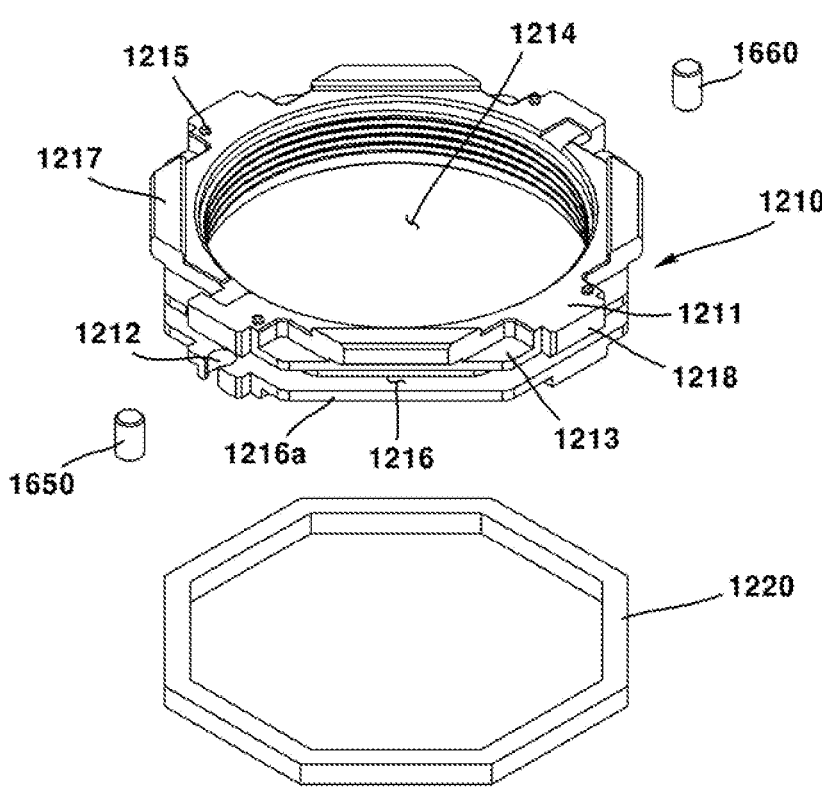
FIG. 26 is an exploded perspective view of a first mover and related configurations of a lens driving device according to a second embodiment of the present invention.
Figure 27:
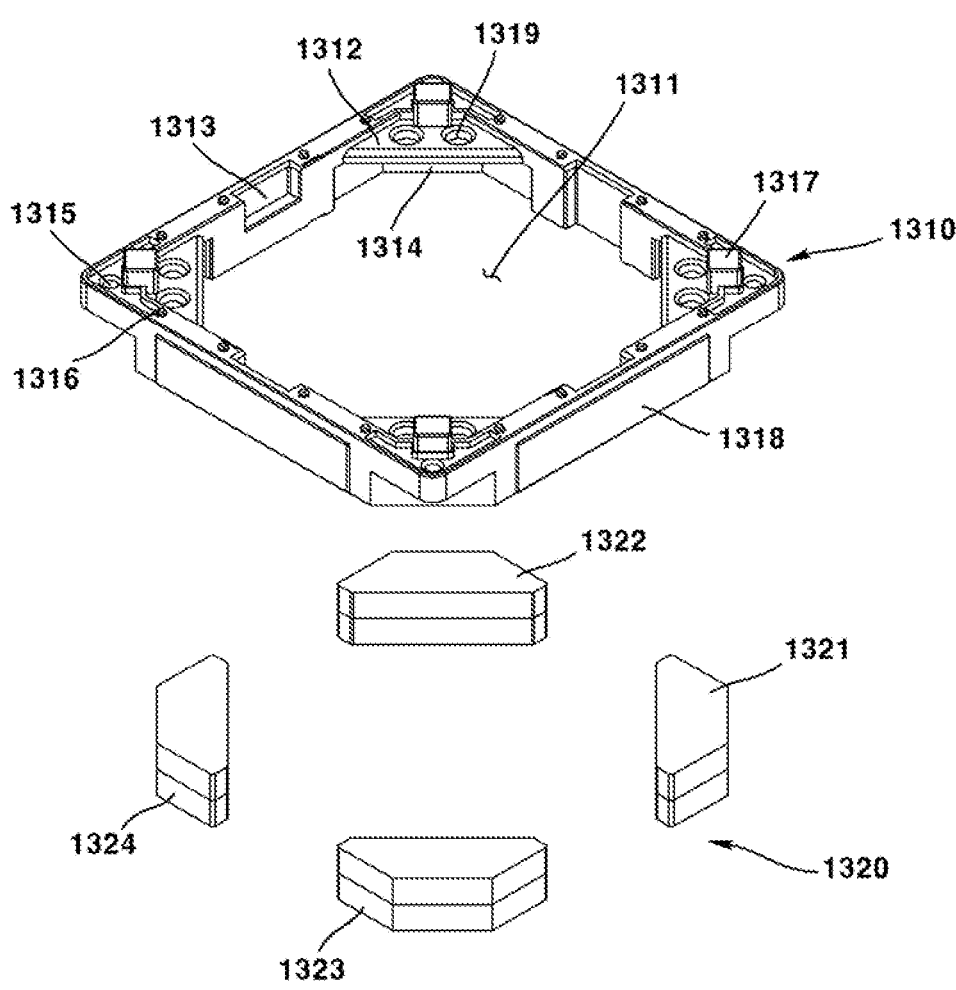
FIG. 27 is an exploded perspective view of a second mover and related configurations of a lens driving device according to a second embodiment of the present invention.
Figure 28:
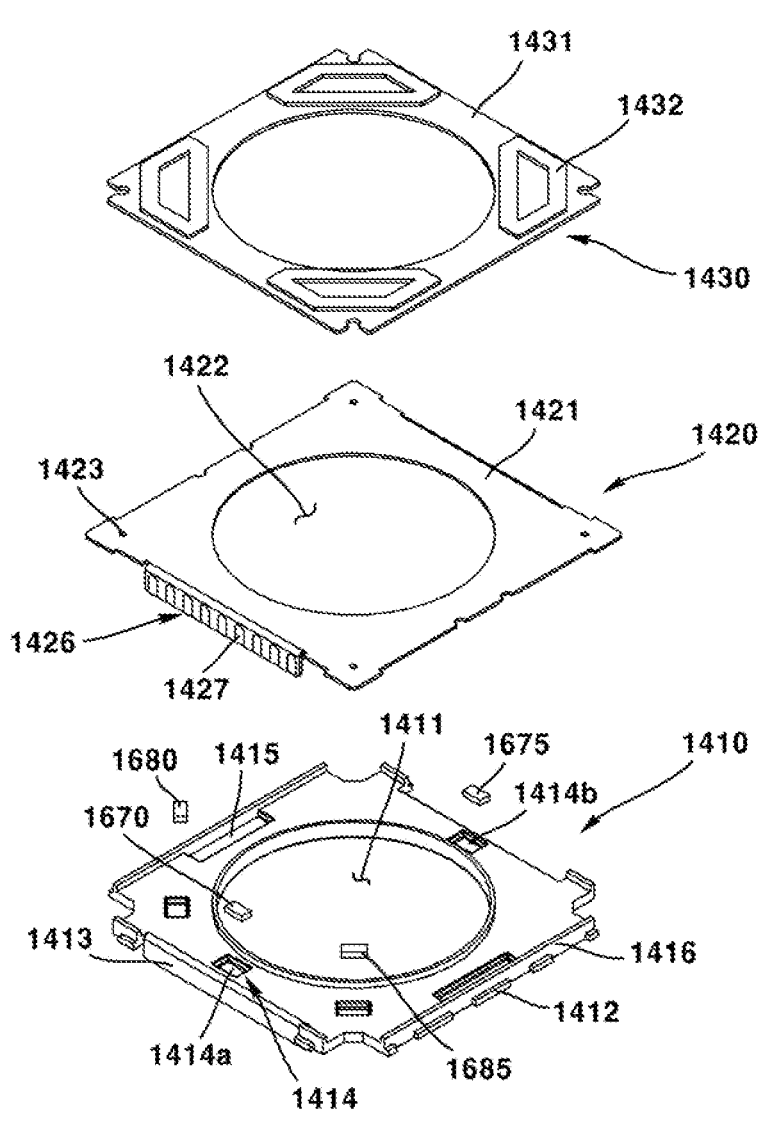
FIG. 28 is an exploded perspective view of a stator of a lens driving device according to a second embodiment of the present invention.
Figure 29:
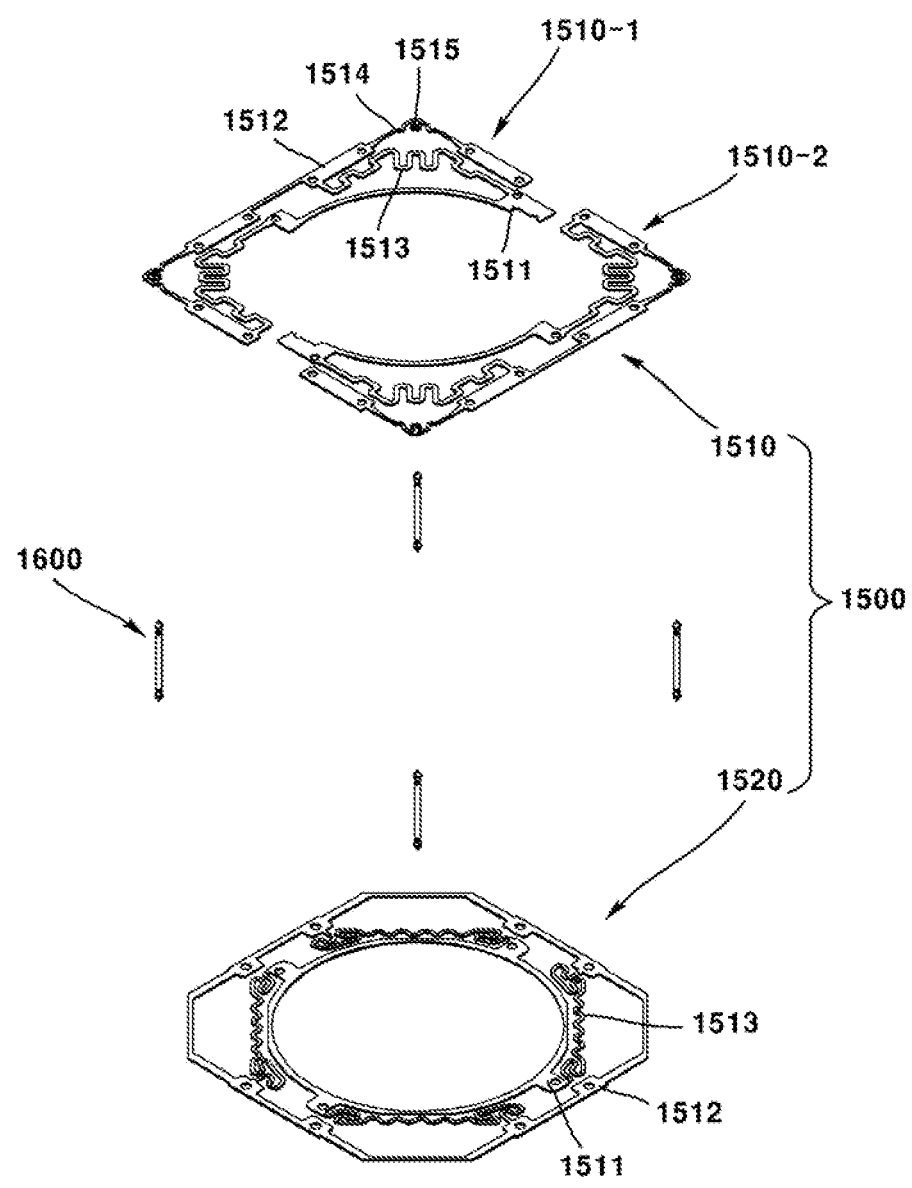
FIG. 29 is an exploded perspective view of an elastic member and a support member of a lens driving device according to a second embodiment of the present invention.
Figure 30:
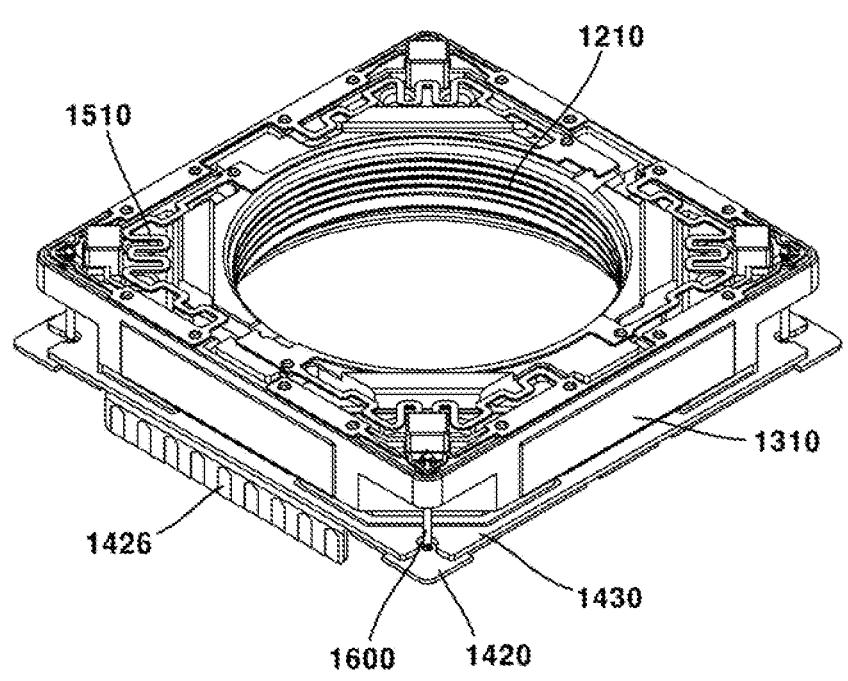
FIG. 30 is a perspective view illustrating a state in which the cover member and the base of a lens driving device according to a second embodiment of the present invention are removed.
Figure 31:
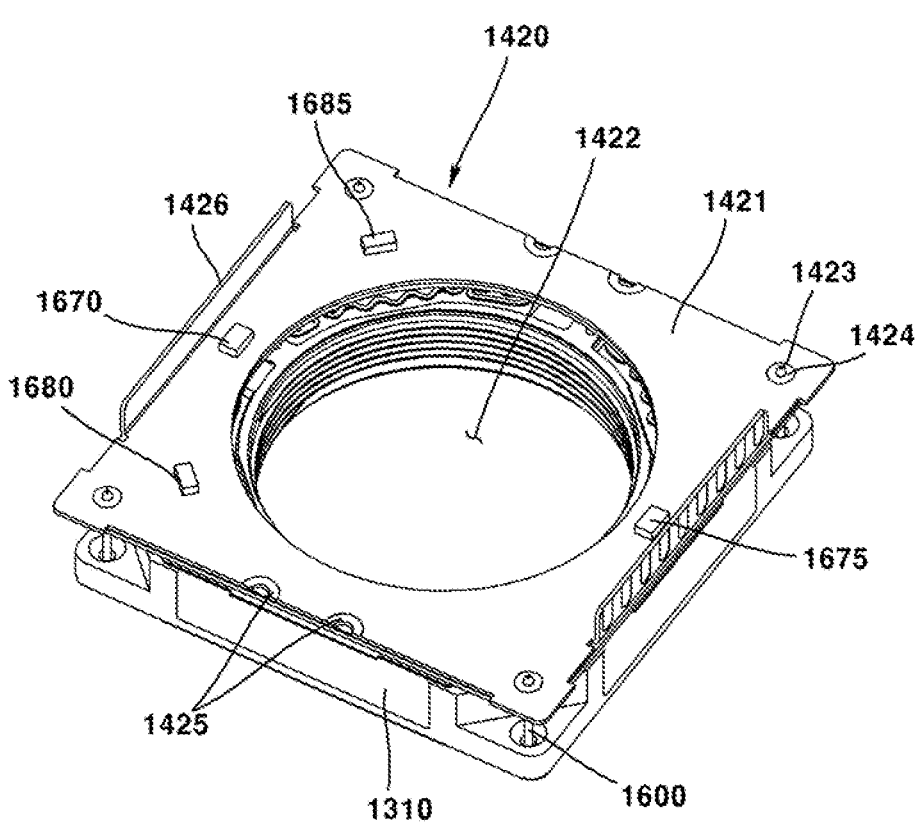
FIG. 31 is a bottom perspective view of the lens driving device in the state shown in FIG. 30.
Figure 32:
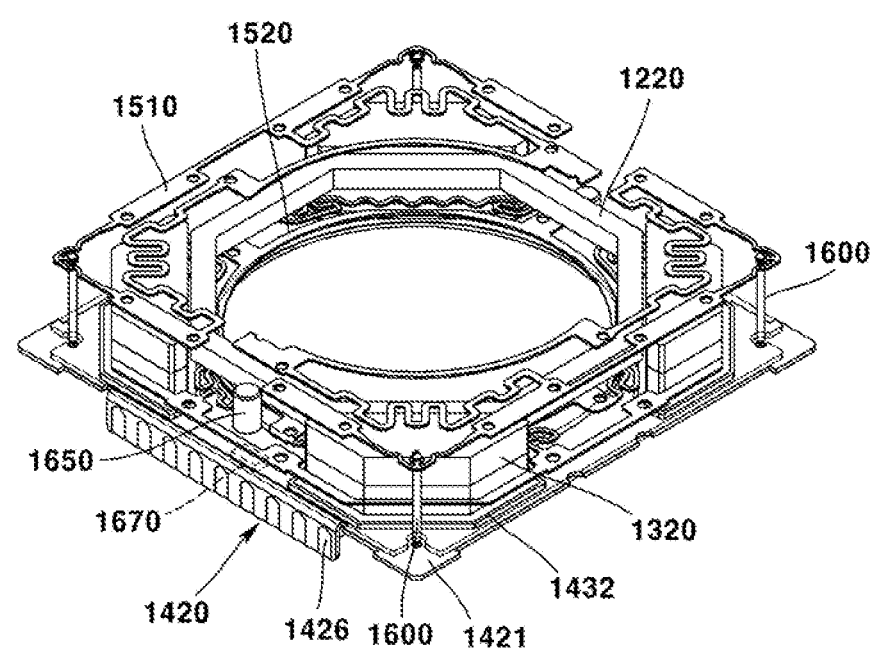
FIG. 32 is a perspective view of a partial configuration of a lens driving device according to a second embodiment of the present invention.
Figure 33:
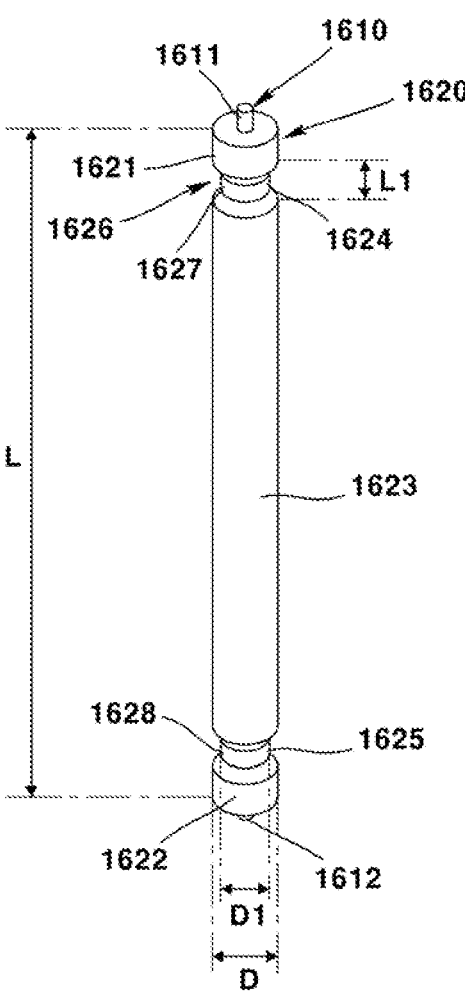
FIG. 33 is a perspective view of a support member of a lens driving device according to a second embodiment of the present invention.
Figure 34:
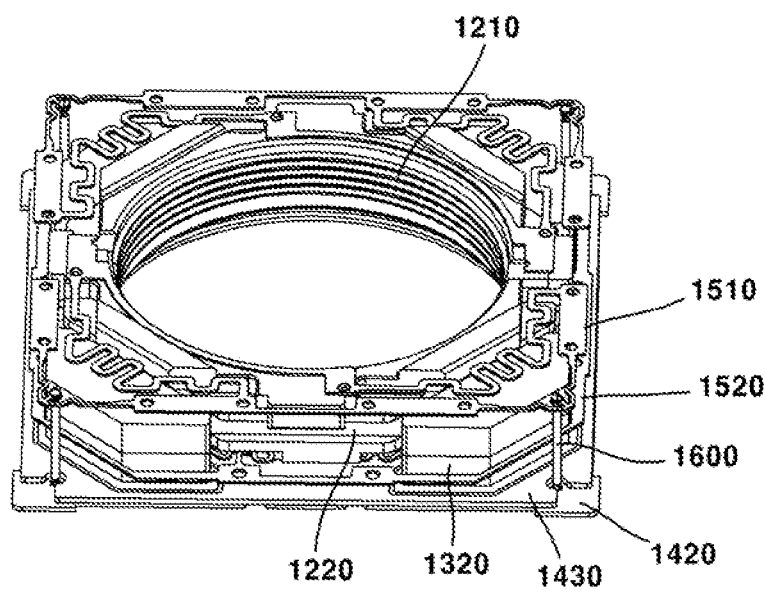
FIG. 34 is a perspective view of a partial configuration of a lens driving device according to a second embodiment of the present invention.
Figure 35:
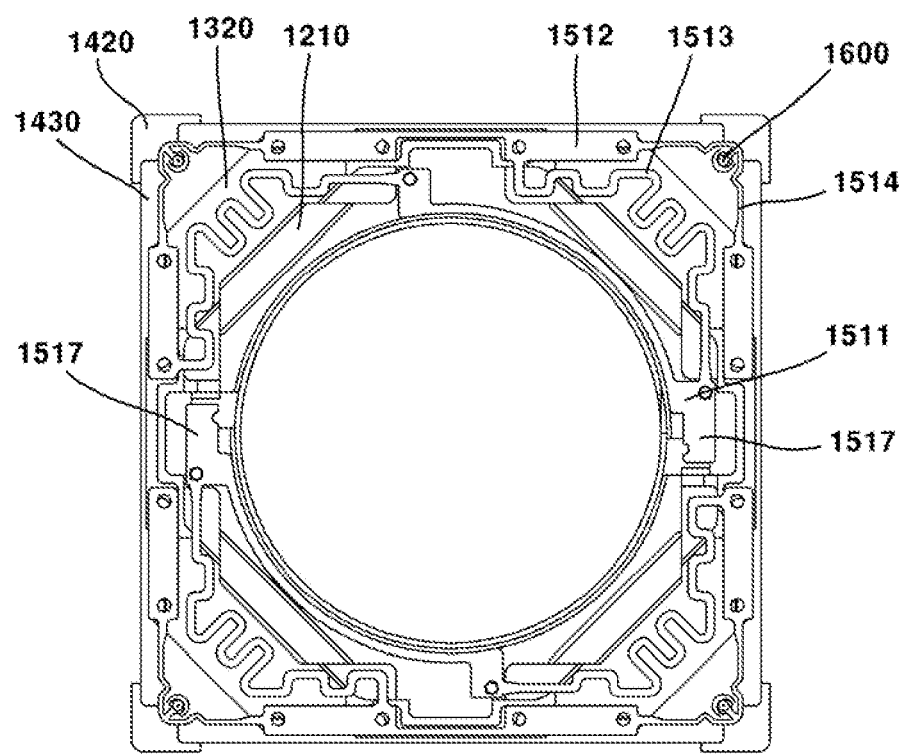
FIG. 35 is a plan view of a partial configuration of a lens driving device according to a second embodiment of the present invention.
Figure 36:
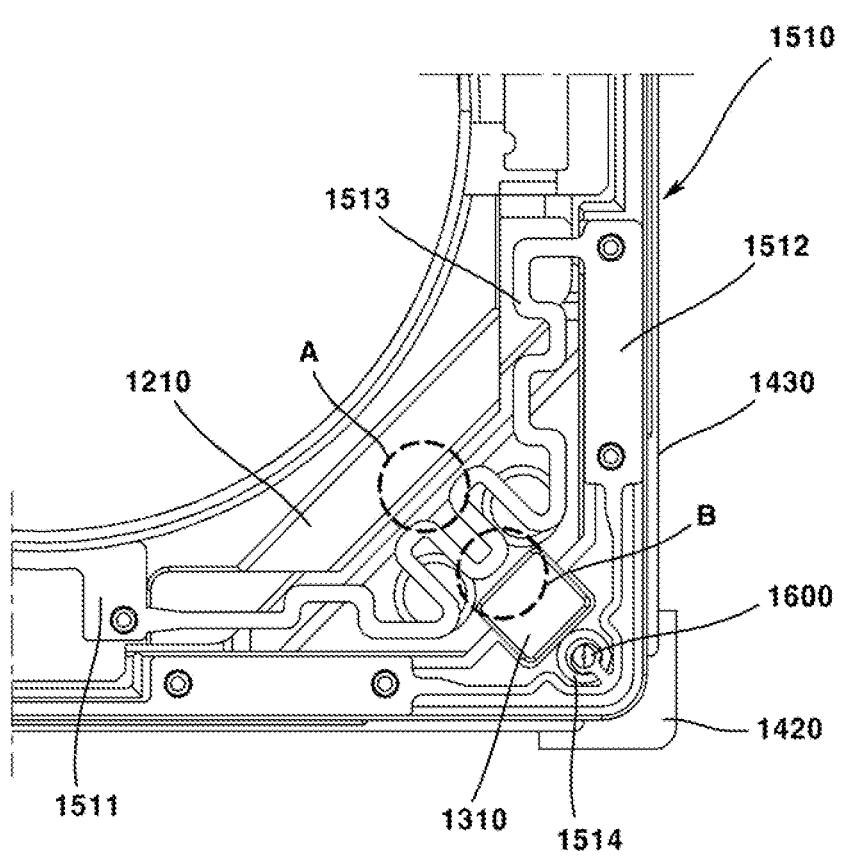
FIG. 36 is an enlarged plan view of a part of a lens driving device according to a second embodiment of the present invention.
Figure 37:
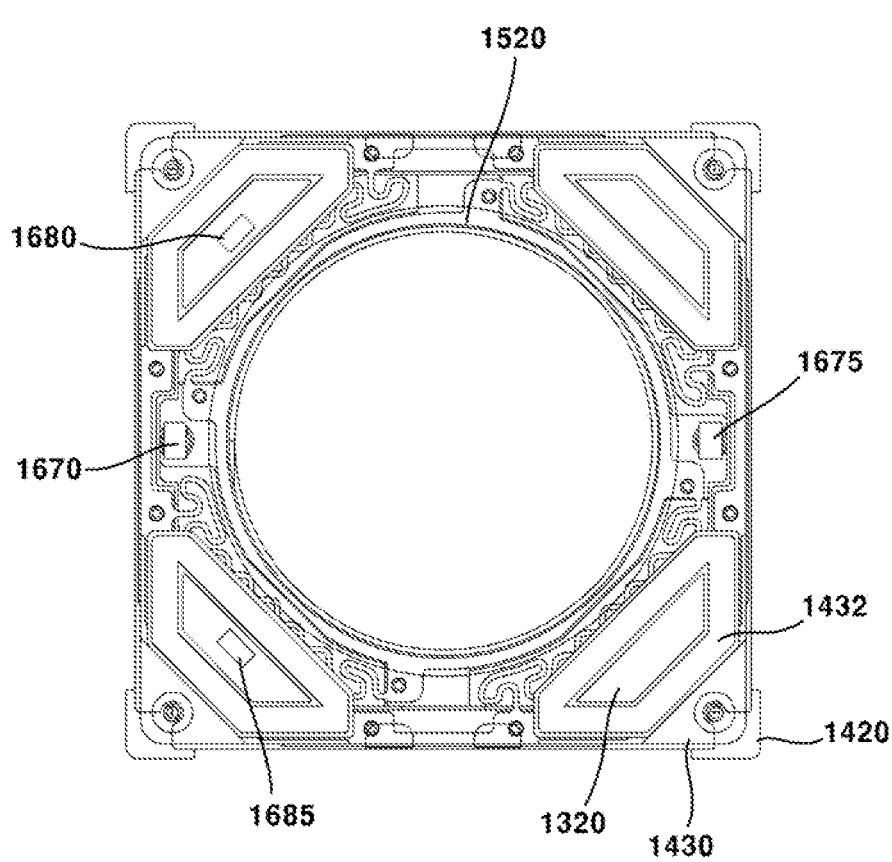
FIG. 37 is a perspective plan view of a partial configuration of a lens driving device according to a second embodiment of the present invention.

FIG. 21 is a perspective view of a lens driving device according to a second embodiment of the present invention; FIG. 22 is a cross-sectional view taken along line A-A of FIG. 21; FIG. 23 is a cross-sectional view taken along line B-B of FIG. 21; FIG. 24 is a cross-sectional view taken along line C-C of FIG. 21; FIG. 25 is an exploded perspective view of a lens driving device according to a second embodiment of the present invention; FIG. 26 is an exploded perspective view of a first mover and related configurations of a lens driving device according to a second embodiment of the present invention; FIG. 27 is an exploded perspective view of a second mover and related configurations of a lens driving device according to a second embodiment of the present invention; FIG. 28 is an exploded perspective view of a stator of a lens driving device according to a second embodiment of the present invention; FIG. 29 is an exploded perspective view of an elastic member and a support member of a lens driving device according to a second embodiment of the present invention; FIG. 30 is a perspective view illustrating a state in which the cover member and the base of a lens driving device according to a second embodiment of the present invention are removed; FIG. 31 is a bottom perspective view of the lens driving device in the state shown in FIG. 30; FIG. 32 is a perspective view of a partial configuration of a lens driving device according to a second embodiment of the present invention; FIG. 33 is a perspective view of a support member of a lens driving device according to a second embodiment of the present invention; FIG. 34 is a perspective view of a partial configuration of a lens driving device according to a second embodiment of the present invention; FIG. 35 is a plan view of a partial configuration of a lens driving device according to a second embodiment of the present invention; FIG. 36 is an enlarged plan view of a part of a lens driving device according to a second embodiment of the present invention; and FIG. 37 is a perspective plan view of a partial configuration of a lens driving device according to a second embodiment of the present invention.

The lens driving device 1010 may be a voice coil motor (VCM). The lens driving device 1010 may be a lens driving motor. The lens driving device 1010 may be a lens driving actuator. The lens driving device 1010 may comprise an AF module. The lens driving device 1010 may comprise an OIS module.

The lens driving device 1010 may comprise a cover member 1100. The cover member 1100 may comprise a 'cover can'. The cover member 1100 may be disposed at an outer side of the housing 1310. The cover member 1100 may be coupled to the base 1410. The cover member 1100 may accommodate the housing 1310 therein. The cover member 1100 may form the outer appearance of the lens driving device. The cover member 1100 may have a hexahedral shape with an open lower surface. The cover member 1100 may be a non-magnetic material. The cover member 1100 may be formed of a metal material. The cover member 1100 may be formed of a metal plate. The cover member 1100 may be connected to a ground part of the printed circuit substrate 1050. Through this, the cover member 1100 may be grounded. The cover member 1100 may block electromagnetic interference (EMI). At this time, the cover member 1100 may be referred to as an 'EMI shield can'.

The cover member 1100 may comprise an upper plate 1110 and a side plate 1120. The cover member 1100 may comprise an upper plate 1110 comprising a hole and a side plate 1120 being extended downward from an outer circumference or edge of the upper plate 1110. The lower end of the side plate 1120 of the cover member 1100 may be disposed in the step portion 1412 of the base 1410. The inner surface of the side plate 1120 of the cover member 1100 may be fixed to the base 1410 by an adhesive.

The upper plate 1110 of the cover member 1100 may comprise a hole. A hole may comprise an 'opening'. The hole may be formed in the upper plate 1110 of the cover member 1100. When viewed from above, the lens can be seen through the hole. The hole may be formed in a size and shape corresponding to the lens. The size of the hole may be larger than the diameter of the lens module 1020 so that the lens module 1020 can be inserted through the hole and assembled. The light introduced through the hole may pass through the lens. At this time, the light passing through the lens may be converted into an electrical signal by the image sensor 1060 and acquired as an image.

The lens driving device 1010 may comprise a first mover 1200. The first mover 1200 may be coupled to a lens. The first mover 1200 may be connected to the second mover 1300 through a first elastic member 1510 and/or a second elastic member 1520. The first mover 1200 may move through interaction with the second mover 1300. At this time, the first mover 1200 may move integrally with the lens. Meanwhile, the first mover 1200 may move during AF driving. At this time, the first mover 1200 may be referred to as an 'AF mover'. However, the first mover 1200 may move together with the second mover 1300 even during OIS driving.

The first mover 1200 may comprise a bobbin 1210. The bobbin 1210 may be disposed inside the housing 1310. The bobbin 1210 may be disposed in the hole 1311 of the housing 1310. The bobbin 1210 may be movably coupled to the housing 1310. The bobbin 1210 may move in an optical axis direction against the housing 1310. A lens may be coupled to the bobbin 1210. The bobbin 1210 and the lens may be coupled by screw-coupling and/or adhesive. A first coil 1220 may be coupled to the bobbin 1210. A first elastic member 1510 may be coupled to an upper portion or upper surface of the bobbin 1210. A second elastic member 1520 may be coupled to a lower portion or lower surface of the bobbin 1210. The bobbin 1210 may be coupled to the first elastic member 1510 and/or the second elastic member 1520 by heat fusion and/or an adhesive. The adhesive coupling the bobbin 1210 and the lens, and the bobbin 1210 and the elastic member 1500 may be an epoxy cured by at least one among ultraviolet rays (UV), heat, and a laser.

In the present embodiment, the bobbin 1210 may not be disposed between the second magnet 1650 and the first sensor 1670. That is, in the present embodiment, the distance between the second magnet 1650 and the first sensor 1670 may be minimized. By minimizing the distance between the second magnet 1650 and the first sensor 1670, the strength of the magnetic force of the second magnet 1650 detected by the first sensor 1670 may be increased.

The bobbin 1210 may comprise an upper surface 1211. An inner side portion 1511 of the first elastic member 1510 may be disposed on the upper surface 1211 of the bobbin 1210. The upper surface 1211 of the bobbin 1210 may be disposed at a higher position than the upper surface of the second magnet 1650. The upper surface 1211 of the bobbin 1210 may be spaced apart from the upper surface of the second magnet 1650. Or, the upper surface 1211 of the bobbin 1210 may be disposed at the same height as the upper surface of the second magnet 1650.

The bobbin 1210 may comprise a hole 1212. The hole 1212 may be a groove or a recess. A second magnet 1650 may be disposed in the hole 1212. The hole 1212 of the bobbin 1210 may be formed in an outer circumferential surface of the bobbin 1210. At least a portion of the hole 1212 of the bobbin 1210 may be formed to correspond to the shape and size of the second magnet 1650. The hole 1212 may penetrate rib 1216a in an optical axis direction. The hole 1212 may be opened toward the outer side.

The bobbin 1210 may comprise a recessed portion 1213. The recessed portion 1213 may be formed in a portion corresponding to the connection part 1513 of the first elastic member 1510. The recessed portion 1213 may be formed by being recessed from the upper surface 1211 of the bobbin 1210. Through this, when the bobbin 1210 moves upward from the initial state, interference between the connection part 1513 of the first elastic member 1510 and the bobbin 1210 may be prevented. The recessed portion 1213 may be spaced apart from the groove 1212 of the bobbin 1210.

The bobbin 1210 may comprise a hole 1214. The hole 1214 may penetrate the bobbin 1210 in an optical axis direction. The lens module 1020 may be accommodated in the hole 1214. For example, a thread corresponding to a thread formed on an outer circumferential surface of the lens module 1020 may be disposed on an inner circumferential surface of the hole 1214 of the bobbin 1210.

The bobbin 1210 may comprise a protruded portion 1215. The protruded portion 1215 may comprise a protrusion. The protruded portion 1215 may be formed on the upper surface 1211 of the bobbin 1210. The protruded portion 1215 may be protruded from the upper surface 1211 of the bobbin 1210. The protruded portion 1215 may be coupled to the inner side portion 1511 of the first elastic member 1510. The protruded portion 1215 may be inserted into the hole of the inner side portion 1511 of the first elastic member 1510. The protruded portion 1215 may be coupled to a hole of the inner side portion 1511.

The bobbin 1210 may comprise a coil accommodating groove 1216. The first coil 1220 may be coupled to the coil accommodating groove 1216. The coil accommodating groove 1216 may be formed on an outer circumferential surface of the bobbin 1210. The coil accommodating groove 1216 may comprise a groove being formed as a portion of an outer side surface (outer lateral surface) of the bobbin 1210 is recessed. The first coil 1220 may be accommodated in the groove of the coil accommodating groove 1216. The coil accommodating groove 1216 may comprise a rib 1216a for supporting the lower surface of the first coil 1220. The rib 1216a is protruded from the outer circumferential surface of the bobbin 1210 and may be disposed below the first coil 1220.

The bobbin 1210 may comprise an upper stopper 1217. The upper stopper 1217 may be formed on an upper surface 1211 of the bobbin 1210. The upper stopper 1217 may be formed to be protruded from the upper surface 1211 of the bobbin 1210. The upper stopper 1217 may be overlapped with the upper plate 1110 of the cover member 1100 in an optical axis direction. The upper stopper 1217 may form an uppermost end of the bobbin 1210. Through this, when the bobbin 1210 moves upward, the upper stopper 1217 may be in contact with the upper plate 1110 of the cover member 1100. That is, the upper stopper 1217 may physically limit the upper stroke of the bobbin 1210.

The bobbin 1210 may comprise a side stopper 1218. The side stopper 1218 may be formed on a side surface of the bobbin 1210. The side stopper 1218 may be formed to be protruded from the side surface of the bobbin 1210. At least a portion of the side stopper 1218 may be disposed in the second groove 1313 of the housing 1310. When the bobbin 1210 rotates through this structure, the side stopper 1218 of the bobbin 1210 may be in contact with the housing 1310. That is, the side stopper 1218 of the bobbin 1210 may limit the rotation of the bobbin 1210.

The first mover 1200 may comprise a first coil 1220. The first coil 1220 may be an 'AF driving coil' used for AF driving. The first coil 1220 may be disposed in the bobbin 1210. The first coil 1220 may be disposed between the bobbin 1210 and the housing 1310. The first coil 1220 may be disposed on an outer side surface or an outer circumferential surface of the bobbin 1210. The first coil 1220 may be directly wound in the bobbin 1210. Or, the first coil 1220 may be coupled to the bobbin 1210 in a state of being directly wound. The first coil 1220 may face the first magnet 1320. The first coil 1220 may be disposed to face the first magnet 1320. The first coil 1220 may electromagnetically interact with the first magnet 1320. In this case, when a current is supplied to the first coil 1220 and an electromagnetic field is formed around the first coil 1220, the first coil 1220 and the first magnet 1320 can interact with each other by electromagnetic interaction. The coil 1220 may move against the first magnet 1320. The first coil 1220 may be formed as a single coil. Or, the first coil 1220 may comprise a plurality of coils being spaced apart from one another.

The first coil 1220 may comprise a pair of lead wires for supplying power. At this time, one end portion (lead wire) of the first coil 1220 is coupled to the first lower elastic unit 1520-1, and the other end portion (lead wire) of the first coil 1220 may be coupled to the second lower elastic unit 1520-2. That is, the first coil 1220 may be electrically connected to the second elastic member 1520. In more detail, the first coil 1220 may be supplied with power sequentially through a printed circuit substrate 1050, a first board 1420, a wire 1610, a first elastic member 1510, a second substrate 1640, and a second elastic member 1520. As a modified embodiment, the first coil 1220 may be electrically connected to the first elastic member 1510.

The lens driving device 1010 may comprise a second mover 1300. The second mover 1300 may be movably coupled to the stator 1400 through the support member 1600. The second mover 1300 may support the first mover 1200 through the upper and second elastic members 1510 and 1520. The second mover 1300 may move the first mover 1200 or may move together with the first mover 1200. The second mover 1300 may move through interaction with the stator 1400. The second mover 1300 may move during OIS driving. At this time, the second mover 1300 may be referred to as an 'OIS mover'. The second mover 1300 may move integrally with the first mover 1200 during OIS driving.

The second mover 1300 may comprise a housing 1310. The housing 1310 may be spaced apart from the base 1410. The housing 1310 may be disposed at an outer side of the bobbin 1210. The housing 1310 may accommodate at least a portion of the bobbin 1210. The housing 1310 may be disposed inside the cover member 1100. The housing 1310 may be disposed between the cover member 1100 and the bobbin 1210. The housing 1310 may be formed of a material different from that of the cover member 1100. The housing 1310 may be formed of an insulating material. The housing 1310 may be formed of an injection-molded material. The outer side surface of the housing 1310 may be spaced apart from the inner surface of the side plate of the cover member 1100. Through the space between the housing 1310 and the cover member 1100, the housing 1310 may move for OIS driving. A first magnet 1320 may be disposed in the housing 1310. The housing 1310 and the first magnet 1320 may be coupled by an adhesive. A first elastic member 1510 may be coupled to an upper portion or upper surface of the housing 1310. A second elastic member 1520 may be coupled to a lower portion or lower surface of the housing 1310. The housing 1310 may be coupled to the first and second elastic members 1510 and 1520 by heat fusion and/or an adhesive. The adhesive coupling the housing 1310 and the first magnet 1320, and the housing 1310 and the elastic member 1500 may be an epoxy cured by at least one among ultraviolet rays (UV), heat, and a laser.

The housing 1310 may comprise four side portions and four corner portions being disposed between the four side portions. The side portion of the housing 1310 may comprise a first side portion, a second side portion being disposed at an opposite side of the first side portion, and a third side portion and a fourth side portion being disposed at an opposite side thereof between the first side portion and the second side portion. The corner portion of the housing 1310 may comprise: a first corner portion being disposed between the first side portion and the third side portion; a second corner portion being disposed between the first side portion and the fourth side portion; a third corner portion being disposed between the second side portion and the third side portion; and a fourth corner portion being disposed between the second side portion and the fourth side portion. The side portion of the housing 1310 may comprise a 'sidewall'.

The housing 1310 may comprise a hole 1311. The hole 1311 may be formed in the housing 1310. The hole 1311 may be formed to penetrate through the housing 1310 in an optical axis direction. A bobbin 1210 may be disposed in the hole 1311. The hole 1311 may be formed in a shape corresponding to the bobbin 1210 at least in part. An inner circumferential surface or an inner side surface of the housing 1310 forming the hole 1311 may be spaced apart from the outer circumferential surface of the bobbin 1210. However, the housing 1310 and the bobbin 1210 may be overlapped with at least partially in an optical axis direction to limit the movement stroke distance of the bobbin 1210 in an optical axis direction.

The housing 1310 may comprise a first groove 1312. The first groove 1312 may be formed by being recessed in an upper surface of the housing 1310. The first groove 1312 may be formed at a position corresponding to the connection part 1513 of the first elastic member 1510. The first groove 1312 may prevent interference between the first elastic member 1510 and the housing 1310 when the connection part 1513 of the first elastic member 1510 moves downward from the initial position.

The housing 1310 may comprise a second groove 1313. The second groove 1313 may accommodate at least a portion of the side stopper 1218 of the bobbin 1210. The second groove 1313 may be formed to have a predetermined gap between it and the side stopper 1218.

The housing 1310 may comprise a magnetic accommodating groove 1314. A first magnet 1320 may be coupled to the magnet accommodating groove 1314. The magnet accommodating groove 1314 may comprise a groove being formed as a portion of an inner circumferential surface and/or a lower surface of the housing 1310 is recessed. A magnet accommodating groove 1314 may be formed in each of the four corner portions of the housing 1310. In a modified embodiment, a magnet accommodating groove 1314 may be formed in each of the four side portions of the housing 1310.

The housing 1310 may comprise a hole 1315. The hole 1315 may be formed in a corner portion of the housing 1310. The hole 1315 may be formed to penetrate through the housing 1310 in an optical axis direction. A support member 1600 may be disposed in the hole 1315 of the housing 1310. The support member 1600 may pass through the hole 1315 of the housing 1310.

The housing 1310 may comprise a protrusion 1316. The protrusion 1316 may be formed on an upper surface of the housing 1310. The protrusion 1316 may be protruded from an upper surface of the housing 1310. The protrusion 1316 may be coupled to the outer side portion 1512 of the upper elastic member 1510. The protrusion 1316 may be inserted into the hole of the outer side portion 1512 of the upper elastic member 1510.

The housing 1310 may comprise an upper stopper 1317. The upper stopper 1317 may be protruded from an upper surface of the housing 1310. The upper stopper 1317 may be formed on an upper surface of the housing 1310. The upper stopper 1317 may be overlapped with an upper plate 1110 of the cover member 1100 in an optical axis direction. The upper stopper 1317 may form an uppermost end of the housing 1310. Through this, when the housing 1310 moves upward, the upper stopper 1317 may be in contact with the upper plate 1110 of the cover member 1100. That is, the upper stopper 1317 may limit the upward movement of the housing 1310.

The housing 1310 may comprise a side stopper 1318. The side stopper 1318 may be protruded from an outer side surface of the housing 1310. The side stopper 1318 may face the inner surface of the side plate 1120 of the cover member 1100. The side stopper 1318 may be in contact with the side plate 1120 of the cover member 1100 when the housing 1310 moves in a lateral direction. That is, the side stopper 1318 may physically limit the stroke of the housing 1310 in a lateral direction.

The housing 1310 may comprise a hole 1319. The hole 1319 may be an adhesive injection hole. An adhesive bonding the first magnet 1320 and the housing 1310 may be injected through the hole 1319.

The second mover 1300 may comprise a first magnet 1320. The first magnet 1320 may be disposed in the housing 1310. The first magnet 1320 may be fixed to the housing 1310 by an adhesive. The first magnet 1320 may be disposed between the bobbin 1310 and the housing 1310. The first magnet 1330 may face the first coil 1220. The first magnet 1320 may electromagnetically interact with the first coil 1220. The first magnet 1320 may face the second coil 1430. The first magnet 1320 may electromagnetically interact with the second coil 1430. The first magnet 1320 may be commonly used for AF driving and OIS driving. The first magnet 1320 may be disposed in a corner portion of the housing 1310. At this time, the first magnet 1320 may be a corner magnet having an inner side surface having a larger hexahedral shape than an outer side surface. As a modified embodiment, the first magnet 1320 may be disposed in a side portion of the housing 1310. At this time, the first magnet 1320 may be a flat magnet having a flat plate shape.

The first magnet 1320 may comprise a plurality of magnets. The first magnet 1320 may comprise four magnets. The first magnet 1320 may comprise first to fourth driving magnets 1321, 1322, 1323, and 1324 being disposed at first to fourth corners. The first driving magnet 1321 may be disposed such that a first axis perpendicular to the optical axis passes. The second driving magnet 1322 may be disposed such that an optical axis and a second axis perpendicular to the first axis pass. That is, the first driving magnet 1321 may be disposed on the first axis. The second driving magnet 1322 may be disposed on the second axis. The third driving magnet 1323 may be disposed at an opposite side of the second driving magnet 1322. The fourth driving magnet 1324 may be disposed at an opposite side of the first driving magnet 1321.

The lens driving device 1010 may comprise a stator 1400. The stator 1400 may be disposed below the first and second movers 1200 and 1300. The stator 1400 may movably support the second mover 1300. The stator 1400 may move the second mover 1300. At this time, the first mover 1200 may also move together with the second mover 1300.

The stator 1400 may comprise a base 1410. The base 1410 may be disposed below the housing 1310. The base 1410 may be disposed below the first substrate 1420. A first substrate 1420 may be disposed on the upper surface of the base 1410. The base 1410 may be coupled to the cover member 1100. The base 1410 may be disposed above the printed circuit substrate 1050.

The base 1410 may comprise a hole 1411. The hole 1411 may be a hollow hole formed in the base 1410. The hole 1411 may penetrate the base 1410 in an optical axis direction. Light passing through the lens module 1020 through the hole 1411 may be incident on the image sensor 1060.

The base 1410 may comprise a step portion 1412. The step portion 1412 may be formed on a side surface of the base 1410. The step portion 1412 may be formed around the outer circumferential surface of the base 1410. The step portion 1412 may be formed when a portion of the side surface of the base 1410 is protruded or recessed. The lower end of the side plate 1120 of the cover member 1100 may be disposed in the step portion 1412.

The base 1410 may comprise a groove 1413. A terminal unit 1426 of the first substrate 1420 may be disposed in the groove 1413. The groove 1413 may be formed by recessing a portion of the side surface of the base 1410. The width of the groove 1413 may be formed to correspond to the width of the terminal unit 1426 of the first substrate 1420. The length of the groove 1413 may be formed to correspond to the length of the terminal unit 1426 of the first substrate 1420. Or, since the length of the terminal unit 1426 of the first substrate 1420 is longer than the length of the groove 1413, a part of the terminal unit 1426 may be protruded below the base 1410.

The base 1410 may comprise a groove 1414. The groove 1414 may be a sensor accommodating groove. The first to fourth sensors 1670, 1675, 1680, and 1685 may be disposed in the groove 1414. The groove 1414 may be formed as the upper surface of the base 1410 is recessed. The base 1410 may comprise: a first groove 1414a being recessed from the upper surface of the base 1410 and being formed in a shape corresponding to the first sensor 1670; and a second groove 1414b being recessed from an upper surface of the base 1410 and being formed in a shape corresponding to the second sensor 1675.

The base 1410 may comprise a groove 1415. The groove 1415 may be formed on an upper surface of the base 1410. An adhesive may be disposed in the groove 1415. The adhesive disposed in the groove 1415 may fix the first substrate 1420 to the base 1410. A conductive adhesive member may be disposed in the groove 1415. The first substrate 1420 and the second coil 1430 may be electrically connected to each other by a conductive adhesive member disposed in the groove 1415.

The base 1410 may comprise a protruded portion 1416. The protruded portion 1416 may be formed on an upper surface of the base 1410. The protruded portion 1416 may be formed on an outer circumferential surface of the base 1410. The protruded portion 1416 may be formed on an outer side of the first substrate 1420. The protruded portion 1416 may be formed on both sides of the first substrate 1420 to guide the position of the first substrate 1420.

The stator 1400 may comprise a first substrate 1420. The first substrate 1420 may be disposed between the base 1410 and the housing 1310. The first substrate 1420 may be disposed on an upper surface of the base 1410. The first substrate 1420 may comprise a first magnet 1320 being opposite to a second coil 1430. The first substrate 1420 may supply power to the second coil 1430. A support member 1600 may be coupled to the first substrate 1420. The first substrate 1420 may be coupled to the printed circuit substrate 1050 being disposed below the base 1410 by solder. The first substrate 1420 may comprise a flexible printed circuit substrate (FPCB, flexible printed circuit substrate). The first substrate 1420 may be partially bent.

The first substrate 1420 may comprise a body part 1421. A hole 1422 may be formed in the body part 1421. The hole 1422 may be hollow penetrating through the first substrate 1420 in an optical axis direction. The first substrate 1420 may comprise a hole 1423. A support member 1600 may be disposed in the hole 1423 of the first substrate 1420. The support member 1600 may be disposed to pass through the hole 1423 of the first substrate 1420.

The first substrate 1420 may comprise a first terminal 1424. The first terminal 1424 may be disposed on a lower surface of the first substrate 1420. The first terminal 1424 may be disposed around the hole 1423. The first terminal 1424 may be connected to the wire 1610 through a conductive member. The first substrate 1420 may comprise a second terminal 1425. The second terminal 1425 may be disposed at an outer edge of a lower surface of the first substrate 1420. The second terminal 1425 may be disposed on an edge of the first substrate 1420. The second terminal 1425 may be connected to the second coil 1430 through a conductive member.

The first substrate 1420 may comprise a terminal unit 1426. The terminal unit 1426 may be extended downward from the body part 1421 of the first substrate 1420. The terminal unit 1426 may be formed as a portion of the first substrate 1420 is bent. At least a portion of the terminal unit 1426 may be exposed to the outside. The terminal unit 1426 may be coupled to the printed circuit substrate 1050 being disposed below the base 1410 by soldering. The terminal unit 1426 may be disposed in the groove 1413 of the base 1410. The terminal unit 1426 may comprise a plurality of terminals 1427.

The stator 1400 may comprise a second coil 1430. The second coil 1430 may be a configuration of the first substrate 1420, but may be a separate configuration from the first substrate 1420. The second coil 1430 may electromagnetically interact with the first magnet 1320. In this case, when a current is supplied to the second coil 1430 to form a magnetic field around the second coil 1430, first magnet 1320 may move against the second coil 1430 by electromagnetic interaction between the second coil 1430 and the first magnet 1320. The second coil 1430 may move the housing 1310 and the bobbin 1210 in a direction perpendicular to the optical axis against the base 1410 through electromagnetic interaction with the first magnet 1320. The second coil 1430 may be a fine pattern coil (FP coil) being integrally formed in the substrate part 1431. The second coil 1430 may comprise a substrate part 1431 and a coil unit 1432 formed in the substrate part 1431. In a modified embodiment, the second coil 1430 may be provided with only the coil unit 1432 omitting the substrate part 1431.

The lens driving device 1010 may comprise an elastic member 1500. The elastic member 1500 may have elasticity at least in part. The elastic member 1500 may be formed of metal. The elastic member 1500 may be formed of a conductive material. The elastic member 1500 may be coupled to the bobbin 1210 and the housing 1310. The elastic member 1500 may elastically support the bobbin 1210. The elastic member 1500 may movably support the bobbin 1210. The elastic member 1500 may support the movement of the bobbin 210 during AF driving. That is, the elastic member 1500 may comprise an 'AF support member'. The elastic member 1500 may movably support the housing 1310. That is, the elastic member 1500 may comprise an 'OIS support member'.

The elastic member 1500 may comprise a first elastic member 1510. The first elastic member 1510 may be an 'upper elastic member'. The first elastic member 1510 may connect the housing 1310 and the bobbin 1210. The first elastic member 1510 may be coupled to an upper portion of the bobbin 1210 and an upper portion of the housing 1310. The first elastic member 1510 may be coupled to an upper surface of the bobbin 1210. The first elastic member 1510 may be coupled to an upper surface of the housing 1310. The first elastic member 1510 may be coupled to the support member 1600. The first elastic member 1510 may be formed of a leaf spring. A portion of the first elastic member 1510 may be separated and used as an electrical signal, communication, or power line.

The first elastic member 1510 may comprise a plurality of upper elastic units. The first elastic member 1510 may formed by being divided into two. The first elastic member 1510 may comprise two upper elastic units spaced apart from each other. The first elastic member 1510 may comprise two upper elastic units that are electrically separated. The first elastic member 1510 may comprise first and second upper elastic units 1510-1 and 1510-2. The first and second upper elastic units 1510-1 and 1510-2 may electrically connect the first substrate 1410 and the first coil 1220. In the present embodiment, the first coil 1220 may comprise a portion to be connected to the first elastic member 1510. The first elastic member 1510 may be divided into two to four parts. For example, it is possible to supply positive (+) and negative (−) power by separating the two parts.

The first elastic member 1510 may comprise an inner side portion 1511. The inner side portion 1511 may be coupled to the bobbin 1210. The inner side portion 1511 may be coupled to an upper surface of the bobbin 1210. The inner side portion 1511 may comprise a hole or groove being coupled to the protruded portion 1215 of the bobbin 1210. The inner side portion 1511 may be fixed to the bobbin 1210 by an adhesive.

The first elastic member 1510 may comprise an outer side portion 1512. The outer side portion 1512 may be coupled to the housing 1310. The outer side portion 1512 may be coupled to an upper surface of the housing 1310. The outer side portion 1512 may comprise a hole or groove being coupled to the protrusion 1316 of the housing 1310. The outer side portion 1512 may be fixed to the housing 1310 by an adhesive.

The first elastic member 1510 may comprise a connection part 1513. The connection part 1513 may connect the inner side portion 1511 and the outer side portion 1512. The connection part 1513 may have elasticity. At this time, the connection part 1513 may be referred to as an 'elastic part'. The connection part 1513 may be formed by bending twice or more. The connection part 1513 may not be overlapped with the second magnet 1650 in an optical axis direction.

The first elastic member 1510 may comprise an extension part 1514. The extension part 1514 may be extended from the outer side portion 1512. The extension part 1514 may be coupled to the support member 1600. The extension part 1514 may comprise a hole 1515. The extension part 1514 may comprise a hole 1515 through which the wire 1610 of the support member 1600 passes. The extension part 1514 and the wire 1610 may be coupled by solder.

The elastic member 1500 may comprise a second elastic member 1520. The second elastic member 1520 may be a 'lower elastic member'. The second elastic member 1520 may be disposed below the first elastic member 1510. The second elastic member 1520 may connect the bobbin 1210 and the housing 1310. The second elastic member 1520 may be disposed below the bobbin 1210. The second elastic member 1520 may be coupled to the bobbin 1210 and the housing 1310. The second elastic member 1520 may be coupled to a lower surface of the bobbin 1210. The second elastic member 1520 may be coupled to a lower surface of the housing 1310. The second elastic member 1520 may be formed of a leaf spring. The second elastic member 1520 may be integrally formed.

The second elastic member 1520 may comprise an inner side portion 1521. The inner side portion 1521 may be coupled to the bobbin 1210. The inner side portion 1521 may be coupled to a lower surface of the bobbin 1210. The inner side portion 1521 may comprise a hole or groove being coupled to the protrusion of the bobbin 1210. The inner side portion 1521 may be fixed to the bobbin 1210 by an adhesive.

The second elastic member 1520 may comprise an outer side portion 1522. The outer side portion 1522 may be coupled to the housing 1310. The outer side portion 1522 may be coupled to a lower surface of the housing 1310. The outer side portion 1522 may comprise a hole or groove being coupled to the protrusion of the housing 1310. The outer side portion 1522 may be fixed to the housing 1310 by an adhesive.

The second elastic member 1520 may comprise a connection part 1523. The connection part 1523 may connect the inner side portion 1521 and the outer side portion 1522. The connection part 1523 may have elasticity. At this time, the connection part 1523 may be referred to as an 'elastic part'. The connection part 1523 may be formed by bending two or more times.

The lens driving device 1010 may comprise a support member 1600. The support member 1600 may connect the substrate 1420 and the first elastic member 1510. The support member 1600 may be coupled to each of the first elastic member 1510 and the substrate 1420 by soldering. The support member 1600 may movably support the housing 1310. The support member 1600 may elastically support the housing 1310. The support member 1600 may have elasticity at least in part. The support member 1600 may support the movement of the housing 1310 and the bobbin 1210 during OIS driving. The support member 1600 may comprise an elastic member. The support member 1600 may have elasticity.

The support member 1600 may comprise a plurality of support members. The support member 1600 may comprise four support members. Two of the four support members need to comprise components capable of electrical conduction for electrical connection with the first coil 1220. However, the remaining two support members may be formed only by the buffer part 1620 which is an injection molding without parts capable of electrical conduction.

The support member 1600 may comprise a wire 1610. The wire 1610 may comprise a wire spring. The wire 1610 may have elasticity. The wire 1610 may be an elastic member. The wire 1610 may be formed of a conductive material. The wire 1610 may be formed of metal. The wire 1610 may electrically connect the first substrate 1410 and the first elastic member 1510. The wire 1610 may connect the first substrate 1410 and the first elastic member 1510.

The outer circumferential surface of the wire 1610 may be covered by the buffer part 1620. At least a portion of the wire 1610 may be protruded from the buffer part 1620. An upper end portion and a lower end portion of the wire 1610 may be protruded from the buffer part 1620. The wire 1610 may comprise a first portion 1611 being protruded from the upper end of the buffer part 1620 and a second portion 1612 being protruded from the lower end of the buffer part 1620. The first portion 1611 of the wire 1610 may be coupled to an upper surface of the first elastic member 1510 by a conductive member. The second portion 1612 of the wire 1610 may be coupled to a lower surface of the substrate 1420 by a conductive member.

In the present embodiment, the upper side portion of the wire 1610 is connected to the first elastic member 1510 which is a suspension spring portion, and the lower side portion may be connected to the stator 1400 such as the base 1410, the substrate 1420, or the second coil 1430. Stress is concentrated on the lower side portion of the wire 1610 due to fall, impact, and vibration, and thereby deformation and disconnection may occur, but in the present embodiment, the wire 1610 may be provided with a reinforcement structure made of an injection molding material. Through this, the accumulated fatigue caused by the injection molding can be eliminated. Also, the spring constant in an optical axis direction may increase. Furthermore, the spring strength may be increased to increase the resonant frequency, so that the frequency characteristic may be improved.

In a modified embodiment, the wire 1610 of the support member 1600 may comprise a plurality of wires. A plurality of wires may be disposed in the buffer part 1620 in a twisted form. That is, a plurality of wires may be disposed in one buffer part 1620. In addition, a plurality of wires may be disposed on each of the four support members.

The support member 1600 may comprise a buffer part 1620. The buffer part 1620 may be formed of a material different from that of the wire 1610. The buffer part 1620 may surround at least a portion of the wire 1610. The buffer part 1620 may surround the wire 1610 from the first elastic member 1510 to the substrate 1420. The buffer part 1620 may be formed of a non-conductive material. The buffer part 1620 may be formed of an elastomer. The buffer part 1620 may be formed of an injection molding material. The buffer part 1620 may have a circular cross-section in a direction perpendicular to the optical axis. In a modified embodiment, the buffer part 1620 may have a polygonal cross-section in a direction perpendicular to the optical axis.

In the present embodiment, a plastic injection molding product may surround the outside of the OIS wire 1610. In the present embodiment, the material of the buffer part 1620 may be formed of a general injection molding or a rubber material. A conductive wire 1610 (comprising an elastic material) may be disposed at the center or outside of the buffer part 1620. A soldering portion may be protruded from the upper and lower side portions of the support member 1600. The soldering portion may be the first portion 1611 and the second portion 1612 of the wire 1610. The upper side portion may be electrically connected to the first elastic member 1510 and the lower side portion may be electrically connected to the first substrate 1420 or the second coil 1430.

In the present embodiment, a damper effect can be obtained due to the material of the injection molding. However, when an additional damper effect is required, a first space (refer to A of FIG. 36) for applying the additional damper may be provided. The damper being disposed in the first space may connect the connection part 1513 of the first elastic member 1510 and the bobbin 1210. A protrusion of the bobbin 1210 may be disposed in the first space. In addition, when an additional damper effect is required, a second space (refer to B of FIG. 36) for applying an additional damper may be provided. The damper disposed in the second space may connect the connection part 1513 of the first elastic member 1510 and the housing 1310. A protrusion of the housing 1310 may be disposed in the second space.

Although the present embodiment has been described based on the fact that the conductive wire 1610 is simply comprised in the injection-molded product, in another embodiment, the conductive wire 1610 may be comprised outside the injection-molded product. In particular, in order to improve the strength of the wire, two or more wires 1610 may be disposed in parallel or twisted inside the injection molding.

The buffer part 1620 may comprise a first fixing part 1621. The first fixing part 1621 may be connected to the first elastic member 1510. The first fixing part 1621 of the support member 1600 may be disposed in the hole 1515 of the extension part 1514. At this time, the diameter of the hole 1515 of the extension part 1514 in a direction perpendicular to the optical axis may be the same as the diameter of the first fixing part 1621 of the support member 1600 (refer to D of FIG. 33).

The buffer part 1620 may comprise a second fixing part 1622. The second fixing part 1622 may be connected to the first substrate 1420. The second fixing part 1622 may be disposed in the hole 1423 of the first substrate 1420.

The buffer part 1620 may comprise an extension part 1623. The extension part 1623 may be disposed between the first fixing part 1621 and the second fixing part 1622. The diameter of the first fixing part 1621, the diameter of the second fixing part 1622, and the diameter of the extension part 1623 may be the same. At this time, the diameter may be a diameter in a direction perpendicular to the optical axis.

The buffer part 1620 may comprise a deformable part. The deformable part has a smaller size than other parts of the buffer part 1620, that is, an outer diameter, so that deformation can easily occur during OIS driving. A deformable part may comprise a plurality of deformable parts.

The buffer part 1620 may comprise a first deformable part 1624. The first deformable part 1624 may connect the first fixing part 1621 and the extension part 1623 to each other. A diameter in a direction perpendicular to the optical axis of the first deformable part 1624 (refer to D1 in FIG. 33) may be smaller than a diameter in a direction perpendicular to the optical axis of the first fixing part 1621 (refer to D in FIG. 33). A diameter D1 in a direction perpendicular to the optical axis of the first deformable part 1624 may be smaller than a diameter D in a direction perpendicular to the optical axis of the extension part 1623. The diameter D1 of the first deformable part 1624 may be 20% to 80% of the diameter D of the first fixing part 1621.

The buffer part 1620 may comprise a second deformable part 1625. The second deformable part 1625 may connect the second fixing part 1622 and the extension part 1623 to each other. The diameter D1 of the second deformable part 1625 in a direction perpendicular to the optical axis may be smaller than the diameter D of the second fixing part 1622 in a direction perpendicular to the optical axis. The diameter D1 of the first deformable part 1624 and the diameter D1 of the second deformable part 1625 may be the same. At this time, the diameter may be a diameter in a direction perpendicular to the optical axis. The diameter D1 of the second deformable part 1625 may be 20% to 80% of the diameter D of the second fixing part 1622.

In the present embodiment, the spring constant (K) of the first elastic member 1510 can be made higher, so that the frequency characteristic is improved and the posture difference in the Z-axis direction (optical axis direction) is improved so that the changes in resolution for posture can be reduced and the feedback system can operate more stably due to the improvement in frequency characteristics.

The deformable part comprising the first deformable part 1624 and the second deformable part 1625 is based on a circular shape, but may have a different shape of curvature, and the number of deformable parts may be plural according to the characteristics of the product. When the deformable part is provided in multiple configurations, the deformable part may be added to the part with the greatest displacement when moved left and right to improve stress. The shape of the deformable part may take some form such as partial bending or clamping.

The buffer part 1620 may comprise a groove 1636. The groove 1626 may be formed by being recessed in an outer circumferential surface of the buffer part 1620. The groove 1626 may be spaced apart from the upper end and the lower end of the buffer part 1620. The first deformable part 1624 and the second deformable part 1625 of the buffer part 1620 may be formed by the groove 1626. The groove 1626 of the buffer part 1620 may comprise a plurality of grooves. The groove 1626 may comprise two grooves. The groove 1626 of the buffer part 1620 may comprise a first groove 1627 adjacent to the upper end of the buffer part 1620 and a second groove 1628 adjacent to the lower end of the buffer part 1620. The first deformable part 1624 may be formed by the first groove 1627. The second deformable part 1625 may be formed by the second groove 1628.

The length of each of the first groove 1627 and the second groove 1628 of the buffer part 1620 in an optical axis direction (refer to L1 and L2 in FIG. 33) may be 3% to 40% of the length of the buffer part 1620 in an optical axis direction (refer to L of FIG. 33). That is, the length of the first deformable part 1624 and the second deformable part 1625 in an optical axis direction may be 3% to 40% of the length of the buffer part 1620 in an optical axis direction. The length of the second groove 1628 of the buffer part 1620 in an optical axis direction (refer to L2 of FIG. 33) may be longer than the length of the first groove 1627 in an optical axis direction (refer to L1 of FIG. 33).

The lens driving device 1010 may comprise a second magnet 1650. The second magnet 1650 may be a 'sensing magnet'. The second magnet 1650 may be disposed in the bobbin 1210. The second magnet 1650 may be detected by the first sensor 1670. The second magnet 1650 may face the first sensor 1670. The second magnet 1650 may be disposed at a side portion of the bobbin 1210. That is, the second magnet 1650 may be disposed to face the side portion of the housing 1310. The second magnet 1650 is disposed in the groove 1212 of the bobbin 1210 so that an upper surface of the second magnet 1650 faces the first elastic member 1510.

The second magnet 1650 may be disposed at an opposite side of the third magnet 1660 about an optical axis.

The lens driving device 1010 may comprise a third magnet 1660. The third magnet 1660 may be a 'compensation magnet' and/or a 'sensing magnet'. The third magnet 1660 may be disposed in the bobbin 1210. The third magnet 1660 may be disposed to achieve magnetic force balance with the second magnet 1650. The third magnet 1660 may be symmetrical with the second magnet 1650 about an optical axis. The third magnet 1660 may be disposed at a position corresponding to the second magnet 1650 about an optical axis. The third magnet 1660 may have a size and/or a shape corresponding to that of the second magnet 1650 about an optical axis. A second magnet 1650 may be disposed at one side of the bobbin 1210, and a third magnet 1660 may be disposed at the other side of the bobbin 1210. The third magnet 1660 may be disposed at a side portion of the bobbin 1210. That is, the third magnet 1660 may be disposed to be opposite to the side portion of the housing 1310.

The third magnet 1660 may be detected by the second sensor 1675. The third magnet 1660 may be opposite to the second sensor 1675. Each of the second magnet 1650 and the third magnet 1660 may have a columnar shape having a circular lower surface. Each of the second magnet 1650 and the third magnet 1660 may comprise a rectangular pillar or a cylindrical shape. The second magnet 1650 may be disposed in the hole 1212 of the bobbin 1210. The third magnet 1660 may be disposed in the hole 1212 of the bobbin 1210. At least a portion of the second magnet 1650 may be disposed at an outer side of the first coil 1220 in a direction perpendicular to the optical axis. At least a portion of the third magnet 1660 may be disposed at an outer side of the first coil 1220 in a direction perpendicular to the optical axis. The second magnet 1650 and the third magnet 1660 may be disposed at positions corresponding to the plurality of side portions of the housing 1310.

The lens driving device 1010 may comprise a first sensor 1670 and a second sensor 1675. The first sensor 1670 and the second sensor 1675 may be used for AF feedback driving. At this time, the first sensor 1670 and the second sensor 1675 may be referred to as 'AF feedback driving sensors'. Each of the first sensor 1670 and the second sensor 1675 may detect a movement of the bobbin 1210 in an optical axis direction. The first sensor 1670 and the second sensor 1675 are attached to the substrate 1420. The first sensor 1670 and the second sensor 1675 may be disposed between the substrate 1420 and the base 1410. The first sensor 1670 detects the second magnet 1650. The second sensor 1675 may detect the third magnet 1660. The sensed values detected by the first sensor 1670 and the second sensor 1675 may be used for AF feedback control. In the present embodiment, the first sensor 1670 and the second sensor 1675 may be connected in series.

The first sensor 1670 may be overlapped with the second magnet 1650 in an optical axis direction. The second sensor 1675 may be overlapped with the third magnet 1660 in an optical axis direction. The first sensor 1670 may comprise a surface facing the second magnet 1650. The second sensor 1675 may comprise a surface facing the third magnet 1660. The first sensor 1670 may be disposed in the first groove 1414a of the base 1410, and the second sensor 1675 may be disposed in the second groove 1414b of the base 1410.

Any one of the first sensor 1670 and the second sensor 1675 may be disposed between the first corner region and the second corner region of the upper surface of the base 1410. That is, any one of the first sensor 1670 and the second sensor 1675 may be disposed between the third sensor 1680 and the fourth sensor 1685.

Each of the first sensor 1670 and the second sensor 1675 may comprise a tunnel magnetoresistance (TMR) sensor. One of the first sensor 1670 and the second sensor 1675 may comprise a TMR sensor and the other may comprise a Hall sensor. The first sensor 1670 may comprise a TMR sensor, and the second sensor 1675 may comprise a Hall sensor. The first sensor 1670 may comprise a Hall sensor, and the second sensor 1675 may comprise a TMR sensor. Each of the first sensor 1670 and the second sensor 1675 may comprise a Hall sensor.

The first sensor 1670 and/or the second sensor 1675 may comprise a driver IC. In this case, the driver IC may be described as comprising a Hall element serving as the first sensor 1670 and/or the second sensor 1675. The driver IC may control the power applied to the first coil 1220. The driver IC may be electrically connected to the first coil 1220 through the wire 1610 and the first elastic member 1510.

The lens driving device 1010 may comprise a third sensor 1680 and a fourth sensor 1685. The third sensor 1680 and the fourth sensor 1685 may be used for OIS feedback control. At this time, the third sensor 1680 and the fourth sensor 1685 may be referred to as 'OIS feedback driving sensors'. The third sensor 1680 and the fourth sensor 1685 may be disposed in the substrate 1420. The third sensor 1680 and the fourth sensor 1685 may be disposed between the base 1410 and the substrate 1420. The third sensor 1680 and the fourth sensor 1685 may detect the movement of the second mover 1300. The third sensor 1680 may be disposed in the first corner region of the upper surface of the base 1410. The fourth sensor 1685 may be disposed in the second corner region of the upper surface of the base 1410. The third sensor 1680 may detect the first driving magnet 1321. The fourth sensor 1685 may detect the second driving magnet 1322. The third sensor 1680 may detect a movement of the housing 1310 in a second axis direction. The fourth sensor 1685 may detect a movement of the housing 1310 in a first axis direction.

Each of the third sensor 1680 and the fourth sensor 1685 may comprise a Hall sensor. At this time, the Hall sensor may sense the magnetic force of the first magnet 1320 to detect the movement of the housing 1310 and the first magnet 1320. The detected values detected by the third sensor 1680 and the fourth sensor 1685 may be used for OIS feedback control. The third sensor 1680 may detect movement in the x-axis direction of the first magnet 1320, and the fourth sensor 1685 may detect movement in the y-axis direction of the first magnet 1320.

The lens driving device 1010 may comprise a damper. The damper may comprise a plurality of dampers. The first damper may connect the support member 1600 and the housing 1310. The second damper may connect the bobbin 1210 and the first elastic member 1510 and/or the first elastic member 1510 and the housing 1310. Through this, it is possible to lower the peak of the primary resonant frequency. In other words, it is possible to dampen the spring and the movable part, and the spring and the fixing part.

The lens driving device 1010 according to the second embodiment of the present invention may comprise the support member 600 of the first embodiment. The support member 1600 of the second embodiment may be replaced with the support member 600 of the first embodiment.

In the present embodiment, the OIS movement can be confirmed by using the Hall element of the substrate 1420 or the second coil 1430 below the first magnet 1320. In addition, it is possible to confirm the movement of the AF through the TMR element or the Hall element using the separate second and third magnets 1650 and 1660.

Hereinafter, a coupling relationship between the first sensor and the second sensor according to a second embodiment of the present invention will be described with reference to the drawings.

Figure 38:
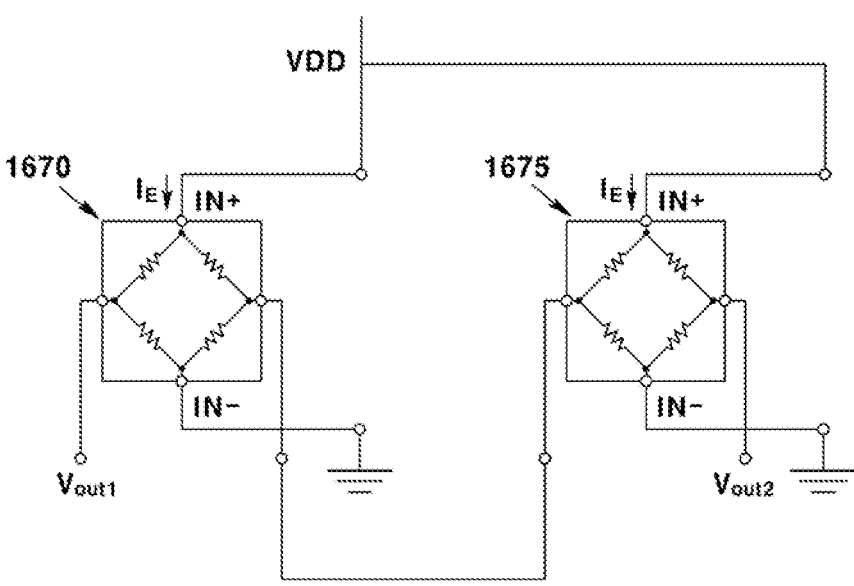
FIG. 38 is a conceptual diagram illustrating a coupling relationship between sensors of a lens driving device according to a second embodiment of the present invention.

FIG. 38 is a conceptual diagram illustrating a coupling relationship between sensors of a lens driving device according to a second embodiment of the present invention.

One TMR element or one Hall element can be used to confirm the AF movement, but in the present embodiment, they can be connected in series to increase the linearity with respect to the AF driving distance and the output of the hall and TMR elements. The main Hall element can also be used for Hall calibration, and calibration can be performed using the sum of two values.

In the present embodiment, the first sensor 1670 and the second sensor 1675 may be connected in series. Any one of the two output terminals of the first sensor 1670 and any one of the two output terminals of the second sensor 1675 may be connected to each other. In more detail, a high voltage terminal among the two output terminals of the first sensor 1670 and a low voltage terminal among the two output terminals of the second sensor 1675 may be connected. The first sensor 1670 may comprise a first terminal that is V− and a second terminal that is V+. The second sensor 1675 may comprise a third terminal that is V− and a fourth terminal that is V+. At this time, the second terminal of the first sensor 1670 and the third terminal of the second sensor 1675 may be connected. Two connected terminals may have the same voltage. Therefore, when the output is measured at the first terminal of the first sensor 1670 and the fourth terminal of the second sensor 1675, about twice the output can be measured when compared with the case in which only one of the first sensor 1670 and the second sensor 1675 is provided Meanwhile, by changing the circuit connection, the tilt can be calculated using the two difference values and used as information when performing the alignment between the lens and the image sensor 1060.

Hereinafter, the comparative example and the present embodiment are compared with drawings and the effect of the present embodiment will be described. However, the comparative example is also an embodiment of the present invention, and the technical configuration corresponding to the comparative example is not excluded from the present invention.

Figure 39:
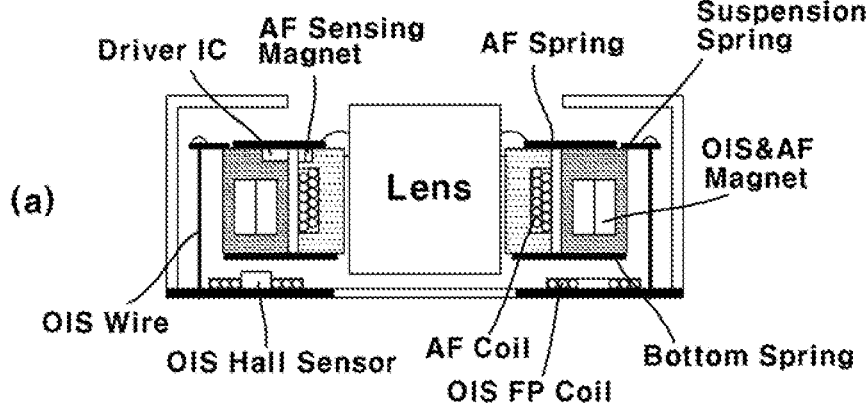
FIG. 39 is a conceptual diagram illustrating a lens driving device according to a comparative example according to posture.
Figure 39:
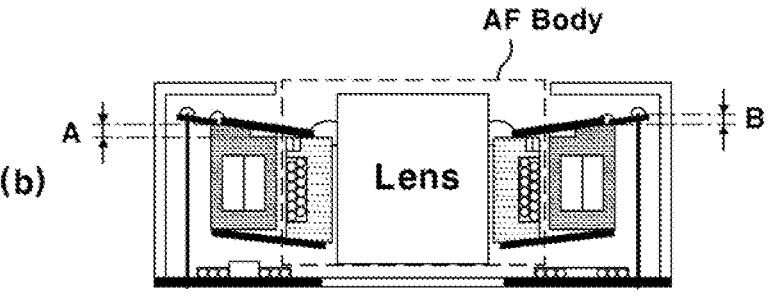
Figure 39:
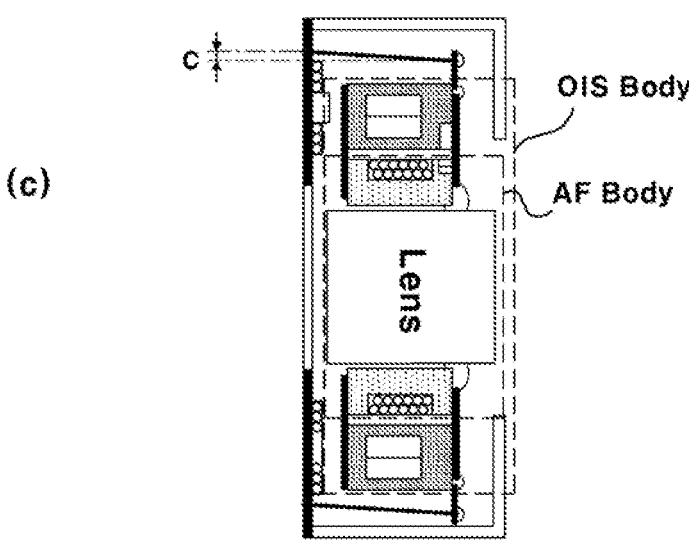
Figure 40:
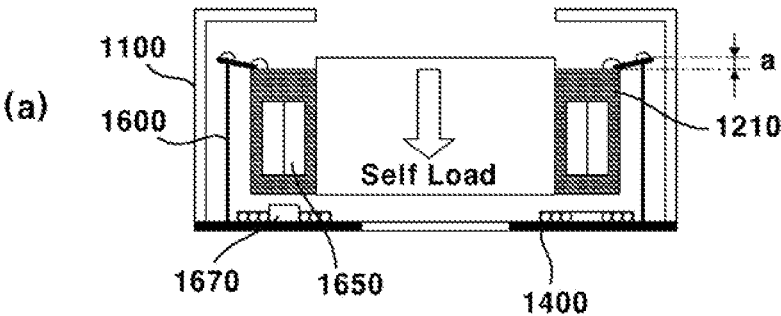
FIG. 40 is a conceptual diagram illustrating a lens driving device according to a posture according to a second embodiment of the present invention.
Figure 40:
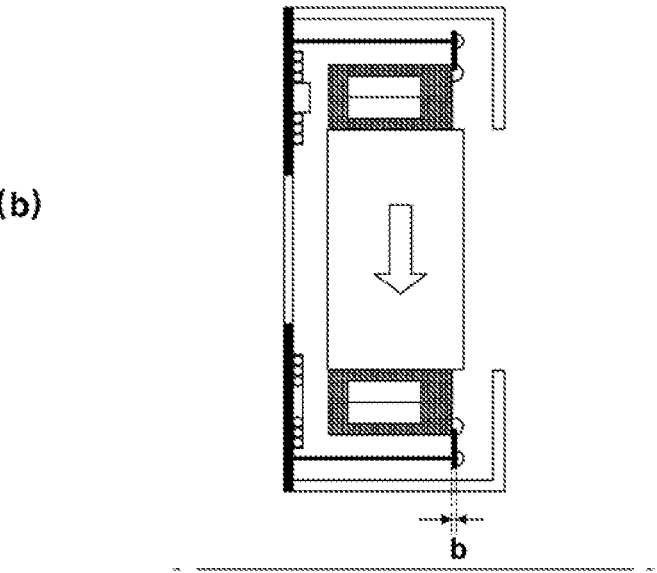
Figure 40:
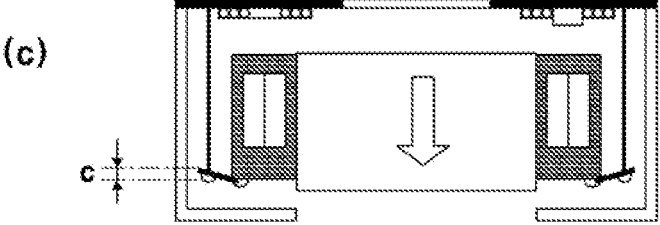

FIG. 39 is a conceptual diagram illustrating a lens driving device according to a comparative example according to posture; and FIG. 40 is a conceptual diagram illustrating a lens driving device according to a posture according to a second embodiment of the present invention.

In the case of a model in which a sensing magnet is disposed in a bobbin and a driver IC comprising a Hall element is disposed in a housing as shown in FIG. 39 (a), when the bobbin and the housing deflect due to gravity in the UP-posture in which the lens faces upward as illustrated in FIG. 39 (b), AF posture difference (refer to A of FIG. 39 (b)) and OIS body posture difference in AF direction (refer to B of FIG. 39 (b)) may occur. In the case of AF posture difference A, the posture difference is related to the weight of the AF drive unit and the spring constant K of the AF spring, and the posture difference correction may be possible through the calibration of the Hall element and displacement (close loop AF function). However, in the case of OIS body posture difference B in the direction of OIS body to AF, the posture difference is related to the spring constant K of the OIS body and the suspension spring, which is the OIS driving part, it is not corrected in the comparative example. Meanwhile, in the SIDE-posture, in which the lens faces the side, as illustrated in of FIG. 39 (*c*), the OIS body posture difference in OIS body direction (refer to C of FIG. 39 (*c*)) is related to the spring constant K of the OIS body and OIS wire, which is the OIS driving part, posture difference correction may be possible through the calibration of the OIS's Hall element and displacement (centering function).

In the present embodiment, the wire can be reinforced with an injection molding and the sensor can be disposed in the base 1410. In the present embodiment, as shown in FIG. 40 (*a*), in an UP-posture with the lens facing up, deflection by the first length (refer to a of FIG. 40 (*a*)) may occur in the first mover 1200, which is the AF driving unit. In addition, in the present embodiment, as shown in FIG. 40 (*b*), in a SIDE-posture with the lens facing the side, deflection by a second length (refer to b of FIG. 40 (*b*)) close to zero may be generated in the AF driver. Meanwhile, in the present embodiment, as shown in FIG. 40 (*c*), in a DOWN-posture with the lens facing down, deflection by the third length (refer to c of FIG. 39 (*c*)) may be generated in the AF driver. At this time, the first length may be approximately equal to the third length.

In the present embodiment, the posture difference in the OIS body in AF direction described with reference to FIG. 39 may be corrected. Since the first sensor 1670 and the second sensor 1675 for detecting the second magnet 1650 and the third magnet 1660 are disposed in the base 1410, the OIS body (corresponding to the second mover 1300) in AF direction posture difference may also be considered.

In the present embodiment, the upper suspension part of the first elastic member 1510 is deleted or the spring constant K of the first elastic member 1510 is increased through the support member to which the injection material and the wire are applied together, so that the deflection of the first and second movers 1200 and 1300 being generated according to the posture can be reduced.

Fine differences may occur due to spring K distribution, wire length, and assembly tolerances such as tilt. AF deflection may be corrected using feedback such as AF Hall. In the suspension part (corresponding to the extension part 1514 of the first elastic member 1510) for suppressing OIS wire disconnection and improving frequency characteristics, when the posture difference is reduced, the K value may be increased and stress may also be increased. An appropriate K value is required to suppress disconnection of the wire spring, and this may cause generation of a posture difference of about 2 to 20 μm.

Hereinafter, a camera module according to a second embodiment of the present invention will be described with reference to the drawings.

Figure 41:
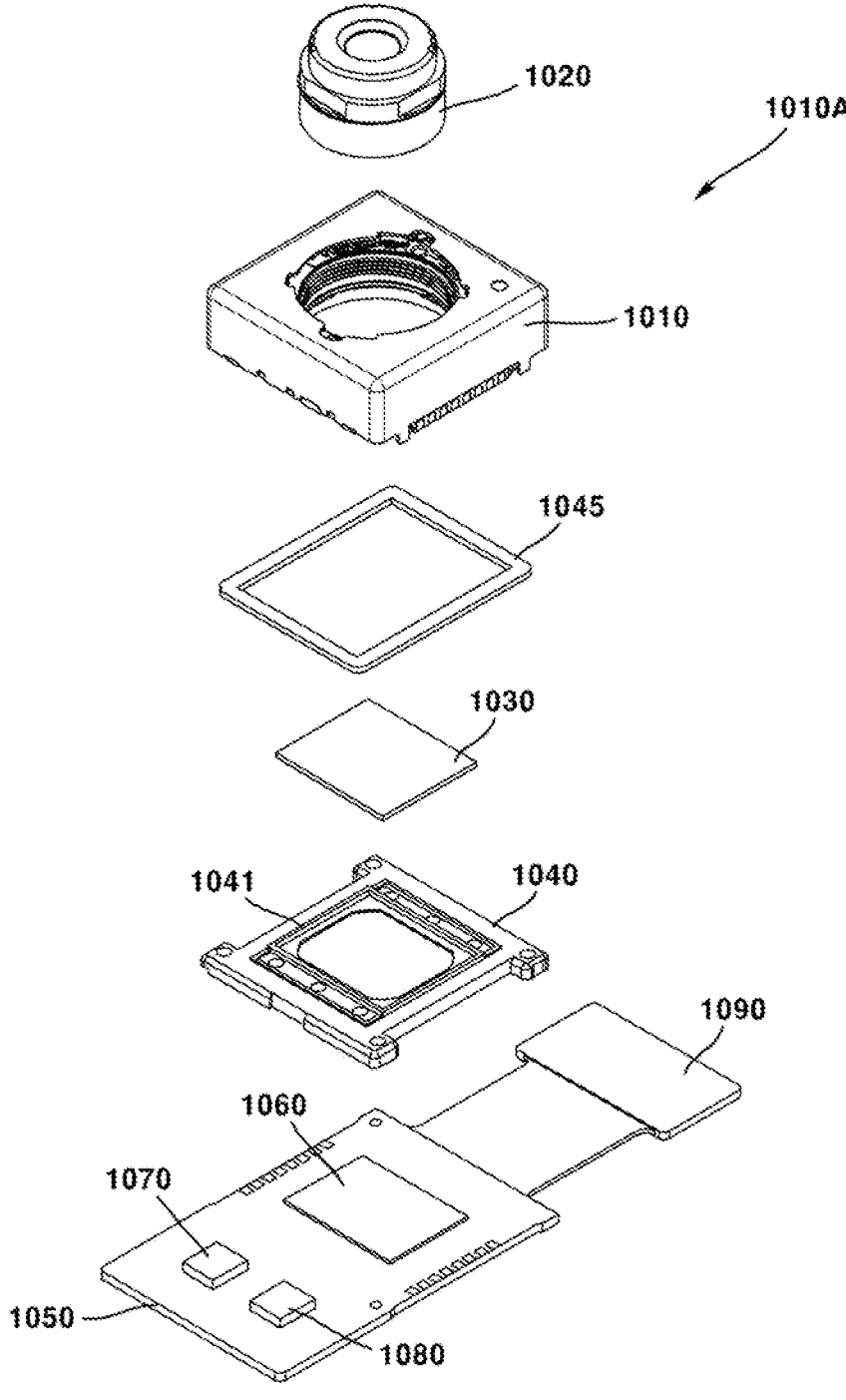
FIG. 41 is an exploded perspective view of a camera device according to a second embodiment of the present invention.

FIG. 41 is an exploded perspective view of a camera device according to a second embodiment of the present invention.

The camera module 1010A may comprise a camera device.

The camera module 1010A may comprise a lens module 1020. The lens module 1020 may comprise at least one lens. The lens may be disposed at a position corresponding to the image sensor 1060. The lens module 1020 may comprise a lens and a barrel. The lens module 1020 may be coupled to the bobbin 1210 of the lens driving device 1010. The lens module 1020 may be coupled to the bobbin 1210 by screw-coupling and/or adhesive. The lens module 1020 may move integrally with the bobbin 1210.

The camera module 1010A may comprise a filter 1030. The filter 1030 may serve to block light of a specific frequency band from being incident on the image sensor 1060 in light passing through the lens module 1020. The filter 1030 may be disposed parallel to the x-y plane. The filter 1030 may be disposed between the lens module 1020 and the image sensor 1060. The filter 1030 may be disposed in the sensor base 1040. In a modified embodiment, the filter 1030 may be disposed in the base 1410. The filter 1030 may comprise an infrared filter. The infrared filter may block light of the infrared region from being incident on the image sensor 1060.

The camera module 1010A may comprise a sensor base 1040. The sensor base 1040 may be disposed between the lens driving device 1010 and the printed circuit substrate 1050. The sensor base 1040 may comprise a protruded portion 1041 in which the filter 1030 is disposed. An opening may be formed in a portion of the sensor base 1040 where the filter 1030 is disposed so that light passing through the filter 1030 may be incident on the image sensor 1060. The adhesive member 1045 may couple or attach the base 1410 of the lens driving device 1010 to the sensor base 1040. The adhesive member 1045 may additionally serve to prevent foreign substances from being introduced into the lens driving device 1010. The adhesive member 1045 may comprise any one or more among an epoxy, a thermosetting adhesive, and an ultraviolet curable adhesive.

The camera module 1010A may comprise a printed circuit substrate (PCB) 1050. The printed circuit substrate 1050 may be a substrate or a circuit substrate. A lens driving device 1010 may be disposed in the printed circuit substrate 1050. A sensor base 1040 may be disposed between the printed circuit substrate 1050 and the lens driving device 1010. The printed circuit substrate 1050 may be electrically connected to the lens driving device 1010. An image sensor 1060 may be disposed in the printed circuit substrate 1050. Various circuits, elements, control units, and the like may be provided in the printed circuit substrate 1050 in order to convert an image formed on the image sensor 1060 into an electrical signal and transmit it to an external device.

The camera module 1010A may comprise an image sensor 1060. The image sensor 1060 may have a configuration in which light passing through a lens and a filter 1030 is incident to form an image. The image sensor 1060 may be mounted on a printed circuit substrate 1050. The image sensor 1060 may be electrically connected to the printed circuit substrate 1050. For example, the image sensor 1060 may be coupled to the printed circuit substrate 1050 by a surface mounting technology (SMT). As another example, the image sensor 1060 may be coupled to the printed circuit substrate 1050 by a flip chip technology. The image sensor 1060 may be disposed so that a lens and an optical axis coincide. That is, the optical axis of the image sensor 1060 and the optical axis of the lens may be aligned. The image sensor 1060 may convert light irradiated to the effective image region of the image sensor 1060 into an electrical signal. The image sensor 1060 may be any one among a charge coupled device (CCD), a metal oxide semi-conductor (MOS), a CPD, and a CID.

The camera module 1010A may comprise a motion sensor 1070. The motion sensor 1070 may be mounted on the printed circuit substrate 1050. The motion sensor 1070 may be electrically connected to the control unit 1080 through a circuit pattern provided on the printed circuit substrate 1050. The motion sensor 1070 may output rotational angular velocity information due to the movement of the camera module 1010A. The motion sensor 1070 may comprise a 2-axis or 3-axis gyro sensor, or an angular velocity sensor.

The camera module 1010A may comprise a control unit 1080. The control unit 1080 may be disposed in the printed circuit substrate 1050. The control unit 1080 may be electrically connected to the first and second coils 1220 and 1430 of the lens driving device 1010. The control unit 1080 may individually control the direction, intensity, and amplitude of the current supplied to the first and second coils 1220 and 1430. The control unit 1080 may control the lens driving device 1010 to perform an autofocus function and/or an image stabilization function. Furthermore, the control unit 1080 may perform auto focus feedback control and/or handshake correction feedback control for the lens driving device 1010.

The camera module 1010A may comprise a connector 1090. The connector 1090 may be electrically connected to the printed circuit substrate 1050. The connector 1090 may comprise a port for being electrically connected to an external device.

Hereinafter, an optical instrument according to a second embodiment of the present invention will be described with reference to the drawings.

Figure 42:
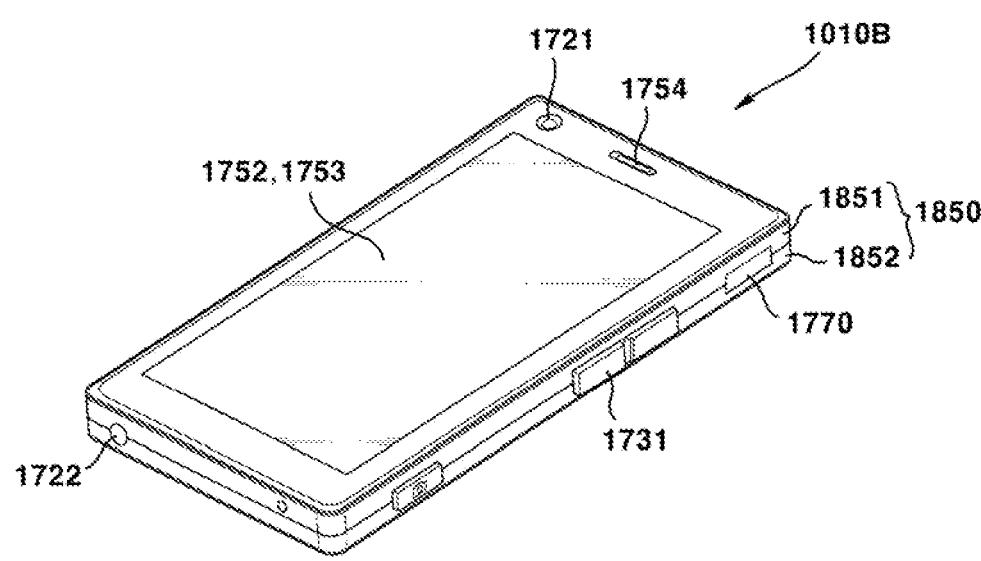
FIG. 42 is a perspective view illustrating an optical instrument according to a second embodiment of the present invention.
Figure 43:
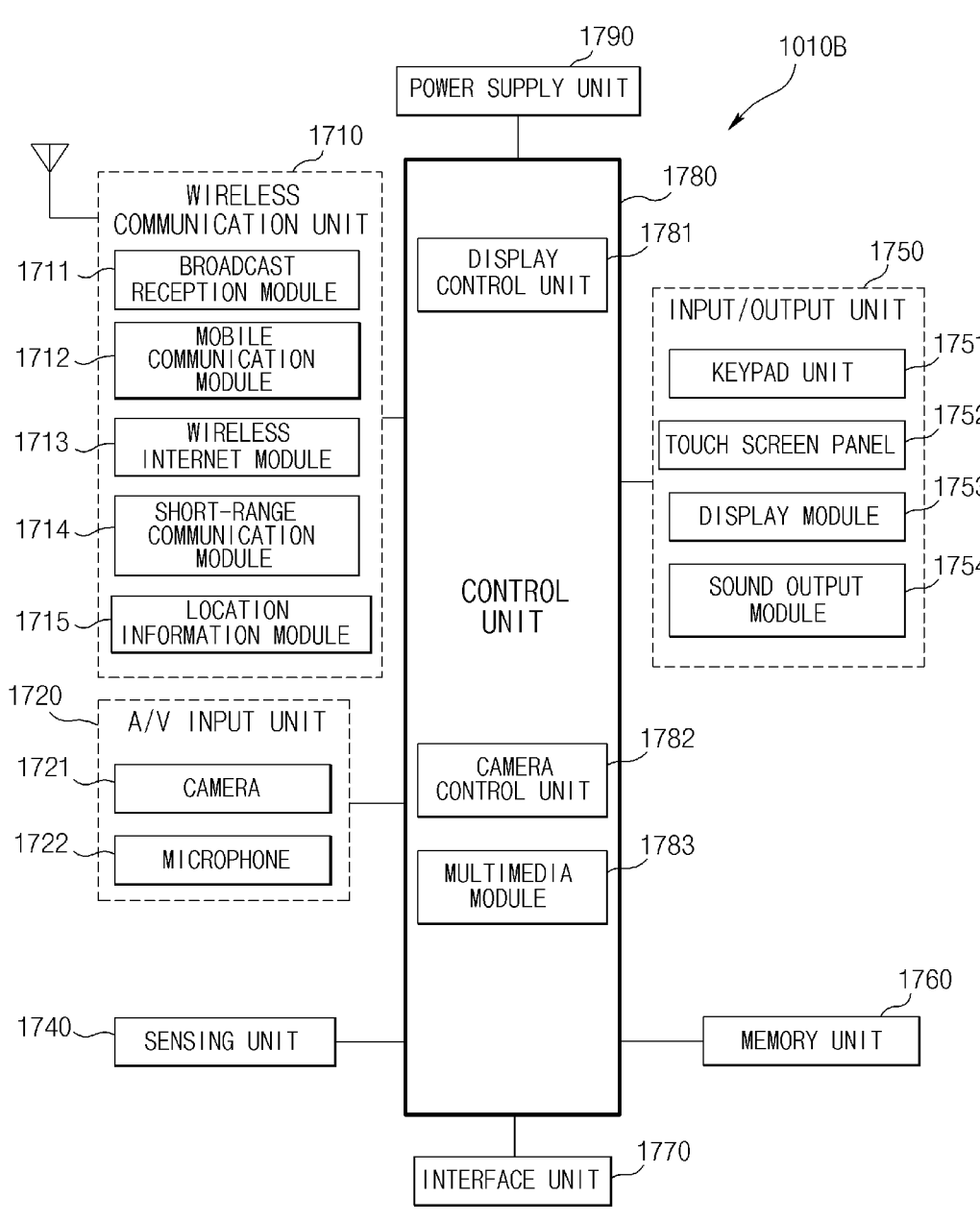
FIG. 43 is a block diagram of an optical instrument according to a second embodiment of the present invention.

FIG. 42 is a perspective view illustrating an optical instrument according to a second embodiment of the present invention; and FIG. 43 is a block diagram of an optical instrument according to a second embodiment of the present invention.

The optical instrument 110B may comprise a portable terminal. The optical instrument 110B may be any one among a hand phone, a portable phone, a smart phone, a portable smart device, a digital camera, a laptop computer, a digital broadcasting terminal, a personal digital assistant (PDA), a portable multimedia player (PMP), and navigation. However, the type of the optical instrument 110B is not limited thereto, and any device for photographing a video or a picture may be comprised in the optical instrument 110B.

The optical instrument 110B may comprise a main body 1850. The main body 1850 may have a bar shape. Or, the main body 1850 may have various structures, such as a slide type, a folder type, a swing type, a swivel type, and the like in which two or more sub-bodies are coupled to be relatively movable. The main body 1850 may comprise a case (casing, housing, and cover) forming an outer appearance. For example, the main body 1850 may comprise a front case 1851 and a rear case 1852. Various electronic components of the optical instrument 110B may be embedded in a space formed between the front case 1851 and the rear case 1852. A display module 1753 may be disposed on one surface of the main body 1850. A camera 1721 may be disposed on one or more surfaces of one surface and the other surface being disposed at an opposite side of the one surface of the main body 1850.

The optical instrument 110B may comprise a wireless communication unit 1710. The wireless communication unit 1710 may comprise one or more modules enabling wireless communication between the optical instrument 110B and the wireless communication system, or between the optical instrument 110B and the network in which the optical instrument 110B is located. For example, the wireless communication unit 1710 may comprise any one or more among a broadcast reception module 1711, a mobile communication module 1712, a wireless Internet module 1713, a short-range communication module 1714, and a location information module 1715.

The optical instrument 110B may comprise an A/V input unit 1720. The A/V input unit 1720 is for inputting an audio signal or a video signal and may comprise any one or more of a camera 1721 and a microphone 1722. At this time, the camera 1721 may comprise a camera module 1010A according to the present embodiment.

The optical instrument 110B may comprise a sensing unit 1740. The sensing unit 1740 may generate a sensing signal for controlling the operation of the optical instrument 110B by detecting the current state of the optical instrument 110B such as the opening/closing state of the optical instrument 110B, the position of the optical instrument 110B, the presence or absence of user contact, the orientation of the optical instrument 110B, acceleration/deceleration of the optical instrument 110B, and the like. For example, when the optical instrument 110B is in the form of a slide phone, it is possible to sense whether the slide phone is opened or closed. In addition, it is responsible for sensing functions related to whether the power supply unit 1790 is supplied with power, whether the interface unit 1770 is coupled to an external device, and the like.

The optical instrument 110B may comprise an input/output unit 1750. The input/output unit 1750 may be configured to generate an input or output related to visual, auditory, or tactile sense. The input/output unit 1750 may generate input data for controlling the operation of the optical instrument 110B, and may output information processed by the optical instrument 110B.

The input/output unit 1750 may comprise any one or more among a keypad unit 1751, a touch screen panel 1752, a display module 1753, and a sound output module 1754. The keypad unit 1751 may generate input data in response to a keypad input. The touch screen panel 1752 may convert a change in capacitance generated due to a user's touch on a specific area of the touch screen into an electrical input signal. The display module 1753 may output an image photographed by the camera 1721. The display module 1753 may comprise a plurality of pixels whose color changes according to an electrical signal. For example, the display module 1753 may comprise at least one among a liquid crystal display, a thin film transistor liquid crystal display, an organic light emitting diode, a flexible display, and a 3D display. The sound output module 1754 may output audio data received from the wireless communication unit 1710 in a call signal reception, a call mode, a recording mode, a voice recognition mode, or a broadcast reception mode, or stored in the memory unit 1760.

The optical instrument 110B may comprise a memory unit 1760. A program for processing and controlling the control unit 1780 may be stored in the memory unit 1760. In addition, the memory unit 1760 may store input/output data, for example, any one or more of a phone book, a message, an audio, a still image, a photo, and a moving picture. The memory unit 1760 may store an image photographed by the camera 1721, for example, a photo or a video.

The optical instrument 110B may comprise an interface unit 1770. The interface unit 1770 serves as a path for connecting to an external device being connected to the optical instrument 110B. The interface unit 1770 may receive data from an external device, receive power and transmit it to each component inside the optical instrument 110B, or transmit data inside the optical instrument 110B to the external device. The interface unit 1770 may comprise any one or more among a wired/wireless headset port, an external charger port, a wired/wireless data port, a memory card port, a port for connecting a device equipped with an identification module, and an audio I/O port, a video I/O port, and an earphone port.

The optical instrument 110B may comprise a control unit 1780. The control unit 1780 may control the overall operation of the optical instrument 110B. The control unit 1780 may perform related control and processing for voice call, data communication, video call, and the like. The control unit 1780 may comprise a display control unit 1781 that controls a display module 1753 that is a display of the optical instrument 110B. The control unit 1780 may comprise a camera control unit 1782 that controls the camera module. The control unit 1780 may comprise a multimedia module 1783 for playing multimedia. The multimedia module 1783 may be provided inside the control unit 1780 or may be provided separately from the control unit 1780. The control unit 1780 may perform a pattern recognition process capable of recognizing a handwriting input or a drawing input performed on the touch screen as characters and images, respectively.

The optical instrument 110B may comprise a power supply unit 1790. The power supply unit 1790 may receive external power or internal power by the control of the control unit 1780 to supply power required for operation of each component.

Although the first embodiment and the second embodiment of the present invention have been separately described above, the present invention may comprise a third embodiment comprising some configurations of the first embodiment and some configurations of the second embodiment. For example, the third embodiment of the present invention may comprise the support member 600 of the first embodiment and the first sensor 1670 and the second sensor 1675 of the second embodiment.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A lens driving device comprising:
a housing;
a bobbin disposed in the housing;
a base spaced apart from the housing;
a first coil disposed on the bobbin;
a magnet disposed on the housing and facing the first coil;
a first substrate disposed on the base and comprising a second coil facing the magnet;
a first elastic member connecting the bobbin and the housing; and
a support member connecting the first elastic member and the first substrate,
wherein the support member comprises a wire and a buffer part formed of a material different from the wire and surrounding at least a portion of the wire,
wherein the buffer part is formed of a different material than the first elastic member,
wherein the buffer part comprises a groove recessed from an outer circumferential surface of the buffer part, and
wherein the groove of the buffer part is spaced apart from an upper end and a lower end of the buffer part.

2. The lens driving device of claim 1, wherein the wire is formed of a conductive material, and
wherein the buffer part is formed of a non-conductive material.

3. The lens driving device of claim 1, wherein the wire is formed of a metal, and
wherein the buffer part is formed of an elastomer.

4. The lens driving device of claim 1, wherein the buffer part comprises a first fixing part connected with the first elastic member, a second fixing part connected with the first substrate, an extension part disposed between the first fixing part and the second fixing part, and a first deformable part connecting the first fixing part and the extension part, and
wherein a diameter of the first deformable part in a direction perpendicular to an optical axis is smaller than a diameter of the first fixing part in the direction perpendicular to the optical axis by the groove of the buffer part.

5. The lens driving device of claim 4, wherein the buffer part comprises a second deformable part connecting the second fixing part and the extension part, and
wherein a diameter of the second deformable part in the direction perpendicular to the optical axis is smaller than a diameter of the second fixing part in the direction perpendicular to the optical axis by the groove of the buffer part.

6. The lens driving device of claim 5, wherein the diameter of the first fixing part, the diameter of the second fixing part, and a diameter of the extension part in the direction perpendicular to the optical axis are same as each other, and
wherein the diameter of the first deformable part is same as the diameter of the second deformable part.

7. The lens driving device of claim 5, wherein the first substrate comprises a hole,
wherein the second fixing part of the support member is disposed on the hole of the first substrate, and
wherein a diameter of the hole in the first substrate in the direction perpendicular to the optical axis is same as the diameter of the second fixing part of the support member.

8. The lens driving device of claim 5, wherein the diameter of the first deformable part is 20% to 80% of the diameter of the first fixing part.

9. The lens driving device of claim 4, wherein the first elastic member comprises an inner side portion coupled to the bobbin, an outer side portion coupled to the housing, a connection part connecting the inner side portion and the outer side portion, and an extension part extending from the outer side portion and coupled to the support member,
wherein the extension part of the first elastic member comprises a hole,
wherein the first fixing part of the support member is disposed on the hole of the extension part of the first elastic member, and
wherein a diameter of the hole of the extension part of the first elastic member in the direction perpendicular to the optical axis is same as the diameter of the first fixing part of the support member.

10. The lens driving device of claim 1, wherein the groove of the buffer part comprises a first groove adjacent to the upper end of the buffer part and a second groove adjacent to the lower end of the buffer part, and
wherein a length of each of the first groove and the second groove of the buffer part in an optical axis direction is 3% to 40% of a length of the buffer part in the optical axis direction.

11. The lens driving device of claim 10, wherein the length of the second groove of the buffer part in the optical axis direction is greater than the length of the first groove in the optical axis direction.

12. The lens driving device of claim 1, wherein the buffer part has a circular cross-section in a direction perpendicular to an optical axis.

13. A camera device comprising:

a printed circuit board;

an image sensor disposed on the printed circuit board;

the lens driving device of claim 1 disposed on the printed circuit board; and a lens coupled with the bobbin of the lens driving device.

14. An optical instrument comprising:

a main body;

the camera device of claim 13 disposed on the main body; and a display module disposed on the main body and configured to output an image photographed by the camera device.

15. A lens driving device comprising:

a fixing member comprising a first substrate;

a housing disposed on the fixing member;

a bobbin disposed in the housing;

an elastic member connecting the bobbin and the housing; and a support member connecting the elastic member and the fixing member, wherein the support member comprises a wire and a buffer part comprising a columnar shape disposed to completely surround at least a portion of the wire, wherein the wire protrudes from one end of the buffer part to be coupled to the elastic member, and protrudes from an other end of the buffer part to be coupled to the fixing member, wherein the buffer part comprises a first fixing part connected with the elastic member, a second fixing part connected with the first substrate, an extension part disposed between the first fixing part and the second fixing part, a first deformable part connecting the first fixing part and the extension part, and a second deformable part connecting the second fixing part and the extension part, wherein a diameter of the second deformable part in a direction perpendicular to an optical axis is smaller than a diameter of the second fixing part in the direction perpendicular to the optical axis, wherein the first substrate comprises a hole, wherein the second fixing part of the support member is disposed on the hole of the first substrate, and wherein a diameter of the hole in the first substrate in the direction perpendicular to the optical axis is same as the diameter of the second fixing part of the support member.

16. The lens driving device of claim 15, wherein the elastic member comprises an upper elastic member and a lower elastic member disposed below the upper elastic member, and wherein a length of the buffer part is greater than or same as a distance between the upper elastic member and the lower elastic member.

17. The lens driving device of claim 15, wherein the buffer part surrounds 50% or more of the wire.

18. The lens driving device of claim 15, wherein the wire is formed of a conductive material, and wherein the buffer part is formed of a non-conductive material.

19. A lens driving device comprising:

a fixing member comprising a first substrate;

a housing disposed on the fixing member;

a bobbin disposed in the housing;

an elastic member connecting the bobbin and the housing; and a support member disposed between the elastic member and the fixing member, wherein the support member comprises a wire and a buffer part disposed to completely surround at least a portion of the wire, wherein, based on an optical axis direction, the buffer part has a length greater than a half of a length of the bobbin, wherein the wire protrudes from one end of the buffer part to be coupled to the elastic member, and protrudes from the other end of the buffer part to be coupled to the fixing member, wherein the buffer part comprises a first fixing part connected with the elastic member, a second fixing part connected with the first substrate, an extension part disposed between the first fixing part and the second fixing part, and a first deformable part connecting the first fixing part and the extension part, and wherein a diameter of the first deformable part is 20% to 80% of a diameter of the first fixing part.

20. The lens driving device of claim 19, wherein the wire is formed of a conductive material, and wherein the buffer part is formed of a non-conductive material.

* * * * *